US008010695B2

(12) United States Patent
Savchenko et al.

(10) Patent No.: US 8,010,695 B2
(45) Date of Patent: *Aug. 30, 2011

(54) WEB SERVICES ARCHIVE

(75) Inventors: Vladimir S. Savchenko, Sofia (BG);
Dimitrina Stoyanova, Elhovo (BG);
Dimitar V. Angelov, Montana (BG)

(73) Assignee: SAP AG, Walldorf (DE)

( * ) Notice: Subject to any disclaimer, the term of this patent is extended or adjusted under 35 U.S.C. 154(b) by 676 days.

This patent is subject to a terminal disclaimer.

(21) Appl. No.: 11/323,770

(22) Filed: Dec. 30, 2005

(65) Prior Publication Data
US 2007/0156859 A1 Jul. 5, 2007

(51) Int. Cl.
G06F 15/16 (2006.01)
G06F 7/00 (2006.01)
G06F 17/00 (2006.01)

(52) U.S. Cl. ........................................ 709/236; 707/661
(58) Field of Classification Search .......... 709/201–203, 709/217–219; 715/748–749
See application file for complete search history.

(56) References Cited

U.S. PATENT DOCUMENTS

| 5,404,470 | A * | 4/1995 | Miyake ........................ 712/217 |
| 6,023,684 | A * | 2/2000 | Pearson ....................... 705/36 R |
| 6,202,207 | B1 | 3/2001 | Donohue |
| 6,560,633 | B1 | 5/2003 | Roberts et al. |
| 6,604,113 | B1 | 8/2003 | Kenyon et al. |
| 6,856,995 | B1 * | 2/2005 | Ibitayo et al. ................. 717/116 |
| 6,947,943 | B2 | 9/2005 | DeAnna et al. |
| 6,954,792 | B2 | 10/2005 | Kang et al. |
| 6,985,939 | B2 | 1/2006 | Fletcher et al. |
| 7,028,223 | B1 | 4/2006 | Kolawa et al. |
| 7,123,980 | B2 * | 10/2006 | Funk et al. ..................... 700/121 |
| 7,127,700 | B2 | 10/2006 | Large |
| 7,159,224 | B2 | 1/2007 | Sharma et al. |
| 7,246,358 | B2 | 7/2007 | Chinnici et al. |
| 7,284,039 | B2 | 10/2007 | Berkland et al. |
| 7,296,022 | B2 | 11/2007 | Harjanto |
| 7,814,060 | B2 | 10/2010 | Stoyanova |
| 2002/0046239 | A1 | 4/2002 | Stawikowski et al. |
| 2002/0067370 | A1 | 6/2002 | Forney et al. |
| 2002/0178214 | A1 * | 11/2002 | Brittenham et al. .......... 709/203 |
| 2002/0184237 | A1 | 12/2002 | McFeely |
| 2003/0004746 | A1 | 1/2003 | Kheirolomoom et al. |

(Continued)

FOREIGN PATENT DOCUMENTS
EP 1387262 2/2004
(Continued)

OTHER PUBLICATIONS

Czajkowski et al., "The WS-Resource Framework, Version 1.0," xml(dot)coverpages (dot)org/WSRF-Overviewv10-20040305.pdf, Mar. 2004.*

(Continued)

Primary Examiner — Ashok B Patel
Assistant Examiner — Joseph Gazda
(74) Attorney, Agent, or Firm — Schwegman, Lundberg & Woessner, P.A.

(57) ABSTRACT

An Web service (WS) archive is described. The archive includes components that define and describe the deployable WS such as the implementation classes of the WS, the WSDL of the WS, and descriptors that provide more detail than what is described in a normal WSDL that are specific to the WS of the archive.

26 Claims, 38 Drawing Sheets

U.S. PATENT DOCUMENTS

| | | | |
|---|---|---|---|
| 2003/0014733 A1 | 1/2003 | Ringseth et al. | |
| 2003/0033369 A1 | 2/2003 | Bernhard | 709/203 |
| 2003/0055878 A1 | 3/2003 | Fletcher et al. | |
| 2003/0084056 A1* | 5/2003 | DeAnna et al. | 707/100 |
| 2003/0110242 A1 | 6/2003 | Brown et al. | |
| 2003/0110373 A1 | 6/2003 | Champion | |
| 2003/0126136 A1 | 7/2003 | Omoigui | |
| 2003/0191803 A1 | 10/2003 | Chinnici et al. | |
| 2003/0204612 A1 | 10/2003 | Warren | |
| 2003/0204645 A1 | 10/2003 | Sharma et al. | |
| 2003/0220925 A1 | 11/2003 | Lior | |
| 2003/0226139 A1 | 12/2003 | Lee | |
| 2003/0233477 A1 | 12/2003 | Ballinger | |
| 2004/0015564 A1* | 1/2004 | Williams | 709/219 |
| 2004/0015578 A1 | 1/2004 | Karakashian et al. | |
| 2004/0017392 A1 | 1/2004 | Welch | |
| 2004/0024841 A1 | 2/2004 | Becker et al. | |
| 2004/0030627 A1 | 2/2004 | Sedukhin | |
| 2004/0044656 A1 | 3/2004 | Cheenath | |
| 2004/0045005 A1 | 3/2004 | Karakashian | |
| 2004/0054969 A1 | 3/2004 | Chiang et al. | |
| 2004/0060057 A1 | 3/2004 | Hansen et al. | |
| 2004/0064554 A1 | 4/2004 | Kuno et al. | |
| 2004/0068554 A1 | 4/2004 | Bales et al. | |
| 2004/0088352 A1 | 5/2004 | Kurth | |
| 2004/0117733 A1 | 6/2004 | Moreau et al. | |
| 2004/0139151 A1 | 7/2004 | Flurry | |
| 2004/0149105 A1 | 8/2004 | Michalski | |
| 2004/0172441 A1 | 9/2004 | Beringer et al. | |
| 2004/0172555 A1 | 9/2004 | Beringer et al. | |
| 2004/0181537 A1* | 9/2004 | Chawla et al. | 707/100 |
| 2004/0194105 A1 | 9/2004 | Shenfield et al. | |
| 2004/0199636 A1 | 10/2004 | Brown et al. | |
| 2004/0199896 A1 | 10/2004 | Goodman et al. | |
| 2004/0202330 A1 | 10/2004 | Harvey et al. | |
| 2004/0205104 A1 | 10/2004 | Harvey et al. | |
| 2004/0213409 A1 | 10/2004 | Murto et al. | |
| 2004/0221017 A1 | 11/2004 | Yoon | |
| 2004/0243338 A1 | 12/2004 | Sabiers et al. | |
| 2004/0267927 A1 | 12/2004 | Davis et al. | |
| 2005/0015375 A1 | 1/2005 | Harjanto | |
| 2005/0015491 A1 | 1/2005 | Koeppel | |
| 2005/0038708 A1 | 2/2005 | Wu | |
| 2005/0080801 A1 | 4/2005 | Kothandaraman et al. | |
| 2005/0086664 A1 | 4/2005 | Sundaresan et al. | |
| 2005/0091087 A1 | 4/2005 | Smith et al. | |
| 2005/0096960 A1 | 5/2005 | Plutowski et al. | |
| 2005/0097178 A1 | 5/2005 | Bala | |
| 2005/0125524 A1 | 6/2005 | Chandrasekhar et al. | |
| 2005/0138041 A1 | 6/2005 | Alcorn et al. | |
| 2005/0251495 A1* | 11/2005 | Woollen | 707/1 |
| 2005/0278270 A1 | 12/2005 | Carr et al. | |
| 2005/0278417 A1 | 12/2005 | Fremantle et al. | |
| 2006/0015513 A1* | 1/2006 | Poyhonen et al. | 707/100 |
| 2006/0015625 A1 | 1/2006 | Ballinger et al. | |
| 2006/0029054 A1 | 2/2006 | Breh et al. | |
| 2006/0041636 A1 | 2/2006 | Ballinger et al. | |
| 2006/0173984 A1* | 8/2006 | Emeis et al. | 709/223 |
| 2006/0173985 A1* | 8/2006 | Moore | 709/223 |
| 2006/0190580 A1* | 8/2006 | Shu et al. | 709/223 |
| 2006/0200748 A1* | 9/2006 | Shenfield | 715/501.1 |
| 2006/0200749 A1* | 9/2006 | Shenfield | 715/501.1 |
| 2006/0206890 A1* | 9/2006 | Shenfield et al. | 717/174 |
| 2006/0236306 A1 | 10/2006 | DeBruin et al. | |
| 2007/0064680 A1* | 3/2007 | Savchenko et al. | 370/352 |
| 2007/0067388 A1 | 3/2007 | Angelov | |
| 2007/0067421 A1 | 3/2007 | Angelov | |
| 2007/0073221 A1* | 3/2007 | Bialecki et al. | 604/110 |
| 2007/0118844 A1* | 5/2007 | Huang et al. | 719/330 |
| 2007/0150546 A1 | 6/2007 | Karakashian et al. | |
| 2007/0156756 A1 | 7/2007 | Stoyanova | |
| 2007/0156872 A1 | 7/2007 | Stoyanova | |
| 2007/0174288 A1 | 7/2007 | Stoyanova | |
| 2008/0189713 A1 | 8/2008 | Betzler et al. | |

FOREIGN PATENT DOCUMENTS

| | | |
|---|---|---|
| EP | 1 566 940 | 8/2005 |
| EP | 1566940 A1 * | 8/2005 |
| WO | WO-03/073309 | 9/2003 |
| WO | WO 03/073309 * | 9/2003 |

OTHER PUBLICATIONS

Intel, "Intel Hyper-Threading Technology Technical User's Guide", Jan. 2003.*

Fielding et al., RFC 2616, "Hypertext Transfer Protocol—HTTP/1. 1", Section 9.3, Jun. 1999.*

Thomas Narten, "The Mechanics of Thread Switching", http://www.cs.duke.edu/~narten/110/nachos/main/node13.html, Feb. 3, 1997.*

"U.S. Appl. No. 10/749,700, Advisory Action mailed Sep. 12, 2008", 4 pgs.

"U.S. Appl. No. 10/749,700, Appeal Brief filed Nov. 25, 2008", 22 pgs.

"U.S. Appl. No. 10/749,700, Examiner's Answer mailed Feb. 23, 2009", 10 pgs.

"U.S. Appl. No. 10/749,700, Final Office Action mailed Jun. 27, 2008", 8 pgs.

"U.S. Appl. No. 10/749,700, Non Final Office Action mailed Feb. 5, 2008", 9 pgs.

"U.S. Appl. No. 10/749,700, Reply Brief filed Mar. 3, 2009", 7 pgs.

"U.S. Appl. No. 10/749,700, Response filed Apr. 30, 2008 to Non Final Office Action mailed Feb. 5, 2008", 11 pgs.

"U.S. Appl. No. 10/749,700, Response filed Aug. 25, 2008 to Final of Action mailed Jun. 27, 2008", 11 pgs.

"U.S. Appl. No. 11/232,660, Non Final Office Action mailed Dec. 22, 2008", 18 pgs.

"U.S. Appl. No. 11/232,660, Non-Final Office Action mailed Jul. 8, 2009", 13 pgs.

"U.S. Appl. No. 11/232,660, Response filed Mar. 20, 2009 to Non Final Office Action mailed Dec. 22, 2008", 11 pgs.

"U.S. Appl. No. 11/232,717, Non Final Office Action mailed Feb. 26, 2009", 18 pgs.

"U.S. Appl. No. 11/232,717, Response filed May 6, 2009 to Non Final Office Action mailed Feb. 26, 2009", 12 pgs.

"U.S. Appl. No. 11/322,567, Final Office Action mailed Oct. 27, 2008", 6 pgs.

"U.S. Appl. No. 11/322,567, Non Final Office Action mailed Dec. 31, 2007", 12 pgs.

"U.S. Appl. No. 11/322,567, Non-Final Office Action mailed Mar. 31, 2009", 22 pgs.

"U.S. Appl. No. 11/322,567, Response filed Jan. 27, 2009 to Final Office Action mailed Oct. 27, 2008", 8 pgs.

"U.S. Appl. No. 11/322,567, Response filed Jun. 19, 2009 to Non Final Office Action mailed Mar. 31, 2009", 9 pgs.

"U.S. Appl. No. 11/322,567, Response filed Jul. 28, 2008 to Non Final Office Action mailed Dec. 31, 2007", 12 pgs.

"U.S. Appl. No. 11/322,605, Final Office Action mailed Jun. 11, 2009", 20 pgs.

"U.S. Appl. No. 11/322,605, Non Final Office Action mailed Nov. 14, 2008", 26 pgs.

"U.S. Appl. No. 11/322,605, Response filed Mar. 13, 2009 to Non Final Office Action mailed Nov. 14, 2008", 11 pgs.

"U.S. Appl. No. 11/322,605, Response filed Aug. 11, 2009 to Final Office Action mailed Jun. 11, 2009", 12 pgs.

"U.S. Appl. No. 11/323,064, Final Office Action mailed Jun. 10, 2009", 16 pgs.

"U.S. Appl. No. 11/323,064, Non Final Office Action mailed Nov. 19, 2008", 17 pgs.

"U.S. Appl. No. 11/323,064, Response filed Mar. 18, 2009 to Non Final Office Action mailed Nov. 19, 2008", 12 pgs.

"U.S. Appl. No. 11/323,064, Response filed Aug. 7, 2009 to Final Office Action mailed Jun. 10, 2009", 11 pgs.

"Sun One Architecture Guide—Delivering on Demand", *Sun Microsystems, Inc.*, (2002), 185-186, 211.

Banerji, A., et al., "Web Services Conversation Language (WSCL) 1.0", *W3C Note World Wide Web Consortium*, URL http://www.w3.org/TR/wscl10/, (Mar. 2002).

Fielding, R, et al., "Hypertext Transfer Protocol—HTTP/1.1", ftp://ftp.isi.edu/in-noted/rfc2616.txt. (Jun. 1999), 1-196.
Nandigam, J., et al., "Semantic Web Services", *Journal of Computing Sciences in Colleges*, v.21 i.1, (Oct. 2005), 50-63.
Sun, "XML Servlet Schema 2.4", [Online]. Retrieved from the Internet: <URL: www.sun.com/xml/j2ee/web-app_2_4_.xsd>, (Aug. 5, 2004), 17 pgs.
"U.S. Appl. No. 11/232,660, Response filed Oct. 2, 2009 to Non Final Office Action mailed Jul. 8, 2009", 9 pgs.
"U.S. Appl. No. 11/232,717, Non-Final Office Action mailed Aug. 24, 2009", 17 pgs.
"U.S. Appl. No. 11/232,717, Response filed Nov. 11, 2009 to Non Final Office Action mailed Aug. 24, 2009", 9 pgs.
"U.S. Appl. No. 11/322,567, Final Office Action mailed Oct. 13, 2009", 13 pgs.
"U.S. Appl. No. 11/322,567, Response filed Dec. 8, 2009 to Final Office Action mailed Oct. 13, 2009", 11 pgs.
"U.S. Appl. No. 11/322,605, Non Final Office Action mailed Oct. 15, 2009", 28 pgs.
"U.S. Appl. No. 11/323,064, Non Final Office Action mailed Oct. 14, 2009", 20 pgs.
"U.S. Appl. No. 11/323,064, Non-Final Office Action mailed Oct. 14, 2009", 21 Pgs.
"U.S. Appl. No. 11/323,064, Response filed Jan. 5, 2010 to Non Final Office Action mailed Oct. 14, 2009", 14 pgs.
"IEEE 100 The Authoritative Dictionary of IEEE Standard Terms", *IEEE, 7th Ed*, (Dec. 2000), 101-102.
"Web Service Description Language (WSDL) 1.1", W3Cwww(dot)W3C(dot)orgITR/wsdlSection_2.1WSDL Document Structure, (Mar. 2001).
"U.S. Appl. No. 11/232,660, Final Office Action mailed Jan. 25, 2010", 14 Pgs.
"U.S. Appl. No. 11/232,717, Final Office Action mailed Jan. 25, 2010", 17 pgs.
"U.S. Appl. No. 11/322,567, Advisory Action mailed Dec. 16, 2009", 3 pgs.
"U.S. Appl. No. 11/322,567, Notice of Allowance mailed Feb. 22, 2010", 11 Pgs.
"U.S. Appl. No. 11/322,567, Response filed Jan. 13, 2010 to Advisory Action mailed Dec. 16, 2009", 9 pgs.
"U.S. Appl. No. 11/322,605, Response filed Jan. 14, 2010 to N", 16 pgs.
"U.S. Appl. No. 11/232,717, Advisory Action mailed Mar. 9, 2010", 3 pgs.
"U.S. Appl. No. 11/232,717, Response filed Feb. 24, 2010 to Final Office Action mailed Jan. 25, 2010", 11 pgs.
"U.S. Appl. No. 10/749,700, Advisory Action mailed Jul. 23, 2009", 3 pgs.
"U.S. Appl. No. 11/232,660, Non-Final Office Action mailed Jun. 10, 2010", 14 pgs.
"U.S. Appl. No. 11/232,660, Response filed Apr. 14, 2010 to Final Office Action mailed Jan. 25, 2010", 11 pgs.
"U.S. Appl. No. 11/232,717 Non-Final Office Action mailed Jul. 12, 2010", 19 pgs.
"U.S. Appl. No. 11/322,567, Supplemental Amendment and Figures mailed Jun. 15, 2010", 85 pgs.
"U.S. Appl. No. 11/322,605 Non-Final Office Action mailed Jul. 30, 2010", 24 pgs.
"U.S. Appl. No. 11/322,605, Final Office Action mailed Mar. 26, 2010", 25 pgs.
"U.S. Appl. No. 11/322,605, Response filed Jun. 15, 2010 to Final Office Action mailed Mar. 26, 2010", 12 pgs.
"U.S. Appl. No. 11/322,605, Supplemental Amendment and Figures mailed Jun. 17, 2010", 85 pgs.
"U.S. Appl. No. 11/323,064, Final Office Action mailed Apr. 15, 2010", 24 pgs.
"U.S. Appl. No. 11/323,064, Response filed Jun. 15, 2010 to Final Office Action mailed Apr. 15, 2010", 13 pgs.
"U.S. Appl. No. 11/323,064, Supplemental Amendment and Figures filed Jun. 17, 2010", 85 pgs.
Weerawarana, et al., "Web Services Platform Architecture", Prentice Hall, Chapter 7, (Mar. 22, 2005), 14 pgs.
Bussler, Christopher, et al., "A conceptual architecture for semantic web enabled services", Dieter Fensel, Alexander Maedche, ACM SIGMOD Record, v. 31 n.4, (Dec. 2002).
Dustdar, Schahram, et al., "A View Based Analysis on Web Service Registries", Martin Treiber, Distributed and Parallel Databases, v. 18 n.2, (Sep. 2005), 147-171.
Huhns, Michael N., et al., "Service-Oriented Computing: Key Concepts and Principles, IEEE Internet Computing", Munindar P. Singh, v.9 n.1, (Jan. 2005), 75-81.
Hull, Richard, et al., "Tools for composite web services: a short overview", Jianwen Su, ACM SIGMOD Record, v. 34 n. 2, (Jun. 2005).
Shepherd, George, et al., "Programming with Microsoft Visual C++Net, Microsoft Press Sixth Edition", (2003), 391-397, 771, 806-807, 820-826.
SUN.COM, "The J2EE Tutorial: Web Application Archives", http://java.sun.com/j2ee/tutorial/1_3-fcs/doc/WCC3.html, 4 pgs, (Nov. 4, 2008).
Bellwood, Tom, et al., "UDDI V3 Specification", (Jul. 19, 2002).
Berners-Lee, T., et al. N., "Uniform Resource Identifiers (URI) Generic Syntax", (Aug. 1998), 40 pages.
Bradner, S., "RFC 2119 (rfc2119): Key Words for use in RFCs to Indicate Requirement Levels", (Mar. 1997), 3 pages.
Bray, Tim, et al., "Extensible Markup Language (XML) 1.0 (Second Edition)", *W3C Recommendation*, (Oct. 6, 2000), 59 pages.
Christensen, E., et al., "Web Service Definition Language (WSDL)", (Mar. 15, 2001).
Fielding, R., et al. N., "Hypertext Transfer Protocol—HTTP/1.1", (Jun. 1999), 114 pages.
Freier, A., et al., "SSL Protocol V. 3.0 The SSL Protocol", (Mar. 1996), 3 pages.
Gudgin, M., "SOAP Version 1.2 Part 1: Messaging Framework", (Jun. 24, 2003).
Gudgin, M., et al., "SOAP Version 1.2 Part 2: Adjuncts", (Jun. 24, 2003).
Ingham, et al., "Supporting Highly Manageable Web Services",*Elsevier Science B. V.*, (1977), pp. 1405-1416.
Klensin, J. N., "Simple Mail Transfer Protocol", (Apr. 2001), 79 pages.
Knutson, Jim, et al., "Web Services for J2EE, Version 1.0", (Sep. 2002), 76 pages.
Litoiu, "Migrating to Web Services—Latency and Scalability", IEEE, (2002), pp. 1-8.
Newcomer, Eric, "Understanding Web Services: XML, WSDL, SOAP and UDDI", Indianapolis, IN: *Pearson Education, Inc.*, (2002).
Postel, J., et al. N., "File Transfer Protocol (FTP)", (Oct. 1985), 69 Pages.
Santesson, S., "Internet X.509 Public Key Infrastructure Subject Alternative Name for Expression of Service Name", (Aug. 2007), 10 pages.
Shannon, B., "Java 2 Platform Enterprise Edition Specification, v1.3", *Sun Microsystems*, (Jul. 2001), 161 pages.
Siddhartha, et al., "Web Services Interoperability: A Practitioner's Experience,", *Springer-Verlag Berlin Heidelberg*, (2002), pp. 587-601.
Sun Microsystems, "Building Web Services", *Sun One Studio 5 Programming Series*, (Jun. 2003), 214 Pages.
Sun Microsystems, "JAVA API for XML-based RPC JAX-RPC 1.1", *JSR-101*, (Oct. 14, 2003), 167 Pages, p. 31, 54.
Yang, et al., "The XML Cover Pages", *Westbridge Technology*, pp. 1-4, (Oct. 6, 2000).
"U.S. Appl. No. 11/232,660, Final Office Action mailed Nov. 4, 2010", 16 pgs.
"U.S. Appl. No. 11/232,660, Response filed Aug. 31, 2010 to Non Final Office Action mailed Jun. 10, 2010", 11 pgs.
"U.S. Appl. No. 11/232,717, Final Office Action mailed Nov. 15, 2010", 24 pgs.
"U.S. Appl. No. 11/232,717, Response filed Aug. 30, 2010 to Non Final Office Action mailed Jul. 12, 2010", 12 pgs.
"U.S. Appl. No. 11/322,567, Notice of Allowance mailed Aug. 3, 2010", 11 pgs.
"U.S. Appl. No. 11/322,605, Final Office Action mailed Dec. 9, 2010", 23 pgs.
"U.S. Appl. No. 11/322,605, Response filed Oct. 22, 2010 to Non Final Office Action mailed Jul. 30, 2010", 15 pgs.
"U.S. Appl. No. 11/323,064, Non-Final Office Action mailed Aug. 11, 2010", 21 pgs.

* cited by examiner

WEB SERVICES ARCHIVE

FIELD OF INVENTION

The field of invention relates generally to the software arts, and, more specifically, to a Web services archive.

BACKGROUND

Web Services

The term "Web services" is understood to mean a standards-based, service oriented architecture (SOA) than can be used to engage in business relationships (e.g., buying and selling) in a partially or wholly automated fashion over a public network such as the Internet ("the Web"). Standards bodies and interoperability organizations that have contributed to the Web services effort include the World Wide Web Consortium (W3C), the Organization for the Advancement of Structured Information Standards (OASIS), the Internet Engineering Task Force (IETF) and the Web Services Interoperability Organization (WS-I).

FIG. 1 shows a Web services model 100 that includes a registry 101, a service provider 102 and a service consumer 103. A service consumer 103, or "service requester", is generally understood to be an entity that seeks and (in cases where a suitable Web service is found) uses a particular Web service through a network 104. The registry 101 includes listings of various "available" services, and, may assist the service consumer 103 in searching for a suitable service provider based on the web servicing needs of the service consumer 103. A service provider 102 is the provider of one or more Web services that can be accessed over the network 104. Because of the vast expanse of the Internet and interest in automated business engagements, many registries, service consumers and service providers may be in operation at any instant of time.

Presently, the responsibilities of the most prevalent registry function 101 that is associated with the Web services effort are defined in various Universal Discovery, Description and Integration (UDDI) specifications provided by uddi.org. Besides providing listings of available services, a UDDI registry 101 may also make available to a service consumer 103 additional details that pertain to any particular Web service such as: 1) the location of the Web service (e.g., its uniform resource identifier (URI)) specified by a specific network destination address or name); 2) the capabilities of the Web service (e.g., specific methods that are supported by the Web service and that may be called upon by the service consumer), and, 3) communication semantics needed for invoking the Web service through the network 104 (e.g., the structure of a messaging format and/or protocol needed to properly communicate with the Web service).

According to one widely adopted approach, such "additional details" are described in Web Services Description Language (WSDL) text documents written in extensible Markup Language (XML). Here, for example, the registry 101 also maintains a WSDL document that describes the location, capabilities and communication semantics of the Web service for each Web service for which the registry 101 maintains a listing. Presently, a WSDL document for a particular Web service is expected to include an "abstract interface" description of the Web service (which includes the Web service's methods and the data passed between the Web service provider and Web service consumer) and a "concrete implementation" description of the Web service (which includes specific protocol and data format specifications for communicating with the Web service (referred to as a "binding") and the location of the Web service (referred to as a "port")).

According to another widely adopted approach, with respect to the actual communication that occurs between the service consumer 103 and the service provider 102, such communication is implemented through an exchange of Simple Object Access Protocol (SOAP) text messages written in XML. A SOAP message, is viewed as being contained within an envelope 105 that further contains a header 106 (which may be optional) and a body 107.

For a particular Web service, the header 106 is typically used to pass "control" information associated with the consumer's Web service engagement with the Web service provider (e.g., information used for performing encryption/decryption and/or signature checking, information used to ensure proper ordering of SOAP messages, information that identifies the ultimate destination of the SOAP message, etc.). The body 107 is used to pass more "substantive" information associated with the service consumer's Web service experience (e.g., a specific method call from the service consumer to the service provider, or, a specific response generated by the service provider in response to a specific method call).

Note that SOAP messages are typically deemed to be insensitive to the particular type of transport protocol used to transport them through the network 104. Thus, even though most SOAP messages may be appended with an HTTP header, a header specific to a different type of transport protocol (e.g., HTTPS, SMTP, etc.) could be appended to the SOAP envelope 105 instead (e.g., if the service provider, service consumer and/or intermediary nodes were adapted to use the different type of protocol).

In basic cases where a service provider 102 receives a SOAP message sent by a service consumer 103, or, where a service consumer 103 receives a SOAP message sent by a service provider 102, the body 107 of the SOAP message essentially represents the purpose of the communication between the service provider 102 and service consumer 103. For instance, in the case of a SOAP message being sent by a service consumer 103 and received by a service provider 102, the purpose of the SOAP message may be that the service consumer 103 desires that the service provider 102 perform a specific method. In this case, the body 107 of the SOAP message is apt to contain both a request to perform the specific method and any input parameters that are both needed by the method and determined by the service consumer 103.

Presently, largely because of its versatility, the SOAP message is regarded as a primary unit of information transfer between a service provider 102 and a service consumer 103 in a Web services environment. Here, unlike many other kinds of messaging protocols, existing SOAP message specifications define a format that is relatively "abstract" in terms of its content and/or organizational requirements. Essentially, it is believed that a relatively abstract messaging format definition lends itself to having the versatility needed to support business relationship models of all different kinds (e.g., in terms of business relationship type and procedure), which, in turn, represents an overarching design goal of those designing the Web services infrastructure.

Nevertheless, for many types of business relationships, too much abstractness may correspond to the absence of specific structure deemed necessary to implement a truly workable automated business practice. For instance, a significant number of business models are expected to require confidentiality and/or assurances as to whom its SOAP message oriented communication is being entertained between. A significant number of business models are also expected to require guarantees that received SOAP messages will be processed in a specific order. Further still, a significant number of business models may desire to have the end-to-end communication path between service provider and service consumer be supported by different types of transport protocols (e.g., a first leg that is transported by HTTP and a second leg that is transported by SMTP).

Returning briefly to the concept of versatility, however, note that it also expected that significant numbers of business models will not require one or more of the above described features. The Web services architecture has therefore evolved into a scheme that supports "extensions" to the SOAP messaging format that are available if desired, but, are not required to be SOAP compatible.

For instance, consistent with the description provided in the paragraph just above the immediately preceding paragraph: 1) a "WS-Security" extension has been defined that specifies information to be contained within a SOAP message header 106 if encryption/decryption and/or authentication procedures are to be performed upon a SOAP message; 2) a "WS-Reliable Messaging" extension has been defined that specifies information to be contained within a SOAP message header 106 if proper ordering of SOAP messages is desired; and, 3) a "WS-Addressing" extension has been defined that specifies information to be contained within a SOAP header 106 that describes the destination of the SOAP message in a transport independent fashion. Those of ordinary skill will recognize any additional features of the above described extensions as well as any other extensions that are presently in existence or may be in existence in the future.

Thus, in order to effect a particular Web services business relationship, those SOAP extensions deemed appropriate for the relationship are effectively implemented into the procedures of the relationship by enhancing the SOAP message header 106 with the corresponding information of each appropriate extension, and, any other SOAP extensions that are not deemed appropriate may simply be ignored (in which case no extension specific enhancement is made to the SOAP header 106). Likewise, in order to support the versatility of the Web services concept, yet provide for sufficient structure and definition of it's basic messaging format where appropriate, SOAP extensions are implemented in various combinations to effect a broad spectrum of different business relationship models that the Web services infrastructure is capable of supporting.

Prior Art Web Service Message Processing Runtime Framework

FIGS. 2 through 5 depict pertinent aspects of a prior art runtime framework for processing Web services messages. FIG. 2 shows basic structural aspects of the framework. FIG. 3 shows a basic method performed by the framework. The runtime framework is implemented in object-oriented software written in the Java programming language.

The runtime framework includes a runtime object 211 that essentially behaves as a manager for the overall process. The runtime object 211 calls upon, at appropriate instances, various other object-oriented structures in order to fully process a message. These various object-oriented structures include: 1) data that describes the applicable Web service in the form of web service data 413; 2) information specific to the particular process run being executed in the form of context 514; 3) a protocol stack 215 that contains the object-oriented program code for processing message header information; 4) an implementation container 219 that contains the object-oriented program code (in the form of a Java servlet or Enterprise Java Bean (EJB)) for processing message body (or "payload") information; 5) an implementation container manager 217 for providing an instance of the implementation container 219 to the runtime object 211; and, 6) a transport binding object 218 for orchestrating the conversion of the content of a message between its transported format (e.g., XML in the case of a SOAP message) and Java object form. A comment worth noting is that, as described in more detail below, the implementation container and implementation container manager are only instantiated on the service provider side. On the service consumer side, the implementation container is essentially replaced by the software running on the web service that is using the web service.

Three different transport binding objects were designed: 1) a SOAP transport binding for processing SOAP messages; 2) an HTTP transport binding for processing HTTP messages; and 3) a MIME transport binding for processing MIME messages. Those or ordinary skill will recognize that HTTP and MIME are typically regarded as "lower level" transportation technologies that can be used to "carry" a SOAP message. For example, a SOAP message may be instantiated in the payload of an HTTP packet. In this case, in order to process the complete message, the HTTP transport binding is used to perform HTTP related transport format conversion functions on the message and the SOAP transport binding is used to perform SOAP transport format conversion functions on the message.

Here, the transport format conversion functions performed by the transport bindings can generally be viewed as orchestrating the conversion of the content of a message between its format during transportation (e.g., XML in the case of a SOAP message) and the Java objects that are used by the runtime framework that contain such content. The conversion may also involve comprehending the packet structure of the transported message as well (e.g., understanding the structure of a SOAP message header and/or body in the case of a SOAP message). For simplicity, amongst the various transport bindings, the present discussion elaborates mostly on the use of the SOAP transport binding 218 (e.g., SOAP). Here, it is worthwhile to note that, amongst the structures observed in FIG. 2, only the transport binding object 218 in the SOAP format is specific to any particular messaging format. As such, the runtime framework as a whole is largely independent of message format type and is therefore capable of processing Web service messages for practically any message type (e.g., simply by introducing a transport binding specific to any particular, desired message type).

The prior art runtime framework is not only easily applied to any type of message format but is also largely independent of whether it is being implemented by a service provider or a service consumer. Here, the process performed by the runtime framework can largely be viewed as being responsible for: 1) processing a received message 222; and, 2) generating a response message 223 that is sent as a response to the received message. From this perspective, the process is easily extended to either provider-side or consumer-side Web service functions, because, in the case of a service provider, the "received message" is simply a message sent by a service consumer and the "response message" is simply a message generated by the service provider, while, by contrast, in the case of a service consumer, the received message is sent by a service provider and the response message is generated by the service consumer.

To be even more specific, referring briefly to FIG. 2, the protocol stack 215 corresponds to the program code used to: 1) process an object-oriented representation of the received message's header information; and, 2) generate an object-oriented representation of the header information for the response message. Moreover, the implementation container 219 contains the program code used to: 1) process an object-oriented representation of the received message's body; and, 2) generate an object-oriented representation of the body for the response message. Although different protocol stack program code and implementation container program code is appropriate as between a service provider and service consumer (e.g., because a service provider will generate "different" messages than a service consumer), the architecture of the prior art runtime framework is nevertheless largely indifferent as to whether its application is for service provider-side functions or service consumer-side functions.

Referring to FIGS. 2 and 3, the processing of a message begins after a lower level transport layer responsible for handling lower level communication with the sender of the message forwards the received message 222 to the runtime framework. Here, the transport layer passes a TransportID value 210 to the runtime object 211. The TransportID uniquely identifies the URI of the specific Web service provider or consumer to which the received message 222 is directed to, and, may have been included in a lower level transport layer header that was appended to the message as it traveled through the network (e.g., in the case of HTTP transport, the TransportID value 210 may be the URL of the Web service, found in the HTTP header that the received message 222 (e.g., SOAP message) is directed to).

A Web service data repository 212 that is available to the runtime object 211 is configured to maintain a unique collection of data for each Web service that the runtime framework of FIG. 2 is supposed to support (hereinafter referred to as a Web service's "Web service data"). FIG. 4 shows a depiction of the Web service data 413 that is maintained for a particular Web service. According to the depiction of FIG. 4, the Web service data 413 includes: 1) a listing of the various "protocols" (referred to as a "protocol stack") in the form of a protocol stack definition 420 that are respectively to be invoked when processing a message header for the particular web service (the protocols themselves are described in more detail further below with respect to the protocol stack 215 of FIG. 2 and process 303 of FIG. 3); and, 2) for service provider side implementations a listing 421 that includes an implementation container identity 422 of a "container" that contains the endpoint identified in FIG. 2 above (which is referred to as the implementation container 219) and an endpoint identity 423. For service consumer side implementations, implementation container identity 422 identifies the software thread, component or other entity running on the consumer side that is using the web service.

The web services data repository 212 may also be implemented as part of a Web services registry that contains WSDL documents describing each of the Web services that the prior art runtime framework is expected to support. Notably, the Web service data 413 that is maintained for each of the various Web services are different data structures than the WSDL documents that are maintained for each of the various Web services.

In response to the runtime object's reception of the TransportID value 210, the runtime object 211 forwards the TransportID value 210 to the web services data repository 212. The web services data repository 212 is configured to correlate a specific TransportID value to a specific Web service's Web service data 413, and, moreover, in response to its receiving of a TransportID value from the runtime object 211, return to the runtime object 211 the Web service data 413 for the Web service to which the TransportID corresponds. This process is generally depicted as process 301 in FIG. 3. Here, as part of the initial configuration of the prior art runtime framework, a particular Web service is identified with a particular URI (e.g., destination address (e.g., URL) or name).

After the runtime object 211 has access to the Web service data 413 for the Web service to which the received message 222 to be processed is directed, the runtime object 211 constructs (process 302) another collection of data, referred to as context 514, that acts as a kind of "scratch pad" for the runtime object 211 (and other structures such as the transport binding and endpoints) to store values to and retrieve values from as the prior art runtime framework runs though its processing routine.

Here, unlike the Web service data 413 maintained by the web services data repository 212, which can be viewed as a quasi-permanent description of the Web service that exists both before and after the processing applied to a particular message, the context 514, by contrast, can be viewed as data that pertains to the specific process run applied to a specific received and response message pair 222, 223. Better said, the Web service data 413 for a particular Web service is "re-used" each time a message is received for that Web service. By contrast, for each process run, a context 514 is newly created approximately at the beginning of the run and is later extinguished approximately at the end of the run.

FIG. 5 shows a depiction of the context 514 that is constructed by the prior art runtime framework. The context includes: 1) a received message object 520 that is essentially an object oriented representation of the received message; 2) a runtime counter 521 whose value essentially defines "where" the runtime process currently "is" amongst its various processes; 3) a web services data identity 522 that provides a reference to the applicable Web service data 413 (as discussed above with respect to FIG. 4) that is being used for the process run; 4) a response message object 529 that is essentially an object oriented representation of the response message (which does not begin to be defined until the endpoint method is performed); and, 5) a call runtime object 527 that includes method calls that are used by any of the protocols of the protocol stack 215 that need to invoke use of the runtime object 211.

With respect to the received message object 520, during the initial building of the context 514 (at process 302), the runtime object 211 calls upon the transport binding object 218 to generate the received message object 520. Here, as discussed above, the SOAP transport binding object 218 is an object that deals with the structure of a SOAP message, and, therefore, has access to the classfile needed to produce an object (e.g., received message object 520) whose organization and structure is patterned after the organization and structure of a SOAP message. During the initial building of the context 514 (at process 302), the received message object 520 that is loaded into the context 514 is akin to an "empty template" whose structure is consistent with a SOAP message (i.e., a header portion and a body portion) but whose substantive content is empty or "blank" (i.e., no specific items of data from the received message are in the message object 520). The message object also contains certain "readers" (or "parsers") and "writers" that, in the case of a SOAP message, are used by the transport binding object 218 to convert message content between XML and Java object form.

The runtime object next calls upon the received message object 520 to initiate its being loaded with the specific header information 523 that exists within the received message 222 (.e.g., SOAP message). In order to perform this "deserialization" process, the transport binding object 218 invokes the use of a Document Object Model (DOM) parser found within the received message object 520. A DOM parser creates a collection of "element" objects organized into a "tree", where, the element objects in the tree represent the elements in the parsed text document (in this case, the header portion of the received XML SOAP message), and, the structure of the tree (i.e., its branches and sub-branches) reflects the structure of the text document (e.g., a children element branches from its parent element). Essentially, the transport binding object 218 through its use of the DOM parser writes the various elements in the header portion of the received message 222 as a tree of object oriented DOM Elements within the header portion 523 of the message object 520.

Referring to FIG. 3, after the context 514 for the process run is created (process 302), including the building of the header portion 523 of the message object 520, the header information 523 taken from the SOAP message is processed (at process 303) by the stack of protocols 215 that are defined in the Web service data 413. A single protocol is essentially a body of object oriented program code whose purpose is to perform some kind of isolated, "control" operation on a received/response message pair, such as, processing a specific category of the received/response message's header information. With respect to the prior art runtime framework, there are three such protocols: 1) the WS-Security protocol; 2) the Headers protocol (used on the consumer side only); and, 3) the Message ID protocol.

The functionality of the WS-Security protocol was designed to be practically coextensive with the functionality introduced by the WS Security extension to the SOAP message format described in the preceding section (i.e., encryption/decryption and signature checking functions). The Headers protocol was designed to permit a consumer side endpoint and/or another protocol executed on the consumer side to: a) comprehend at least a portion of a received SOAP message's header information; and/or, b) write at least a portion of a response SOAP message's header information. The Message ID protocol was designed to provide (on the consumer side) and extract (on the provider side) a SOAP header element containing a UID value (similar to <wsa:MessageID> as described in the WS-Addressing specification).

In this regard, different combinations of protocols are used to implement customized SOAP message control treatment on a per Web service basis. For instance, if a first Web service requires some kind of security operation but does not require any comprehension/manipulation of a SOAP message header by the Web service's endpoint, the protocol stack for the first Web service would include the WS-Security protocol but not the Headers protocol.

As another example, if a second Web service does not require any kind of security operation but does require some kind of comprehension/manipulation of a SOAP message header by the Web service's endpoint on the consumer side, the protocol stack 215 for the second Web service on the consumer side would not include the WS-Security protocol but would include the Headers protocol. In this manner, by essentially granularizing various control operations into separate isolated protocols, customized control treatment can easily be effected on a per Web service basis simply by, for each Web service, combining those protocols corresponding to the Web service's desired control operations into the Web service's protocol stack 215.

Referring to FIGS. 2 and 3, the execution (at process 303) of the protocol stack 215 is sequential in the sense that, for example: 1) the first protocol 216_1 listed in the protocol stack 215 is executed; 2) then, the second protocol 216_2 listed in the protocol stack 215 is executed, . . . , 3) then, the last protocol 216_N listed in the protocol stack 215 is executed. Thus, the sequence of flow observed in a flow 224 corresponds to the protocol execution sequence when the header of a received message is being processed. The flow 224 may therefore be referred to as the "inbound" protocol execution flow 224. Note that, with the prior art runtime framework having only four protocols, N could be any number less than or equal to four.

As part of the generation of the response message that is sent in response to the received message (described in more detail further below), the protocol stack 215 is executed in the reverse order relative to the inbound flow 224 (as depicted by reverse or "outbound" process flow 225). In this case, execution of the protocol stack in the outbound flow 225 builds the header content of the response message.

The runtime object 211 is responsible for controlling the correct protocol execution sequence. Referring to inbound flow 224, the runtime object 211 refers to the protocol stack definition 420 in the Web service data 413 in order to identify the first protocol 216_1 in the protocol stack 215, and, sends a "HANDLE_REQUEST" command to the first protocol 216_1. If the first protocol 216_1 is able to properly execute its operation without any problems, the protocol 216_1 forwards a "NEXT" response to the runtime object 211. The NEXT response signifies to the runtime object 211 that the processing of the received message should proceed to the "next" protocol.

In this case, the runtime object 211 identifies the second protocol from the Web service data 413 and issues a HANDLE_REQUEST command to the second protocol 216_2. In cases where no problems arise, the process continues until the Nth protocol responds to its HANDLE_REQUEST command with a NEXT response. The runtime object 211 then continues with process 304.

In cases where a protocol discovers some kind of problem, a "BACK" response is sent to the runtime object 211 through the context 514. In a situation where a problem is discovered by a protocol, the first protocol to discover a problem builds (with a "token writer") a "fault" message body that addresses the problem for an outbound response message and, sends a "BACK" response to the runtime object 211 through the context.

The BACK response essentially triggers an outbound flow through the protocol stack 215 in reverse order relative to the inbound flow. For instance, if the third protocol in the inbound flow discovered a problem and responded with a BACK command, the runtime object 211 would send, through the context 514, a "HANDLE_RESPONSE" command to the second protocol in the protocol stack 215. The second protocol would then build its contribution to the header content for the response message. The process would then be repeated a final time for the first protocol. A response message 223 having the fault message body built by the first protocol and header content built by the second and first protocols would thereafter be sent to the service consumer.

Returning to the remainder of the process after successful execution through the protocol stack 215 in the inbound direction, the runtime object 211 next invokes the transport binding object 218 to assist in the determination of which "endpoint method" is appropriate for generating a response in object oriented form that is to be converted into the body of the response message sent to the service consumer.

The "endpoint" of a Web service provider is essentially the portion of the service provider's software that is responsible for, in acting as a Web service, taking appropriate action in response to the specific content contained within the body of a message that was sent by a service consumer (e.g., performing some act that the targeted Web service is supposed to perform (e.g., placing an order) and then generating an object oriented representation of the body of a "response" message that is to be sent to the service consumer). Thus, a Web service's substantive processes (i.e., those relating to the body of its messages) are essentially defined by its endpoint's methods. As mentioned above, in the prior art runtime framework, on the service provider side, a Web service's endpoint corresponds to a particular Java servlet or EJB (which may be designed to call upon "deeper/background" servlets/EJBs in order to fully implement its web servicing tasks). By contrast, on a service consumer side implementation of the runtime framework, the web service endpoint is implemented by the software running at the service consumer side that is using the Web service.

The transport binding object 218, as discussed above, is essentially an operative layer between: 1) the object-oriented environment used to apply the Web services processing to received/response message pairs; and, 2) the specific transported format of received/response message pairs. In this case, the ability of the transport binding 218 to determine the message body's content from its transported format is used to characterize the body of the received message as corresponding to a specific "message key" from amongst a collection of possible message keys (at process 304).

Here, a single Web service should be able to comprehend each of a number of different message bodies. For instance, in the case of a service provider, the service consumer is apt to send the Web service provider message bodies of differing content over the course of their engagement. According to the prior art runtime framework, each different type of message was given a "key" value that essentially corresponded to a unique name and namespace combination given to the particular type of message. Different keys were assigned for each message body type for each Web service supported by the runtime framework of FIG. 2. Thus, in principle, a unique key was given to each different type of message body that the runtime system might be asked to process over the course of its supporting the collection of Web service it was configured to support. The message key of a message body is determined from the types of elements that it contains.

In the prior art runtime framework, for each received message it is the duty of the transport binding object 218 to detect the specific message key that the body of the received message 222 corresponds to and a mapping registry 214 that was used to identify the appropriate endpoint method for the specific key. That is, the prior art runtime framework essentially contained a mapping 221 in mapping registry 214 between the various keys that the prior art runtime framework as a whole might identify, and, for each one of these keys, information concerning the specific method to be performed by the endpoint that the received message is targeted to. This information includes: 1) the name of the method; 2) the order and type of the objects that the method accepts as input parameters; 3) the type of object that the method returns; and, 4) the exceptions that the method may throw in the case of a fault condition. The transport binding 218 provides the mapping registry 214 with the key value that was detected from the body of the received message 222, and, in response, the mapping registry 214 returned the corresponding method specific information 305.

The proper handling of a received message involves some kind of processing that is performed by an endpoint in response to the received message body including the generation of a "response" message body that is sent to the service consumer as a response to the received message. In a service provider side implementation, along with the endpoint method information being provided (at process 305) to the transport binding object 218 by the mapping registry 214, the runtime object 211 also retrieves endpoint identity 423 and the implementation container identity 422 (i.e., the "implementation container") for the web service from the Web service data 413. As described in more detail below, the runtime object 211 uses the identities 422, 423 to respectively fetch both an instance of the implementation container 219 (at process 306) and the endpoint's classloader (at process 307). Recalling that a service provider side-endpoint in the prior art runtime framework is a Java servlet or EJB, the implementation container in the prior art runtime framework corresponds to either a J2EE Web container (if the endpoint is a servlet) or a J2EE EJB container (if the endpoint is an EJB).

As in known in the art of Java programming, a container is a type of platform that essentially defines the operating environment of the servlets or beans that it "contains". The platform or operating environment defined by a container is usually at least partially defined by a set of "services" (e.g., inter-bean/servlet messaging, database connectivity, etc.) that the various servlets or beans within the container may use (so that the expense of having the functionality built into the servlets/beans themselves is avoided).

The specific combinations as to which servlets are configured to operate into which Web container(s), and, which EJBs are configured to operate into which EJB container(s) are typically not determined until these various software components are actually "deployed" by a specific Web service provider. That is, different Web service providers may implement different numbers of containers, different container names and/or different container compositions even though the same core Web service runtime framework is being deployed.

Referring back to FIG. 4, as mentioned above, the Web service data 413 includes a listing 421 that includes the implementation container identity 422 and the endpoint identity 423 for the web service. Note that this listing 421 is not specified until the core Web service software has been deployed. The runtime object 211 refers to this listing 421 and provides an implementation container manager 217 with the implementation container identity 422 of the container. The implementation container manager 217 is a registry that, in response to its reception of the implementation container's identity, provides the runtime object 211 with a pointer to an interface to the implementation container 219. With the interface, the runtime object 211 can be said to possess an instance of the implementation container 219. The above description concerning the role of the implementation container and implementation container manager pertain to a service provider side implementation. By contrast, on a service consumer side implementation of the runtime framework, the web service endpoint is implemented by the software running on the service consumer side that is using the web service.

This software invokes the use of the Web service through an object oriented "proxy" for the Web service. Proxies are well understood in the art. A proxy is essentially part of an integrated application (in this case, the complete Web service as provided by the service provider including those portions of the provided Web service that are executed on the service consumer side) that is downloaded to a remote location (in this case, from the service provider to the service consumer) so that the remote location can call upon methods local to itself that pertain to the application. Here, the consumer side proxy is designed to accept a "request" message body from the consumer side endpoint along with a "send request" method call. In response, the proxy passes the "request" message body into the body 526 of the outbound response message object 529 within the consumer side framework and a "request" message is sent from the service consumer to the service provider. Here, the "request" message can be viewed as a response relative to the service consumer because (except for the first, initial message at the very beginning of the web service experience) the message body is essentially a response to an earlier received message from the service provider. Processing of received messages on the service consumer side merely involve passing a received message body up to the service consumer endpoint software through the proxy. For simplicity the remainder of this discussion will focus on the execution performed on the service provider side.

Returning then to a discussion of the process from the service provider side perspective, with an instance of the implementation container and with knowledge of the appropriate endpoint, the runtime object 211 next retrieves the endpoint's classloader (at process 307) from the implementation container 219 and provides it to the transport binding object 218. After the mapping registry 214 and the endpoint classloader have provided the information specific to the endpoint method, the transport binding object 218 creates instances of objects to be used as input parameters for the endpoint method. Essentially, the classloader is used to identify a class object for each input parameter object instance to be created. Each such class object is then used to create an "empty" input parameter object instance. Each empty input parameter instance is "filled" with appropriate input parameter information that the transport binding object 218 identifies from a token stream provided by a token reader that de-serializes the received message body (at process 308) from its XML format to an object oriented token format. The transport binding object 218 then provides the filled input parameter object instances to the context 514.

The de-serialization discussed just above is performed with an event based parser (also referred to as a "token reader") rather than a DOM based parser (as is used for the message header information as discussed above). Reasons for parsing the message body with an event based token reader rather than a DOM parser include: 1) the amount of message body information is usually much greater than the amount of message header information and event based parsers tend to be more faster and/or memory consumption efficient than DOM based parsers; 2) the information content within the message header is typically unordered (e.g., as opposed to the message body whose structure is typically strictly defined by an XML schema) and DOM based parsers are better suited for dealing with message content whose ordering is randomized. An event based parser scans a text document for structures that it is designed to recognize and raises an event each time it observes any such structure. Commensurate with the event is the presentation of an object oriented structure (referred to as a "token") that represents the structure discovered in the document. In the prior art runtime framework there existed two different "default" token readers for two different types of XML formatting: 1) BinaryXML; and, 2) XML 1.0.

The transport binding object 218, knowing the appropriate input parameters for the endpoint method as well as being designed to utilize the appropriate default token reader, processes the token reader's output token stream and fills the endpoint method input parameter objects with appropriate information. The input parameter objects for the endpoint method are then passed from the transport binding object 218 to the context 514. The runtime object 211 subsequently reads the input parameters and invokes the endpoint method (which includes the input parameter object(s) provided by the transport binding object 218) through the implementation container interface (at process 309).

The endpoint performs whatever Web service processing flows from the method invocation, and returns to the context 514 an object that contains the body 526 for the response message object 529. The body 526 is contained by a response message object 529 that was earlier provided to the context 514 by the transport binding object 218. The response message object 529 essentially represents the response message in object-oriented form (similar to the received message object 520).

The runtime object 211 then invokes the transport binding object 218 to "serialize" (at process 310) the body 526 body into an XML SOAP message body for the actual response message 223. Here, the transport binding object 218 uses a token writer that coverts elements of the body 526 into XML content that corresponds to the body of the actual response message 223. The runtime object 211 also invokes the protocol stack 215 in the "outbound" flow direction 225 to build the response message's header information 528 as a DOM tree within the response message object 529. The transport binding object 218 then uses a DOM writer to serialize the object-oriented DOM tree into an XML SOAP message header for the response message object 529. The response message 223 is then complete and is thereafter sent through a lower level transport service.

BRIEF DESCRIPTION OF THE DRAWINGS

The present invention is illustrated by way of example, and not limitation, in the figures of the accompanying drawings in which like references indicate similar elements and in which.

SUMMARY

An Web service (WS) archive is described. The archive includes components that define and describe the deployable WS such as the implementation classes of the WS, the WSDL of the WS, and descriptors that provide more detail than what is described in a normal WSDL that are specific to the WS of the archive.

DETAILED DESCRIPTION

Improvements Over the Prior Art Message Processing Runtime Framework

Figure 6:
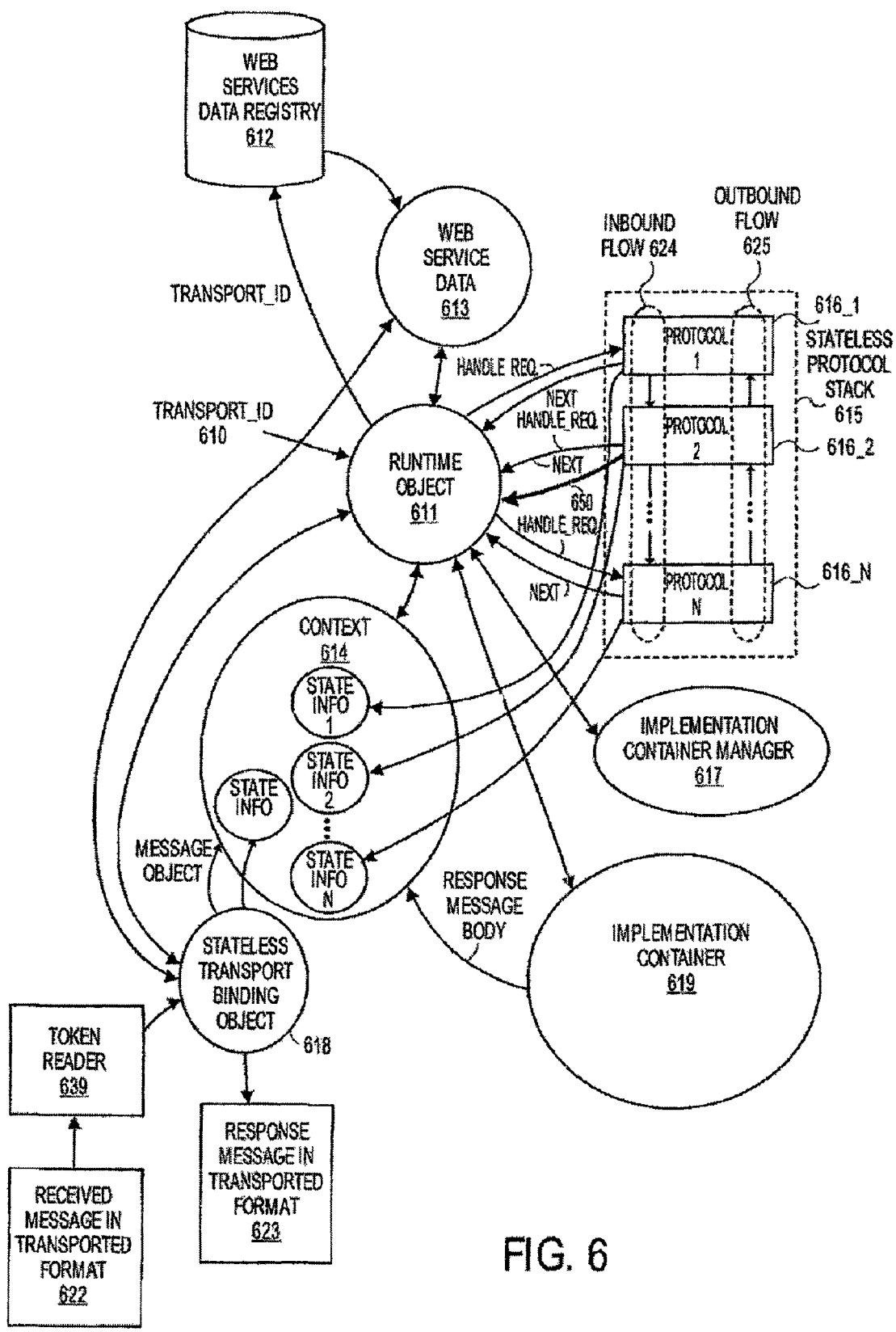
FIG. 6 shows an improved Web services message processing runtime framework.
Figure 7:
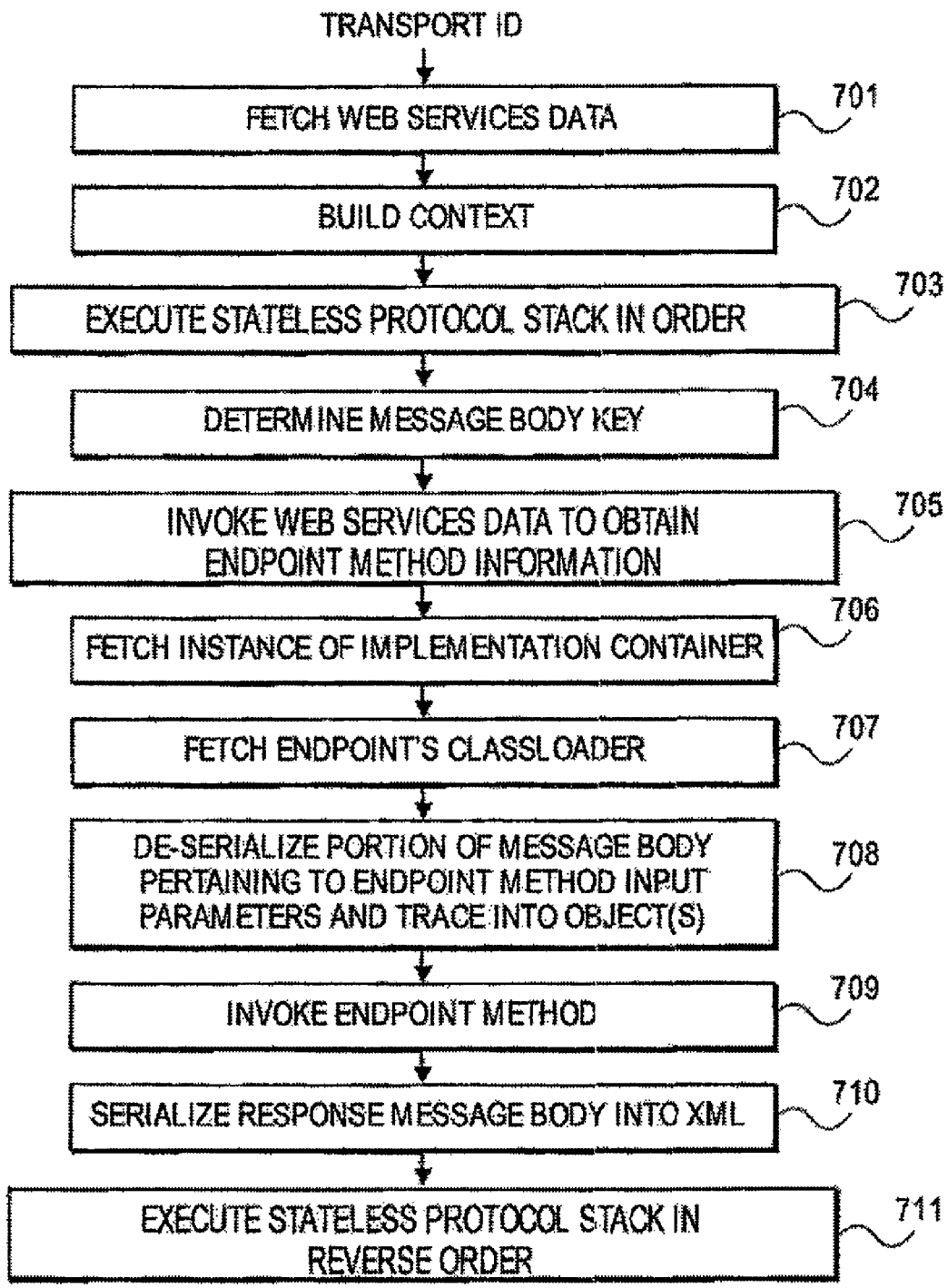
FIG. 7 shows a method that the improved runtime framework of FIG. 6 is designed to execute.

FIGS. 6 and 7 show a message processing runtime framework and method respectively that contain improvements over the prior art runtime framework. At a high level, three significant improvements can be readily identified: 1) elimination of the mapping registry 214; 2) elimination of the context as a communicative intermediary between the protocols and the runtime object 211; and, 3) re-design of the protocols from being "state-full" (as in the prior art runtime framework) to being "state-less". Each of these improvements are discussed in secession in more detail just below.

Before discussing these improvements in more detail, however, it is important to recognize that aspects of the prior art runtime framework and/or the prior art runtime framework as whole can easily be extended to operating environments other than a Java object-oriented environment in which endpoint functionality is implemented as Java servlets and EJBs within J2EE containers. To first order, other types of program code may be used instead of Java servlets or EJBs. A servlet is essentially Java bytecode associated with a Java "page" (e.g., a Java Server Page (JSP)) that enables the execution of functions from the page (such as the handling of HTTP requests). Other types of pages and/or associated code are possible such as CGI scripts, Active Server Pages (ASPs), ASP.NET and proprietary C/C++ plug-ins for specific Web servers (e.g., ISAPI, NSAPI) and derivatives therefrom.

Also, EJBs are recognized as being the "components" within a component based architecture environment that is specific to Java. Component based software environments use granules of software (referred to as "components" or "component instances") to perform basic functions. The functional granularity offered by a plurality of different components provides a platform for developing a multitude of more comprehensive tasks. Some examples of component based architectures besides J2EE include Common Object Request Broker Architecture (CORBA), Component Object Model (COM), Distributed Component Object Model (DCOM) and .NET.

The runtime environment can also be easily extended to environments other than Java (e.g., J2EE) such as .NET, LAMP, etc. Like the prior art runtime framework, the improved runtime framework is not only easily applied to any type of message format but is also largely independent of whether it is being implemented by a service provider or a service consumer.

Figure 4:
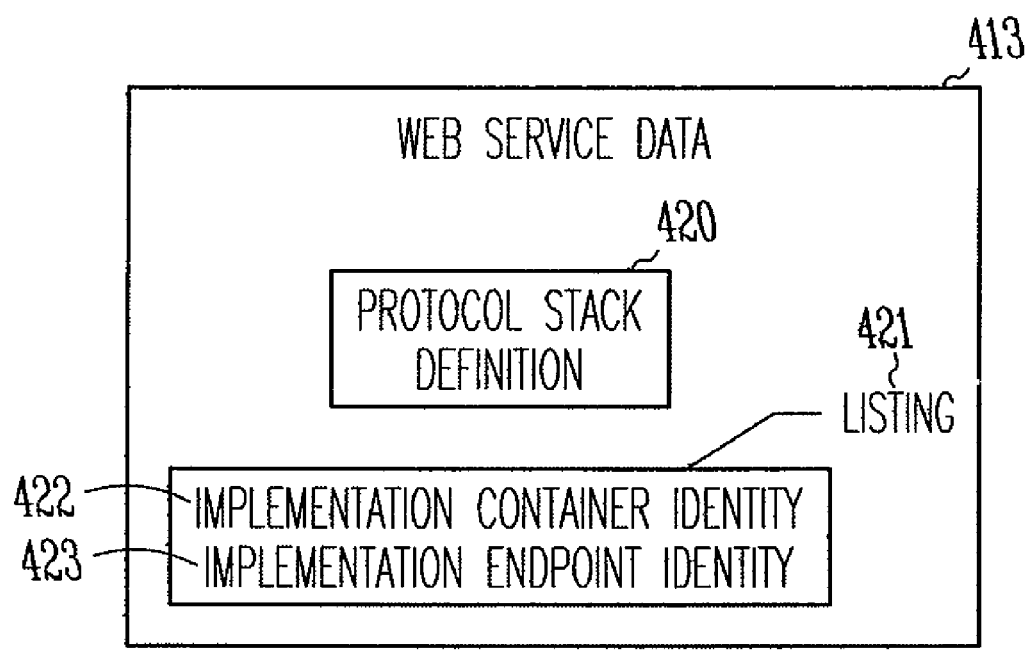
FIG. 4 shows Web services data used by the runtime framework of FIG. 2 to describe a particular Web service (prior art)

Turning then to the improvements made over the prior art runtime framework, the elimination of the mapping registry 214 is effected by incorporating the mapping data that is specific to a particular Web service into the Web service's own Web service data. Comparison of FIG. 8 with FIG. 4 clearly demonstrates the difference. Here, message key to endpoint method mapping information 821 is observed in the improved Web service data 813 of FIG. 8, but, is not observed in the prior art Web services data 413 of FIG. 4.

Figure 8:
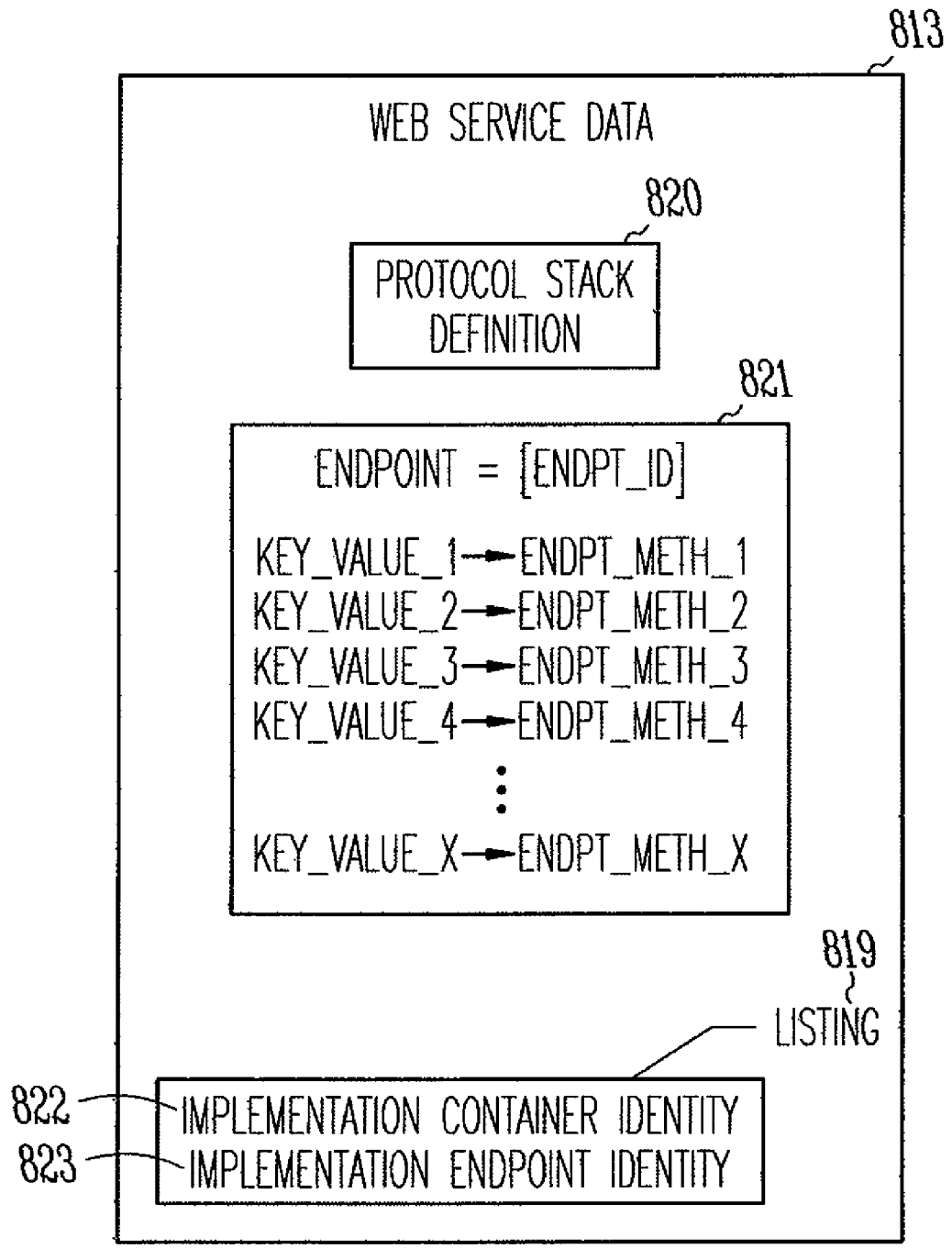
FIG. 8 shows Web services data used by the runtime framework of FIG. 6 to describe a particular Web service.

In operation, referring to FIGS. 6, 7 and 8, after the transport binding object 618 has identified the appropriate key value for the body of the received message (at process 704), instead of invoking the use of a mapping registry 214 (as is shown on FIG. 2) (as in the prior art), the runtime object 611 consults (at process 705) the Web service data 613 with the key value to obtain endpoint method information. Here, in an embodiment, the mapping information 821, as shown on FIG. 8, for a Web service contains a mapping between each possible message key (which, in turn, corresponds to each possible type of message) that the specific Web service may be asked to respond to and information describing the specific endpoint method that is to be executed in order to respond to the message (e.g., 1) the name of the method; 2) the order and type of the objects that the method accepts as input parameters; 3) the type of object that the method returns; and, 4) the exceptions that the method may throw in the case of a fault condition).

Elimination of the mapping registry 214 improves performance because, like the web services data repository 212, the mapping registry 214 was implemented with some form of persistence layer that induced some degree of delay (e.g., waiting for other processes to finish their access to the registry, propagation delay over a network where the registry is implemented as a remote database, etc.). By incorporating the message key-to-endpoint method information mapping into the Web services data 613, the mapping information for the Web service may be accessed more quickly by being cached along with the Web service data 613. From the perspective of an enterprise software developer, to say something is "cached" typically means that it is stored within a computer's "memory" (such as its system memory or a processor's local (typically on-chip) cache) rather than a slower persistence layer such as a hard disk file or remote database.

Figure 1:
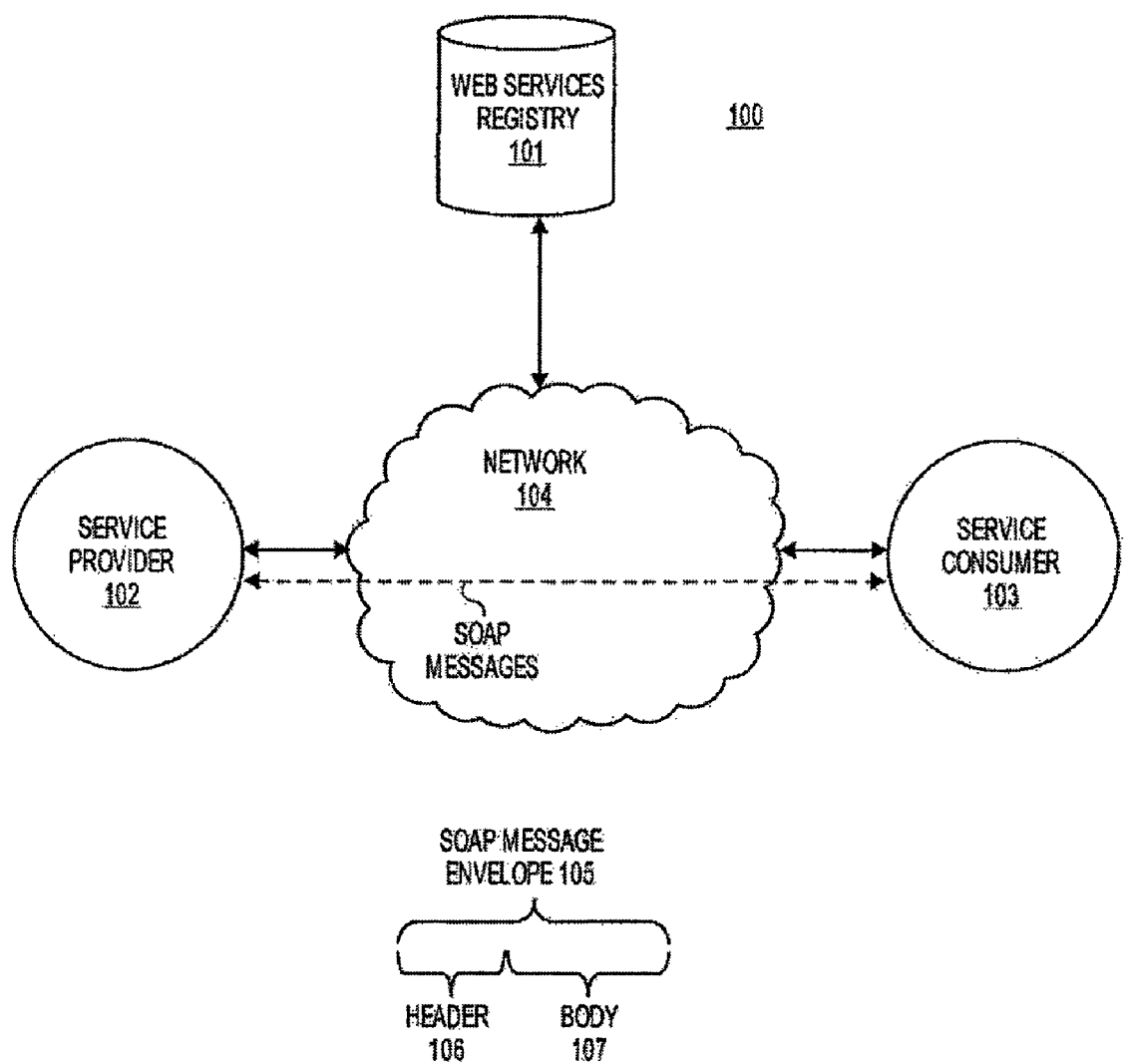
FIG. 1 shows a Web services model (prior art)
Figure 2:
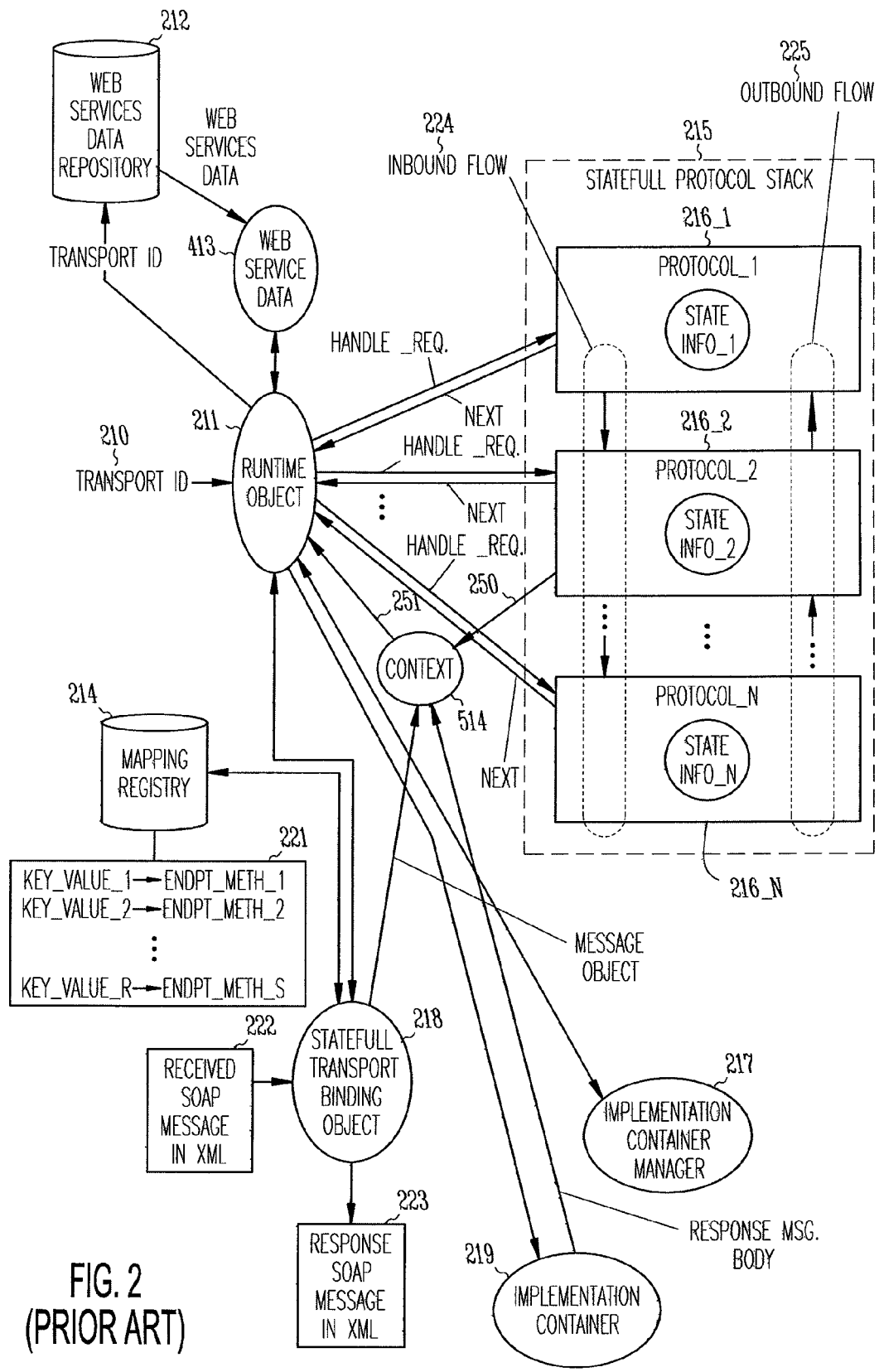
FIG. 2 shows a prior art Web services message processing runtime framework (prior art)
Figure 3:
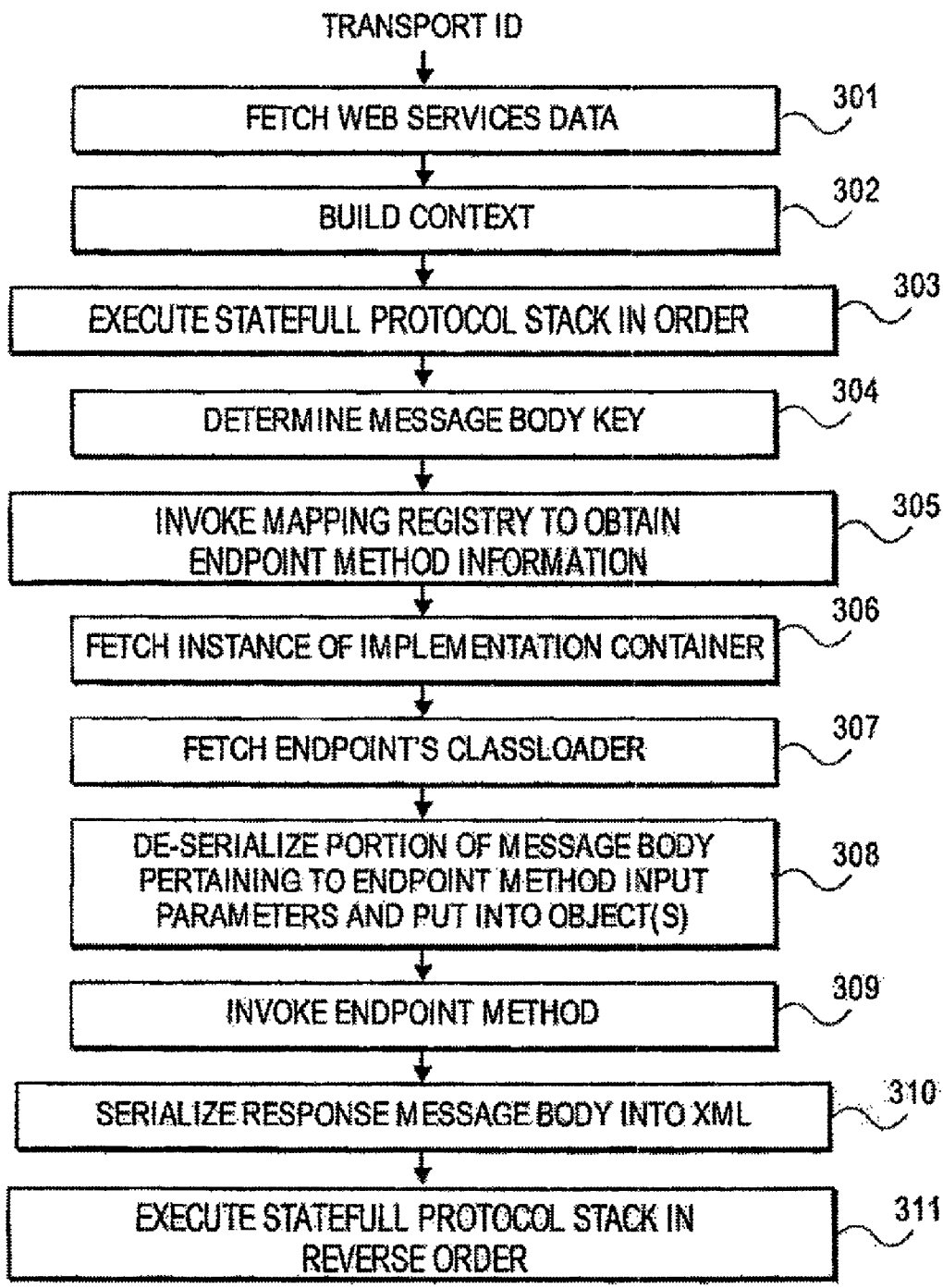
FIG. 3 shows a prior art method that the prior art runtime framework of FIG. 2 is designed to execute (prior art)
Figure 5:
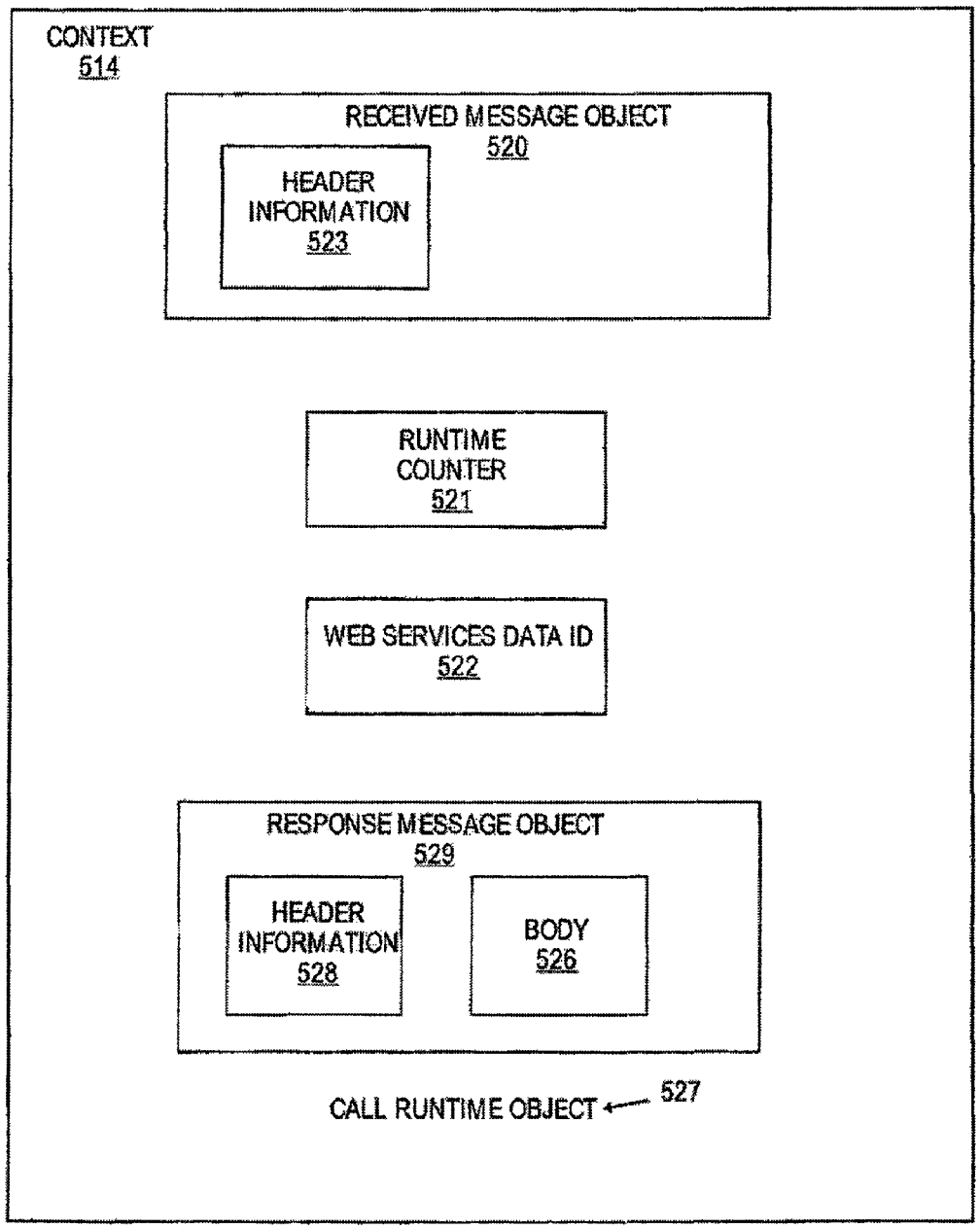
FIG. 5 shows context information used by the runtime framework of FIG. 2 to describe a particular message reception/response cycle (prior art)

With respect to the second improvement over the prior art runtime framework, the elimination of the context as a communicative intermediary between the protocols, note that FIG. 2 shows an "in-direct" method invocation 250, 251 being made upon the runtime object 211 by protocol 216_2 through the context 514. That is, the invocation 250, 251 is indirect because it is made through the context 514 (for which the call runtime object 527 (e.g., method) offered by the context 514 of FIG. 5 was used). A protocol may need to invoke the runtime object 211, for instance, to identify the location of the Web services data 413 or another protocol.

By contrast, referring to FIG. 6, the improved runtime framework has been designed to permit a protocol to invoke the runtime object directly 611. Essentially, the prior art runtime framework was designed with the viewpoint that the context 514 would be the primary interface between the protocols and the remainder of the runtime framework so that the protocols and runtime framework could be redesigned as needed in future releases while still maintaining downward compatibility (e.g., an old protocol could still properly work with a new runtime object). However, because of the inefficiencies associated with in-direct communication from a protocol to the runtime object, direct communication is embraced in the new design. Downward compatibility is expected to be maintained by preserving legacy methods in the runtime object in its future releases.

With respect to the third improvement over the prior art runtime framework, the redesign of the protocols from being "state-full" to "state-less", generally, the execution of software code typically involves the assignment of specific values to certain variables. Software state information is basically viewed as any of these specific values as they exist at a specific moment during the software code's execution. State-full program code is software code that is designed to keep its software state information. State-less program code is software code that does not keep software state information (e.g., its coded methods are "fixed" so as to be incapable of comprehending any kind of "variable" information, or, the program code is configured to store its state information externally from itself (e.g., from a memory region reserved for the program code) or at least be able to have its state information externally stored from itself).

In the prior art framework, because the protocols were state-full, the protocols could not easily change their internal state from one received/response message pair process run to another. As such, once a protocol instance was directed to the servicing of a particular received/response message pair, that protocol instance could not be reapplied to another message pair (at least until its servicing of the first received/response message pair was complete). Thus, if ten separate processing runs were concurrently executed to simultaneously process ten different received/response message pairs, and, if each of these processing runs needed to use the "same" protocol (e.g., the WS-Security protocol), then, ten separate instances of this protocol had to be created (e.g., ten separate instances of the WS-Security protocol were created). Unfortunately, each instance of a protocol consumes its own associated portion of memory. For example, in the case of Java, each instance of a program is given its own region of memory for instance specific data that is used by the program's bytecode instructions. Thus, in the prior art approach, each time a new process run was started, a significant block of memory was reserved in order to "make room" for each of the protocol instances within the process's protocol stack. This hampered scalability/performance of the prior art runtime framework because "too many" concurrently attempted process runs resulted in too much memory being consumed.

State-less protocols, by contrast, can easily change their internal state from one process to another process. As such, a single protocol instance can more readily handle the processing for multiple, concurrently processed message pairs. As a comparison, recall that, in the prior art framework, ten concurrently processed received/response message pairs that used the same state-full protocol required the creation of ten separate instances of that state-full protocol. By contrast, in the improved framework, ten concurrently processed received/response message pairs that need to use the same protocol can be serviced with only one instance of a state-less version of that protocol. Essentially, in order to do this, at least in a Java environment, the single state-less protocol instance has data pertaining to a first particular message pair process run loaded into its reserved memory region. The state-less protocol executes its instructions, and then (e.g., after the execution of its instructions are finished), externally saves (as "state" information) data from its memory region into the first process's context. Then, the same state-less protocol instance can have data pertaining to a second process loaded into its memory region and the process repeats. Conceivably, a single state-less protocol instance could handle a "second" received/response message pair process run between its inbound flow handling and its outbound flow handling of a "first" received/response message pair process run. Because of the ease at which their internal state can be changed so as to apply to different processes, state-less protocols are also capable of supporting "hibernation", which, as elaborated on in more detail below, permits the improved framework to entertain the WS-Reliable Messaging protocol (which the prior art runtime framework did not support).

Here, recall from the discussion provided in the Background sub-section entitled "Web Services" that, at least in the context of SOAP messages, extensions have been built into the message format definition to account for certain business relationship behaviors that may desire them. Recall in particular that one such extension, referred to as the "WS-Reliable Messaging" extension has been defined that provides for proper ordering of SOAP messages at the SOAP message layer (i.e., "on top of" any underlying transport layer or protocol such as HTTP, TCP, etc.).

A basic upgrade to the prior art runtime framework would entail the development of another protocol that is designed to effect the WS-Reliable Messaging extension at least by keeping track of the proper order of received SOAP messages, and, properly re-arranging the order of a group of received SOAP messages that arrived "out of order" before they were processed by the appropriate endpoint. FIG. 6 shows a scheme for implementing such a protocol.

Figure 10:
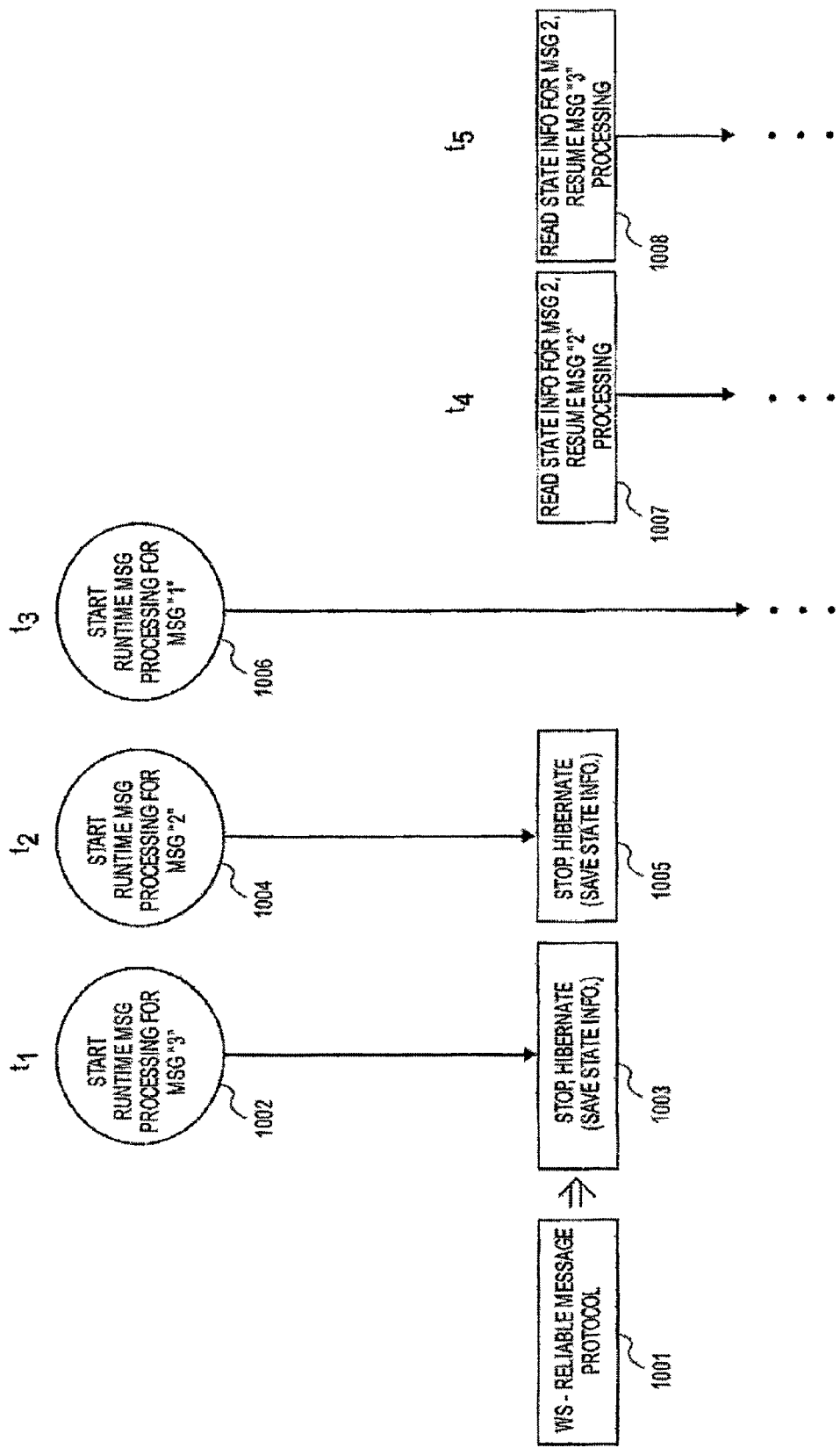
FIG. 10 shows a hibernation process that is supported by the runtime framework of FIG. 6.

FIG. 10 shows exemplary processing performed by a WS-Reliable Messaging protocol 1001 for a Web service having three messages that arrive "out of order". According to the example of FIG. 10, first, "message 3" arrives, then, "message 2" arrives, then, "message 1" arrives. That is, the ordering of the messages in their arrival is 3,2,1- and—the "proper" order should have been 1, 2, 3. According to the example of FIG. 10, the runtime object commences processing (1002) for the first message to arrive (message 3) at time t1.

Because the protocol stack for the Web service is responsible for executing the received message's header information, it is not recognized that message 3 corresponds to an "out of order" message until the WS-Reliable Messaging protocol 1001 in the Web service's protocol stack executes. During the execution of the WS-Reliable Messaging protocol 1001 for message 3, the protocol 1001 discovers that message 3 is out of order, and, places the message processing run for message 3 into "hibernation" 1003. A stateless protocol program code instance that can externally store its state information is able to easily hibernate a message processing run by externally storing its state information so as to suspend its execution for the processing run. Then, sometime after the hibernation, the protocol program code instance can seamlessly continue the message processing run as of the moment it was hibernated by reading the stored state information back into itself and restarting execution. Importantly, the protocol program code instance itself need not be suspended too. Once the state information for a particular received/response message pair is saved, the instance of program code can be re-applied to work on another message processing run. Continuing with the example, sometime after time t1, the runtime object commences processing 1004 for the second message to arrive (message 2) at time t2.

During the processing of message 2, the WS-Reliable Messaging protocol for the Web service discovers that message 2 is also out of order, and, also places the processing for message 2 into hibernation 1005 (by externally saving its state information). Sometime after time t2, the runtime object commences processing 1006 for the third message to arrive (message 1) at time t3. Because message 1 is the appropriate "next message to be processed", the WS-Reliable Messaging protocol 1001 does not recognize any problem and permits the message processing for message 1 to continue. The WS-Reliable Messaging protocol 1001 also causes the hibernated processes for messages 2 and 3 to be restarted such that the processing for message 2 resumes 1007 (at time t4) before the processing for message 3 resumes 1008 (at time t5). Here, the restarting of the processes for each of messages 2 and 3 involves the reloading of their respective state information into the protocol 1001 (e.g., just before time t4 for message 2 and just before time t5 for message 3).

Figure 11:
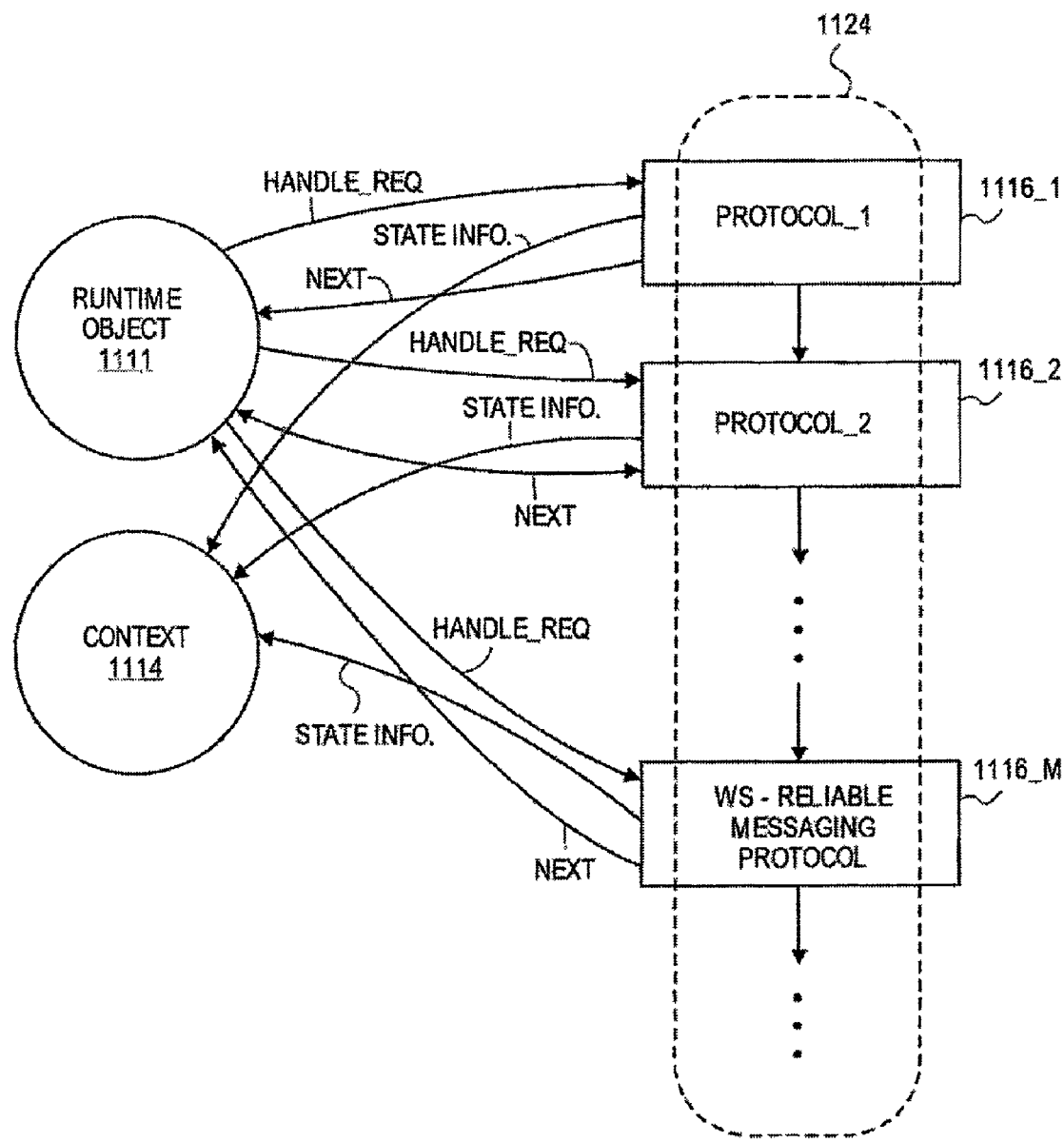
FIG. 11 shows protocols within a protocol stack externally storing their state information into a message reception/response cycle's context.

With these concepts in mind, FIG. 11 shows a new protocol stack inbound process flow 1124. According to the depiction of FIG. 11, the first protocol 1116_1 receives a HANDLE_REQUEST command from the runtime object 1111, and, commensurate with (e.g., just prior to) the first protocol 1116_1 providing the runtime object 1111 with a NEXT response to confirm its successful execution, the first protocol 1116_1 stores its state information into the process run's context information 1114. This procedure continues at least for each subsequent protocol that precedes the WS-Reliable Messaging protocol (depicted in FIG. 11 as protocols 1116_2 through 1116_M), and, may continue for any protocol that follows the WS-Reliable Messaging protocol in the protocol stack's inbound flow 1124.

Figure 9:
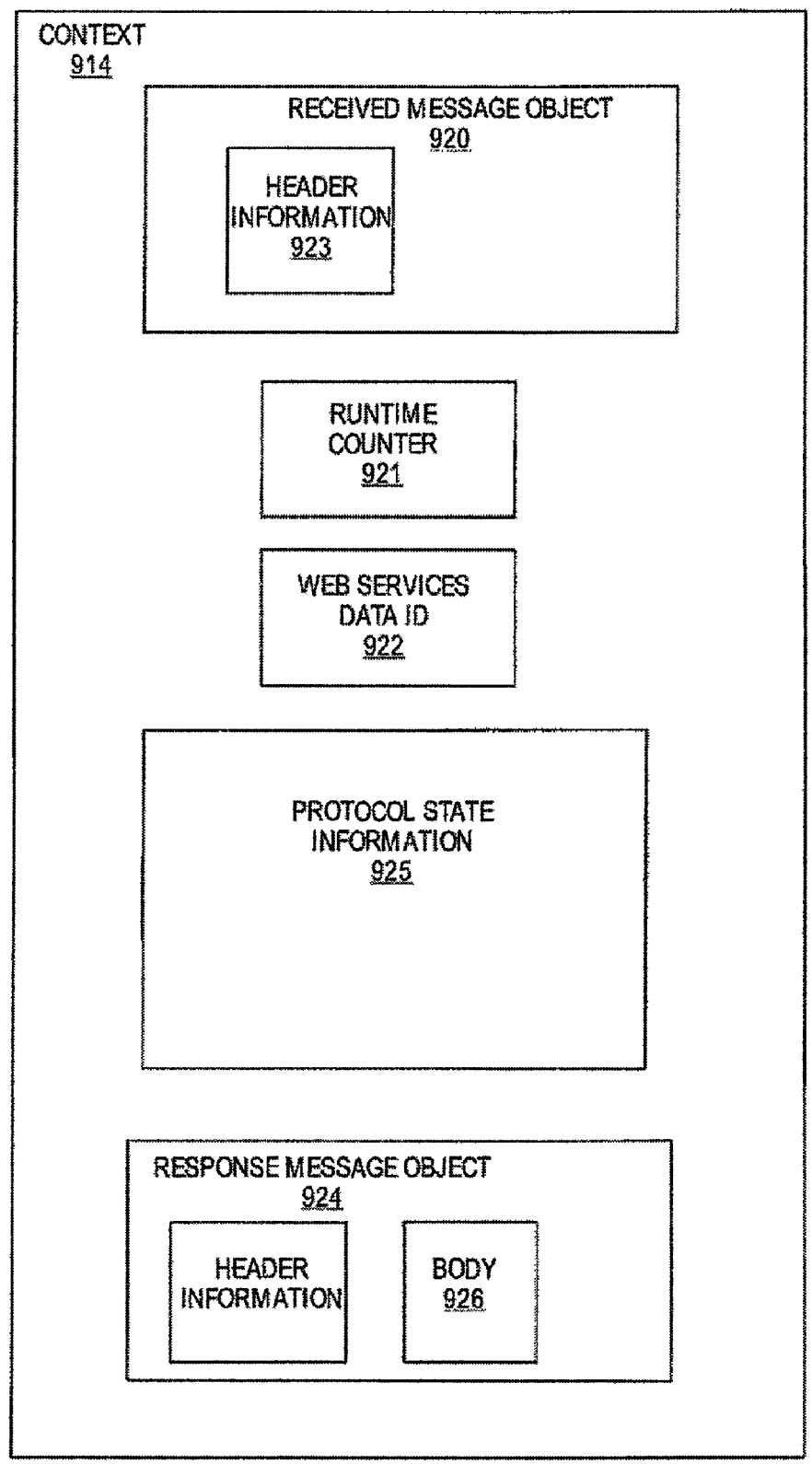
FIG. 9 shows context information used by the runtime framework of FIG. 6 to describe a particular message reception/response cycle.

FIG. 9 shows new information in the form of context 914 that supports the processing described above. Note that unlike the prior art context information 514 depicted in FIG. 5, the context 914 depicted in FIG. 9 includes protocol state information 925. In an implementation, the protocol state information 925 can be saved in the context 914 as serialized information (e.g., a byte array, a string, etc.) in order to promote its ability to be persisted (e.g., written to a deeper form of storage than cache or local memory such as hard disk file, a database, etc.) during hibernation.

Note that even though the "WS-Reliable Messaging" title is recognized as being pertinent to a SOAP message format extension, is believed that the concepts outlined above could conceivably be applied to messages that are not regarded as SOAP messages. The term "reliable messaging protocol" is therefore intended not to be restricted solely to protocols that only contemplate SOAP messages. A description of the WS-Reliable Messaging protocol is described in more detail immediately below.

It is believed that the runtime framework herein described may be used with subsequent revisions of the existing common WS specifications, including, but not limited to, WS-Reliable Messaging, WS-Security, and WS-Addressing.

WS Reliable Messaging Protocol

Transactions across a network (including local area networks (LANs) and the Internet) from a source endpoint to a destination endpoint may be disrupted including messages being lost, corrupted, duplicated, and/or received out-of-order. While the factors causing these disruptions are beyond the scope of this document these disruptions still need to be handled effectively and efficiently in Web services systems. A standard Web Services Reliable Message Protocol specification (WS-ReliableMessaging) has been authored to fulfill these needs and serves as a building block for varying Web services implementations. In addition to providing for reliable message transactions, the WS-Reliable Messaging specification allows for different Web services implementations to interact with each other (for example, this allows for communication between J2EE implementations and .NET implementations). As of the time of this writing, the complete common WS-ReliableMessaging specification can be found at http://specs.xmlsoap.org/ws/2005/02/rm/.

During execution of any WS-ReliableMessaging protocol an identifier for the group of messages to be transmitted between the source and destination is applied to each message. This identifier is referred to as the sequence identifier (sequence ID). The sequence ID uniquely identifies the group of messages transactions. The sequence ID is used because at any given point in time an endpoint may have more than one group of messages being received or sent. Almost all of the messages transmitted using WS-ReliableMessaging use a sequence identifier (the exception being the first message sent from the source which requests a sequence ID from the destination). Each reliable message sent from the source also includes a message (or sequence) number. This number is used to determine what order of the messages received should be in and/or to determine if all of the messages have been received. Messages are sent one at a time from the source to the destination endpoint.

A few conditions are to be adhered to according to the current common specification. These conditions include: 1) the source must have an endpoint reference that uniquely identifies the destination endpoint; 2) the source must have knowledge of the destination's policies and be capable of adhering to these policies; 3) if secure exchange is required, both the source and destination must have the appropriate security capabilities; 4) the source must assign each reliable message a sequence number; and 5) every acknowledgement issued by the destination must include a sequence number range of every message successfully received and exclude sequence numbers not yet received.

As described above, the state-less reliable messaging protocol has a standard interface that essentially "hides" from other applications the changes to the content of the WS-ReliableMessaging specification information that may evolve over time. That is, the state-less reliable messaging protocol may be re-designed if necessary to adapt to changes made to the applicable specifications that define the content of the WS-ReliableMessaging common specification, while, maintaining at the interface methods that may be invoked by legacy software applications.

Figure 12:
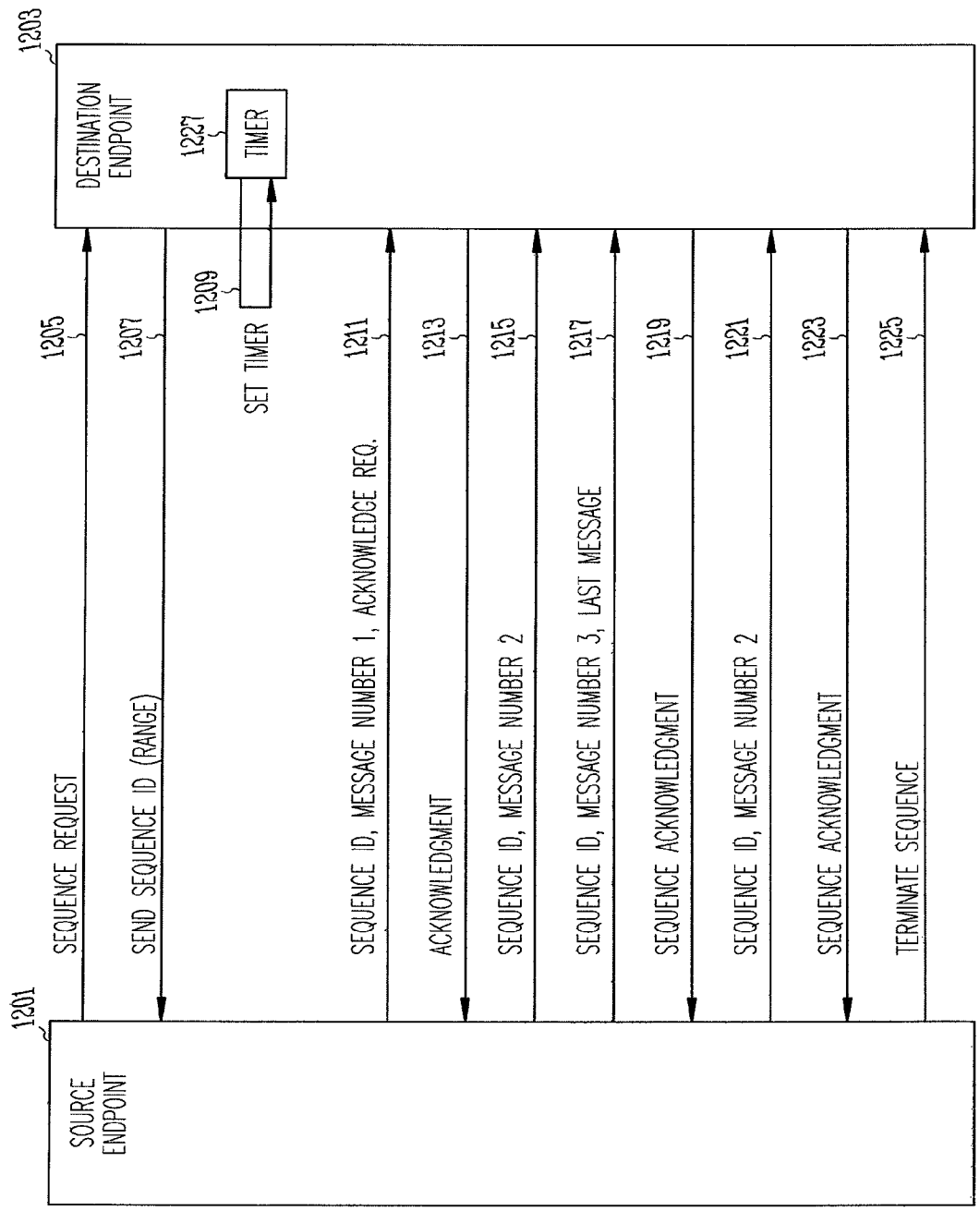
FIG. 12 shows a message exchange between endpoints whose messages are processed with a Web Services Reliable Messaging protocol.

FIG. 12 depicts an exemplary execution reliable message exchange between endpoints using a state-less WS-Reliable-Messaging protocol (SL WS-RM). Each of the endpoints, including the source endpoint 1201 and the destination endpoint 1203, has invoked its version of the SL WS-RM. At 1205, the source endpoint 1201 makes a sequence request. A sequence request involves asking for a sequence ID from the destination endpoint 1203. The destination endpoint 1203 creates a sequence response, including the sequence ID, and transmits this response to the source endpoint 1201 at 1207. For example, the sequence ID "http://www.sap.com/webserviceappl" may be created by the destination endpoint 1203 and transmitted to the source 1201 and used by all of the messages transmitted from either endpoint relating to a common group of messages.

In one embodiment, the destination endpoint 1203 includes a timer 1227 to monitor the duration between messages received. If the duration is too long, the duration will terminate the messaging sequence (for example, if the timer 1227 expires the messaging sequence will end and the source endpoint 1201 will have to request another sequence ID). At 1209, this timer 1227 is invoked and begins monitoring the duration between messages from the source endpoint 1201 to the destination endpoint 1203.

With a proper sequence ID the source endpoint 1201 may transmit messages to the destination endpoint 1203. As required by the common specification, the first message from the source endpoint 1201 is labeled as "message number 1" with each subsequent message increasing by one in value (for example, the next message will be "message number 2", etc.). At 1211, the source endpoint 1201 transmits its first message to the destination endpoint 1203. In this illustration the source 1201 has also requested an acknowledgement from the destination endpoint 1203 that it received "message number 1." At 1213, the destination endpoint 1203 transmits an acknowledgement to the source endpoint 1201. In one embodiment, the source endpoint 1201 waits until an acknowledgement is received before transmitting the next message.

At 1215, the source endpoint 1201 transmits "message number 2." However, in this example "message number 2" does not reach the destination endpoint 1203. As the source endpoint 1201 did not request an acknowledgement be sent by the destination endpoint 1203, the source endpoint 1201 does not know that the message did not reach its intended target. The third and final message is sent from the source endpoint 1201 at 1217. The destination endpoint 1203 returns an acknowledgement at 1219 to the source endpoint 1201. This acknowledgement includes the message numbers of those messages received. In this scenario it does not include "message number 2." The source endpoint 1201 knows that "message number 2" did not reach the destination endpoint 1203 and retransmits "message number 2" at 1221. The destination endpoint returns an acknowledgement at 1223 to the source endpoint 1201 that all of the messages ("message number 1", "message number 2", and "message number 3") have been received. With all of the messages received by the destination endpoint 1203, a terminate sequence command is transmitted at 1225 by the source endpoint 1201.

Figure 15:
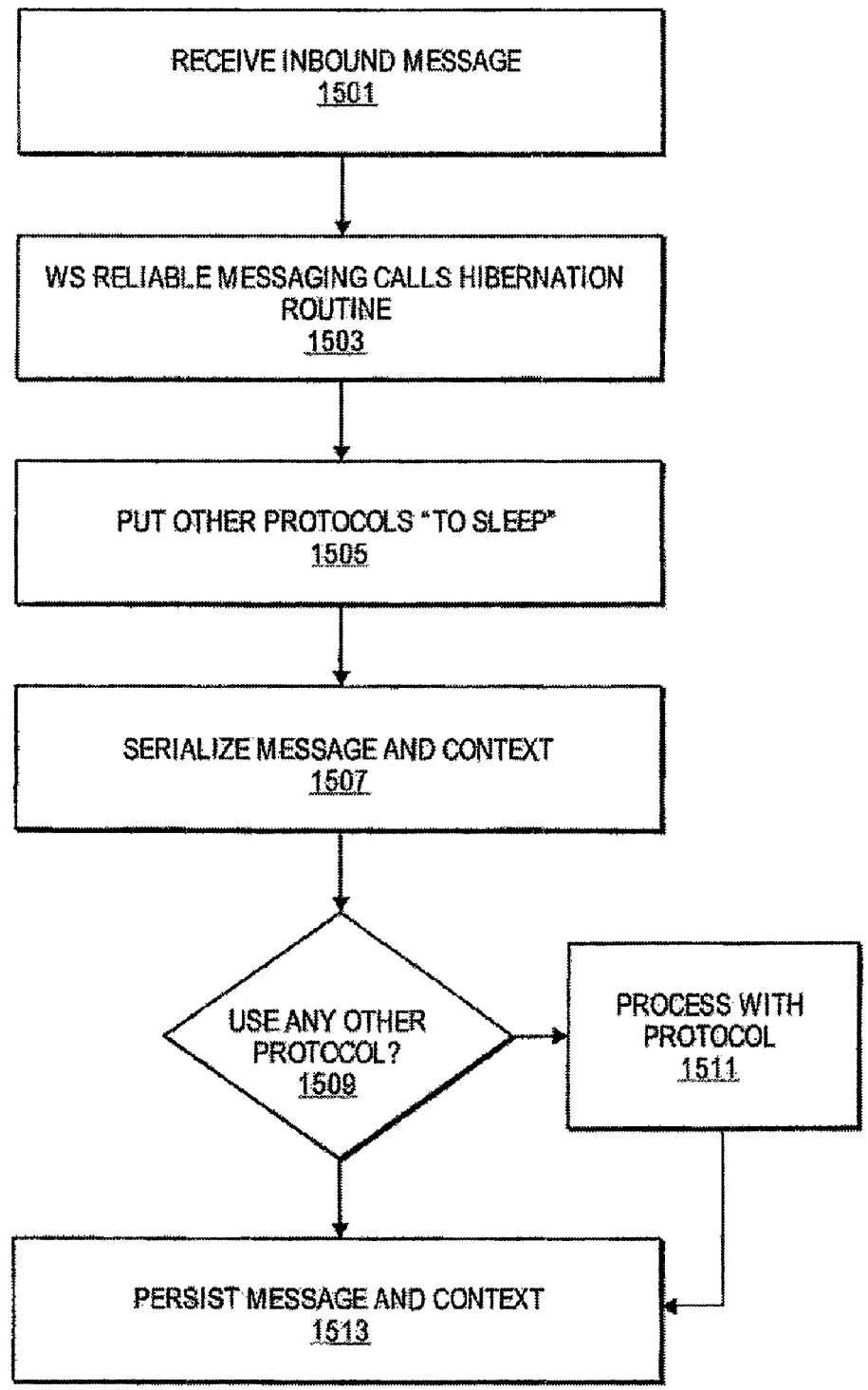
FIG. 15 depicts an exemplary flow of going into hibernation on the inbound side of a received message.

Because of the state-less nature of the protocols, each message that is managed by SL WS-RM in an out-of-order fashion is hibernated as necessary. FIG. 15 depicts an exemplary flow of the use of state-less WS RM during runtime execution. The state-less runtime execution invokes a messaging system that includes a processing array 1521 (which can be viewed as a kind of queue or table). In one embodiment, the messaging system 1519 is a J2EE engine service, which implements abstract message processing and includes features needed for the SL WS-RM such as persistence, quality of service processing, event handling, message life cycle management, web UI monitoring and so forth.

As requests are made (messages are either being received or sent), the processing array 1521 is used to properly order the execution of these requests and/or record which requests have been already handled. By recording which requests have been handled, the messaging system 1519 knows which messages have been sent (or received) and is therefore able to generate the proper acknowledgements required by the common specification for ReliableMessaging. In one embodiment, each request is placed in the array 1521 and hibernated, and no further processing is done until all of the requests of a group of requests have been made.

For example, if the request is for processing outbound messages it may be beneficial to wait until all of the requests are in the array 1521. If a problem occurs which causes the group to not be prepared correctly it would be a waste of resources (processing time, network bandwidth, etc.) to send out messages when the group would not be complete. In another embodiment, requests that are in the proper order are processed immediately and the array is updated to show that the status of the request is that it has been fully processed. Those that are out-of-order are hibernated (again still noting in the array the status of the request) until it is proper to fully process them.

Figure 13:
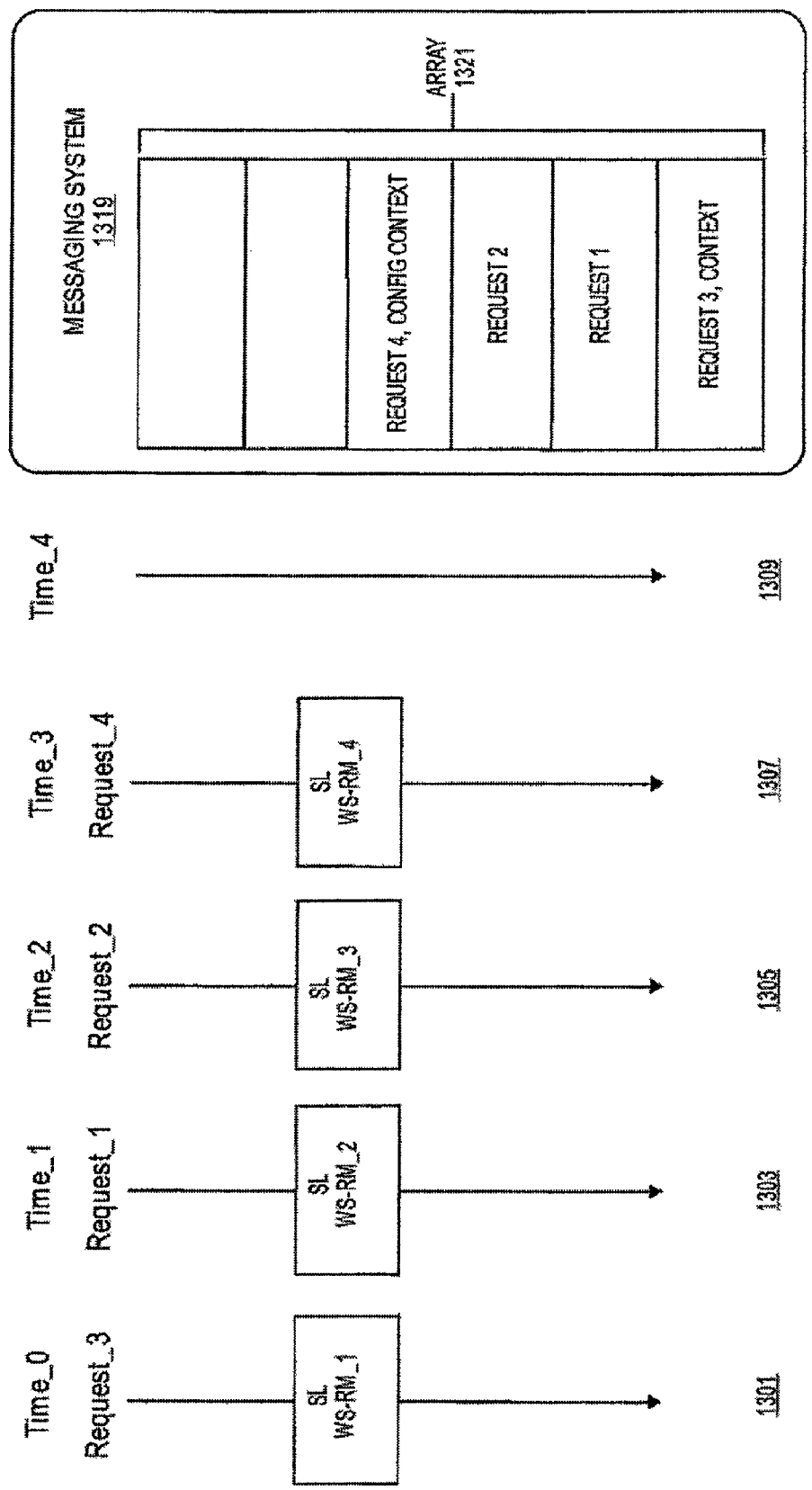
FIG. 13 shows a hibernation sequence supported by a messaging system.

According to the example of FIG. 13 only those messages that are out-of-order are hibernated. At Time_1 1301 Request_3 is managed by SL WS-RM_1, the first protocol context instance of the SL WS-RM protocol. Request_3 is the third request from the group of requests. Since Request_1 and Request_2 have not been processed, Request_3 is hibernated and the array 1321 is updated to reflect this. Accordingly, its "state" is now saved in the context to be processed later. At Time_1 1303 (a point later in time), Request_1 is managed by SL WS-RM_2. Request_1 is processed immediately and the array 1321 updated to reflect that status. At Time_2 1305, Request_2 is managed by SL WS-RM 3 and should be processed like Request_1 was processed at Time_1 1303. At Time_3 1307, Request_4 is managed by SL WS-RM_3. However, Request_4 should not be immediately processed unless Request_3 has been awakened from hibernation and fully processed. Therefore, if Request_3 has not been fully processed at Time_3 1307 Request_4 is hibernated and the array 1321 is updated to reflect this status. At Time_4 1309, Request_3 is awakened and fully processed. After Request_3 has been fully processed Request_4 is awakened to complete its processing. It should be understood that one request may be hibernated while another is being processed.

Hibernation

In this section the hibernation of the runtime will be discussed. This is a procedure that state-less WS-RM may call to place a protocol operation into a suspended state. During hibernation, the current state of a Web services (inbound or outbound side) is persisted and at a later point of time the processing can be resumed from the previously saved state.

Figure 14:
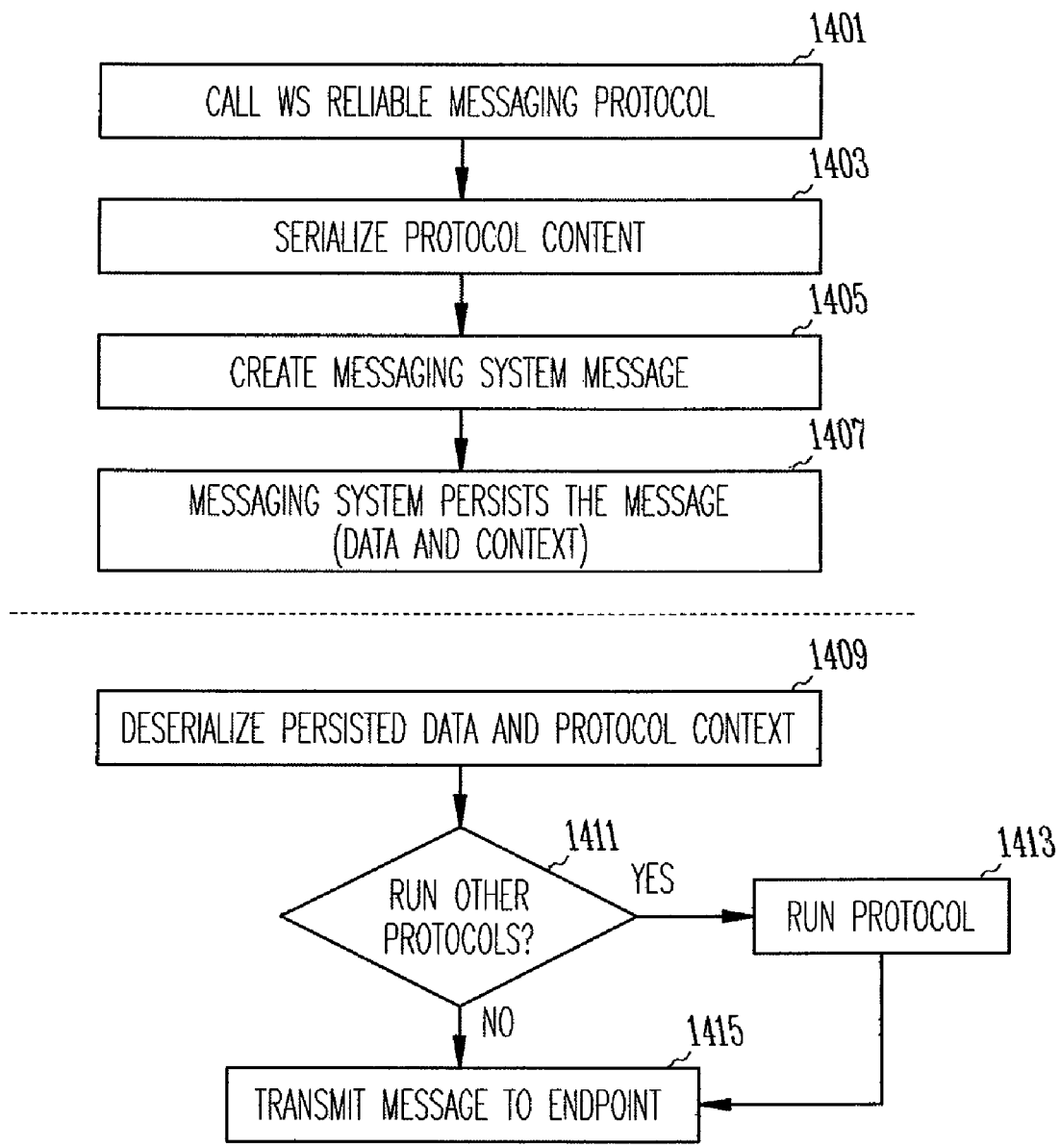
FIG. 14 depicts an exemplary hibernation flow on the outbound side for a Web service employing state-less protocols.

FIG. 14 depicts an exemplary hibernation flow (including putting the message to "sleep" and "waking up" the message to resume processing) on the outbound side for a Web service employing state-less protocols. The SL WS-RM is called by the runtime at 1401 (if it has not already been invoked), which creates a "protocol context instance" of the SL WS-RM protocol. At 1403, the SL WS-RM protocol context instance and message data (payload) are serialized. The protocol context instance includes the state information of the protocol (and any other protocols) needed to resume processing of the particular message at a later point in time. In an embodiment, other protocol context instances may be hibernated with or without SL WS-RM information. The message data may include the body of a message (for example, a SOAP message body), header information, and/or attachments to the message (for example, a DIME attachment). In this case "serialization" is the well-known process of saving an object to a sequence of bytes referred to as a "byte array".

A complete Messaging System (MS) message that contains the serialized protocol instance context, serialized message data, and information used by the MS is created at 1405. For example, in one embodiment, a SL WS-RM MS message contains the following WS-RM specific data found in the SOAP headers: the sequence ID, message number, and last message flag. Some additional information may be applied to the MS message regarding WS-RM configuration (WS-RM policy) such as: expiration timeout, retransmission/retry interval (relevant for the consumer side), acknowledgement interval (relevant for the provider side), delivery assurance mode, and exponential backoff algorithm flag (for the retransmission in the consumer side). This MS message is persisted at 1407 and the message is considered hibernated. In a further implementation, a portion of the context 914 is utilized for storing serialized MS messages. In one embodiment, the MS message does not include serialized message data. The message data is instead left in its XML form. This message data is either ignored or saved in another manner. Persisting messages on the outbound side allows for quick regeneration of messages that may have already been sent but need to be retrieved again. For example, if a message does not reach its intended target it is much quicker to regenerate the message from its hibernated state than to recreate a completely new message with the same information. In some cases it may be impossible to even recreate a message at all unless it has been hibernated first. The MS records hibernations. For example, the MS records that a message has been persisted. This recordation may include placing a record of this hibernation in the array 1521. Recordation serves at least two purposes: 1) allowing for proper acknowledgements to be generated, and 2) providing a reference to the storage location of the persisted message. For example, the record may contain information including the identification of the object context being operated on.

Messages that are hibernated may be awakened at some point later in time to continue processing and be sent to an endpoint. The MS sends an event to the SL WS-RM layer to begin this wake up process. The persisted MS message is retrieved and the persisted data and context is deserialized at 1409. The context allows the protocol context instance of SL WS-RM to resume where the processing was left off before hibernation. At 411 the data of the message is serialized and it is determined if other protocols should be run on the message (for example, a Headers protocol to insert message header information, a WS-Security protocol to add message security, etc.). These protocols are run at 1413 prior to the message being sent out. If no protocols need to be run or after the protocols have been run at 1415 the message is transmitted to the endpoint at 1415.

Hibernation may also be used on the inbound side in a state-less implementation. FIG. 15 depicts an exemplary flow of going into hibernation on the inbound side of a received message. An inbound message is received at 1501 by the WS runtime and some preliminary processing is done (for example, calling the Headers protocol to read the message's headers). A protocol context instance of SL WS-RM calls the SL WS-RM hibernation routine at 1503. All other protocol instances are put to sleep by the WS runtime at 1505. Their configuration contexts are persisted including anything that may be necessary to help wake them up at a later time. In one embodiment, these configuration contexts are serialized prior to the protocols being put to sleep. The message that was received by the WS runtime is serialized at 1507. This serialization includes converting both the context of the protocol and data (payload) of the message into a sequence of bytes. In one embodiment, the MS message does not include serialized message data. The message data is instead left in its XML form. This message data is either ignored or saved in another manner. At 1509 it is determined if any other protocols should be run (for example, a WS-Security protocol). These protocols are run at 1511. The serialized data and context are persisted (a MS message) at 1513 by the MS and the MS records that the message has been persisted (for example in the array 1521). In a further implementation, a portion of the context 914 is utilized for storing serialized MS messages and the configuration contexts of the other protocols put to sleep at 1505. With the MS message persisted the WS runtime no longer processes the message.

Figure 16:
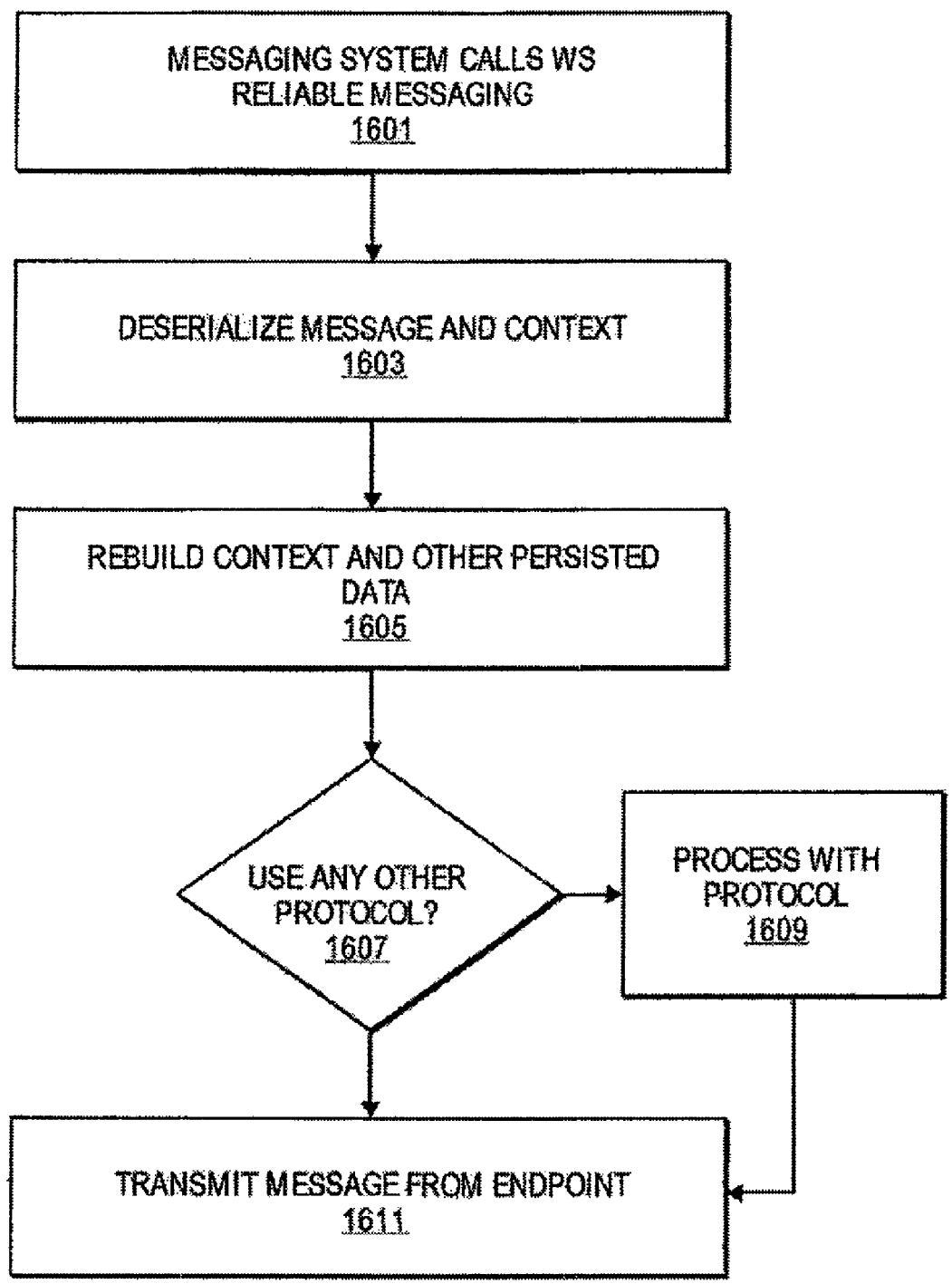
FIG. 16 depicts an exemplary flow of restoring from hibernation on the inbound side.

At some point later in time the message will be restored from hibernation. FIG. 16 depicts an exemplary flow of restoring from hibernation on the inbound side. The MS calls SL WS-RM at 1601 and a protocol context instance of SL WS-RM is created and begins the restoration of a message that has been hibernated. The MS sends an event to the WS RM layer to begin this wake up process. The persisted MS message is retrieved by the WS runtime and the persisted data and context are deserialized at 1603. The configuration context and other persisted data are rebuilt at 1605 and a new thread is created for processing of the configuration context. At 1609, other protocols may be invoked for further processing of this message. For example, the Headers protocol may be invoked so that header information from the message can be provided to the message's endpoint. The complete message (all protocols have been invoked that needed to be) is then processed by the message's endpoint and a response message is transmitted 1611 to an endpoint.

Headers Protocol

Figure 17:
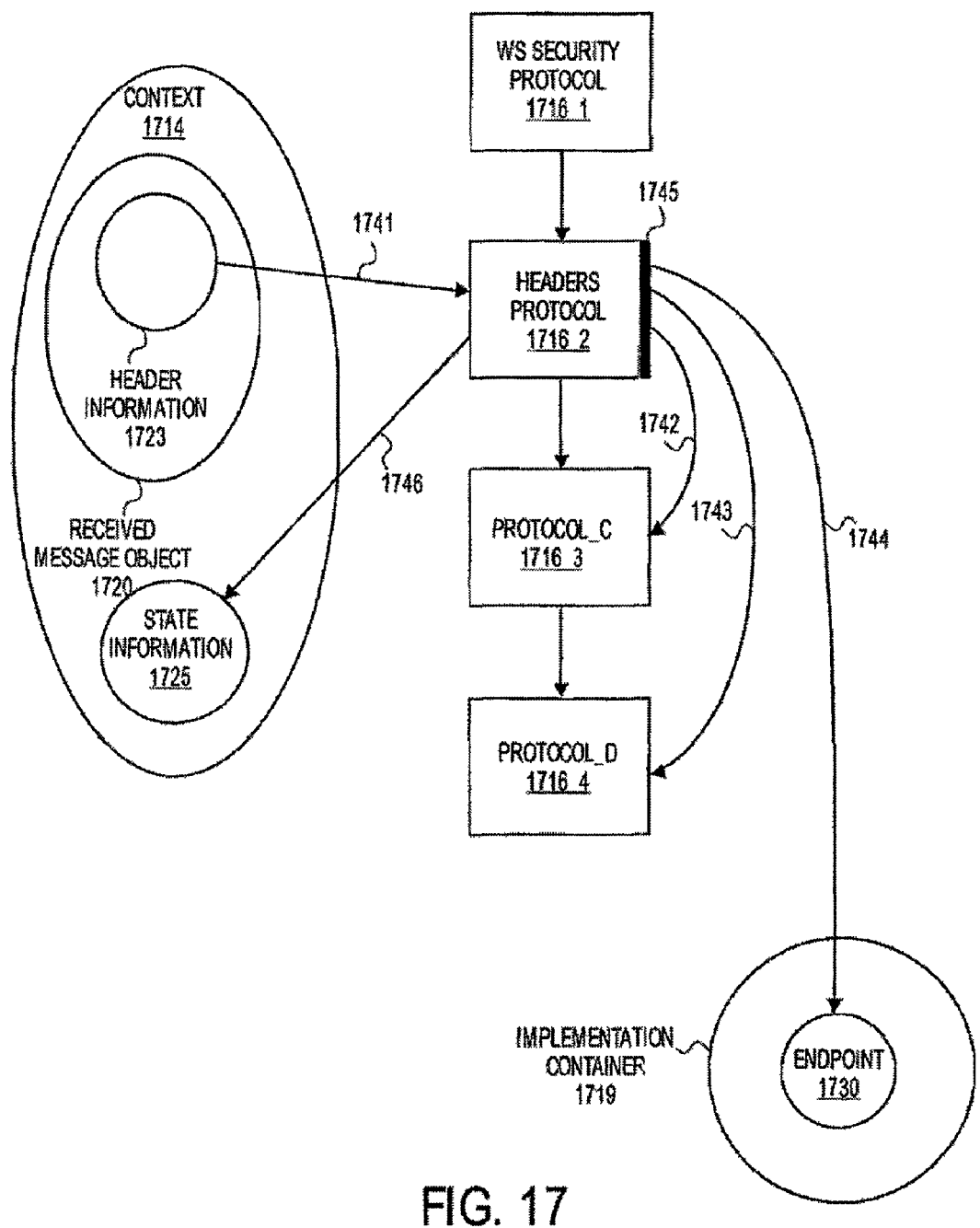
FIG. 17 depicts inbound processing with a Headers protocol.
Figure 18:
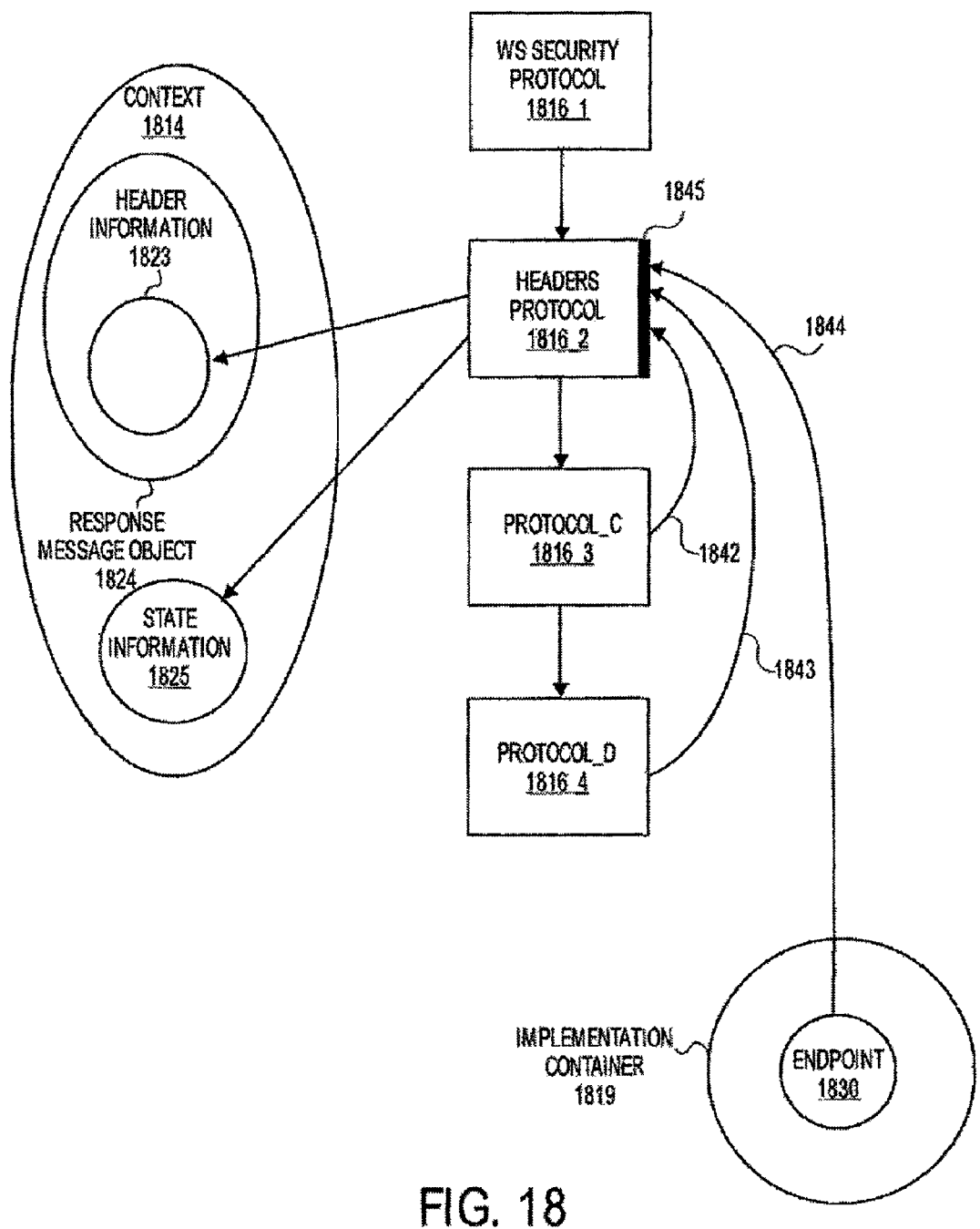
FIG. 18 depicts outbound processing with a Headers protocol.

As discussed in the background, the Headers protocol is designed to permit an endpoint and/or another protocol on the consumer side_to: a) comprehend at least a portion of a received message's header information; and/or, b) write at least a portion of a response message's header information. FIGS. 17 and 18 describe n detail the operation of the Headers protocol as adapted to work within the architecture of the improved runtime framework. It is pertinent to point out that although in an actual implementation the Headers protocol is only instantiated on the consumer side, there is nothing (architecturally speaking) that prevents its instantiation on the provider side. In an implementation, on the service provider side, the interfacing between a received message's header information and an endpoint and/or other protocol is performed by an API to the context (i.e., the endpoint and/or other protocol read/write header information from the context through an API rather than the Headers Protocol). Conceivably, such an API could be instantiated on the consumer side too.

A pertinent difference between the Headers protocol as implemented in the prior art runtime framework and the Headers protocol as implemented in the newer improved runtime framework is that the newer Headers protocol is stateless so to be compatible with the hibernation process. FIG. 17 depicts an exemplary inbound flow for a received message. FIG. 18 depicts an exemplary outbound flow.

According to the exemplary inbound flow of FIG. 17, a protocol stack that includes four protocols 1716_1 through 1716_4 execute in sequence in order to process a received message. The four protocols include in order: 1) a WS Security protocol 1716_1 that executes encryption/decryption and/or signature checking tasks; 2) the Headers protocol 1716_2; 3) a third protocol 1716_3 that is designed to use information found in the header of the received message; and, 4) a fourth protocol that is also designed to use information found in the header of the received message.

In practice, if proper processing requires use of the WS Security protocol, the WS Security protocol 1716_1 precedes the Headers protocol 1716_2 in the protocol stack because no further processing should be performed if the received message does not pass its "security clearance". The third and fourth protocols 1716_3, 1716_4 can essentially be any other protocol. For further demonstrative value, in order to demonstrate the stateless nature of the Headers protocol, one of protocols 1716_3 and 1716_4 is assumed to be the Reliable Messaging protocol.

According to the execution of the protocol stack in the inbound direction, first, the WS Security protocol 1716_1 will perform whatever decryption and signature checking is warranted. The Headers protocol 1716_2 then executes. The Headers protocol is essentially used as a mechanism to abstract the specific structure/formatting of the header information 1723 within the message object 1720 to other protocols and/or_endpoints that are written to comprehend message header information.

Essentially, over the years with repeated releases of "next generation" software, the structure/formatting of the header information 1723 may change. For example, the order and/or content of the DOM Elements within the header information 1723 may change because of a SOAP message header specification change. In light of such changes, any protocols or endpoints that are designed to comprehend and/or use message header information would have to be changed too if they were designed to access the message object's header information 1723 directly.

By instead designing these various protocols and endpoints to access a "standard interface" 1745 offered by the Headers protocol 1716_2, they can be made immune to any changes that are made to the structuring of the header information within the message object That is, they do not have to be re-designed in light of a message object header information 1723 change if they are designed to invoke methods offered by the Header's protocol interface 1745, and, the Header's protocol interface 1745 maintains support for these method invocations despite the change. Essentially, the Header's protocol 1716_2 is re-designed to deal with the change but nevertheless maintains "downward compatibility" of interface 1745.

In an implementation, the execution of the Headers protocol 1716_2 entails its reading 1741 of header elements (e.g., which are implemented as DOM Elements) from the header portion of the received message object 12 and storing the read header elements in itself 17162. In a further implementation, the Headers protocol 1716_2 is configured to only store within itself those header elements that have a setting of "must_understand=true".

Protocols written to access interface 1745 access the header information they need through the Header's protocol standard interface 1745. Essentially, the Headers protocol 1716_2 gives header information to a subsequent protocol that asks for the information, where, both the request for the information and the information itself is passed through interface 1745.

In an implementation, a protocol can ask for only a specific item of header information (e.g., information from a specific header element or set of header elements), and, the Headers protocol only returns the information that was specifically asked for. For instance, if protocol 1716_3 is a WS Reliable Messaging protocol as described above, the information asked for and delivered 1742 to protocol 1716_3 would be largely limited only to the header information that was indicative of "which" message the received message corresponds to amongst the correct serial ordering of a plurality of incoming messages and "which" group of messages the received message belongs to.

Continuing with an example where protocol 1716_3 is a WS Reliable Messaging protocol, a pertinent distinction between the Headers protocol implementation in the prior art runtime framework as compared to the implementation in the improved runtime framework is that the Header's protocol in the improved runtime framework is capable of supporting the hibernation process. If the Header's protocol is designed to keep state information, then, this information is externally saved prior to hibernation.

That is, the Headers protocol 1716_2 is capable of supporting the hibernation of the runtime process being executed in response to the WS Reliable Messaging protocol determining that such hibernation is warranted. The specific protocol context instance of the Headers protocol that instance 1716_2 corresponds to may have its state saved 1746 into the context 1714 and hibernated. While this particular protocol context instance 1716_2 of the Headers protocol will not be available until it is awakened from hibernation, the Headers protocol instance registered with the framework may be "re-used" to support another runtime process (another protocol context instance is invoked) for another received message. Likewise, as part of the hibernation process, the WS Security protocol context instance would have its state information saved into context 1714 as well.

As part of the sequence of re-starting the runtime process from its hibernated state in response to a determination being made that it is presently appropriate to process the received message that message object 1720 corresponds to, the WS Security protocol and 1716_1 and Headers protocol 1716_2 (and WS Reliable Messaging protocol 1716_3) will have their state information read back from context 1714. Then, protocol 1716_4 will execute. Note that, according to the diagram of FIG. 17, protocol 1716_4 also asks for and receives message header information 1743 from the Headers protocol 1716_2.

FIG. 17 also illustrates that the appropriate endpoint 1730 for the received message that the message object 1720 corresponds to can use message header information as well by being designed to access 1744 the standard interface 1745 of the Headers protocol 1716_2.

Before continuing on to FIG. 18, it is pertinent to note that, rather than reading 1741 and storing into itself the message header information 1723, the Headers protocol 1716_2 could be designed to read header information 1723 only in response to a request from another protocol or endpoint. That is, for example, rather than read the entirety of the header information 1723 immediately after execution of protocol 1716_1, the Headers protocol 1716_2 could be designed to access the message header information 1723 for each request by a later executed protocol or endpoint. In a further extension of such an implementation, the header elements may be kept in the message object 1720 (i.e., the Headers protocol does not store the header information inside itself). A Headers protocol designed according to these principles may be regarded as purely stateless in this sense that it does not have any information to store externally and therefore inherently supports hibernation by design. An instance of such a Headers protocol can be easily reapplied to other messages during the hibernation of a message that it was directed to access the header information of.

FIG. 18 shows the outbound processing flow for the protocol stack discussed above with respect to the inbound processing flow of FIG. 17. Whereas in the inbound direction protocols and endpoints may desire to know certain content within the received message's header, by contrast, in the outbound direction, protocols and endpoints may be desire to establish certain content within the response message's header. As such, the direction of the header information flows of FIG. 18 are in the opposite direction (into the Headers protocol interface 1845) than the header information flows of FIG. 17 (out of the Headers protocol interface 1745). According to an implementation, when the Headers protocol 1816_2 executes in the outbound direction, it writes 1841 the combined header information 1844, 1842 1843 (respectively, from the endpoint 1830 and the protocols 1816_3, 1816_4 that have already executed in the outbound direction) into the header information 1823 of the response message object 1824. Alternatively, the Headers protocol 1816_2 could write header information each time a protocol or endpoint access interface 1845 (i.e., the Headers protocol writes to the outbound message object on an "as-needed" basis by another protocol and/or endpoint).

The Headers protocol 1816_2 may also be capable of saving its state information 1825 externally into the context 1814 for the message group in case hibernation is appropriate (and if the Headers protocol is not purely stateless as discussed briefly above) when a response message is being generated. Note that, because the overall runtime process being described supports service consumer-side processes as well, the Headers protocol can also be used to write message header information for an initial "request" message to be sent to a service provider that is not properly deemed as any kind of "response" message.

WS Addressing Protocol

As mentioned in the Web-Services subsection of the background of the present application, a "WS-Addressing" extension has been defined for the Web services effort that specifies information to be contained within a SOAP header 106 that describes the destination of the SOAP message in a transport independent fashion. Prior to the introduction of the WS-Addressing specification, the transportation of a Web services message through a network was largely viewed as the responsibility of lower level transportation technologies (e.g., HTTP, HTTPS, SMTP, etc.) that treated the Web services message purely as payload information.

The WS-Addressing specification essentially permits certain transportation related specifics about the message to be abstracted above any specific transportation technology so that the message's transportation details are essentially defined in a format that is independent of a specific transportation technology.

The most notable technology independent transportation information that the WS Addressing defines is the message's destination endpoint and sender endpoint (referred to generically as "EndPoint References" or EPRs). For instance, in the case of a message being sent from a Web service consumer to a Web service provider, the sender endpoint reference identifies the Web service consumer and the destination endpoint reference identifies the Web services provider. In the case of a SOAP message, the endpoint references may be written in XML in the header of the SOAP message.

Some important capabilities may be realized by abstractly defining the source and destination of a message in this fashion. As one example, the underlying transportation technology for a message can be changed as it traverses the network from the sender endpoint to the destination endpoint. Consider a situation where a first leg of a message's journey through the network is to be transported by HTTP and a second leg of the message's journey is to be transported by SMTP.

At the node in the message's path through the network where the switchover from HTTP to SMTP is to take place (e.g., an "intermediate" node), the destination endpoint reference found in the message's header (which from the perspective of the HTTP packet is located within the HTTP packet's own payload information) could be used as a basis for building SMTP header information that specifies the destination endpoint in an SMTP compatible fashion (e.g., by performing a look up in a table that correlates destination endpoint references to SMTP destination ID values).

The WS Addressing specification also permits additional technology independent definition of information, often referred to as Message Indicators (MIs), that help define properties about the message. Some of these include: 1) a "Reply" indicator that indicates to the destination endpoint where the response message is to be sent (e.g., if different than the sender endpoint); 2) a "Fault" indicator that indicates to the destination endpoint where a response message is to be sent if there is a "fault" detected (i.e., some error in execution); 3) a "Message ID" indicator that tags an identification to the message for purpose of uniquely identifying the message; 4) an "Action" indicator that identifies the semantics implied by the message; and, 5) a "Relationship" indicator that indicates how the message relates to another message.

Figure 19:
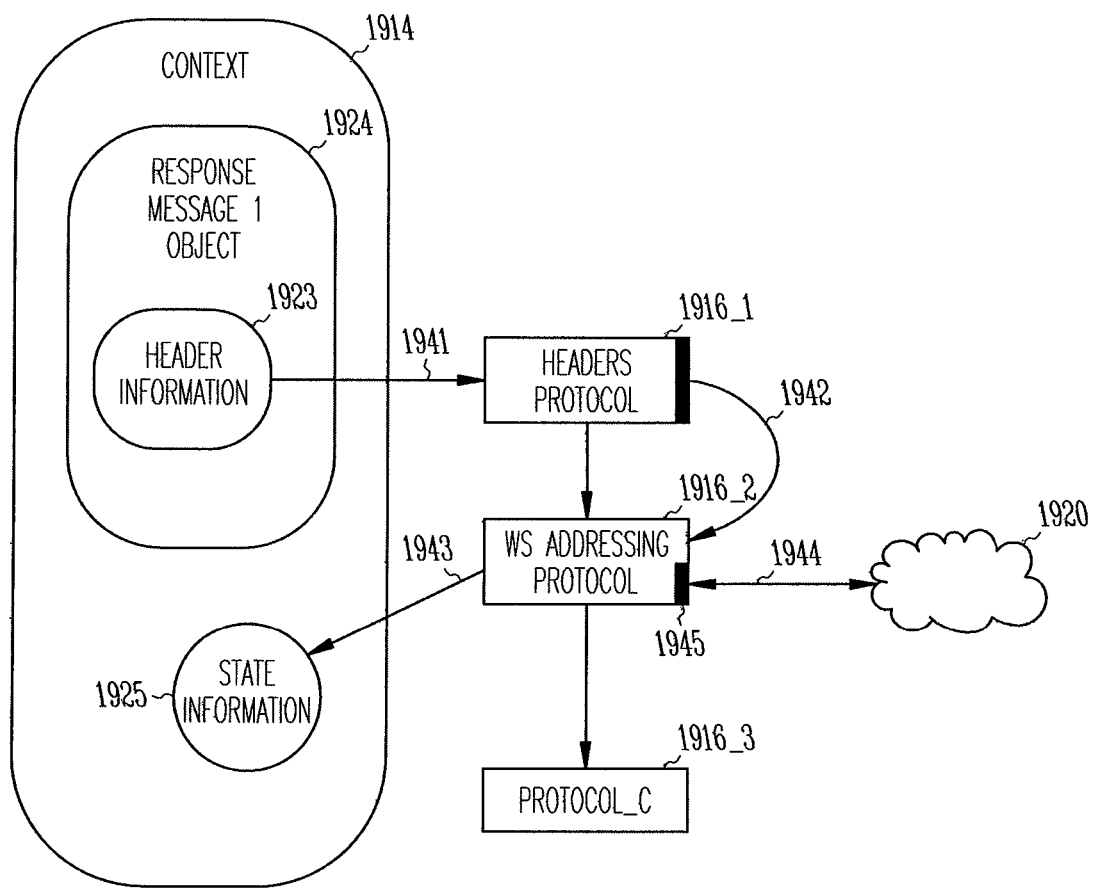
FIG. 19 depicts inbound processing with a WS Addressing protocol.

FIG. 19 shows another inbound protocol stack flow that includes a WS Addressing protocol 1916_2 written for the improved runtime framework. According to one embodiment of the inbound protocol stack flow of FIG. 19, as described in detail above, the Headers protocol 1916_1 reads 1941 and stores inside itself 1916_1 the header information 1923 from the received message object 1924 found within context 1914. The WS Addressing protocol 1916_2 then executes.

According to an implementation, consistent with the discussion provided above for the Headers protocol, the WS Addressing protocol 1916_2 invokes the Headers protocol 1916_1 in order to receive 1942 header information from the received message that pertains to the WS Addressing specification (e.g., the sender and destination EPRs along with Reply, Fault, MessageID, Action and Relationship MIs). In an alternative implementation, rather than fetch "all" WS Addressing information from the Headers protocol 1916_1 as a single process, the WS Addressing protocol 1916_2 could be designed to ask for specific EPRs and/or MIs on an as needed basis.

The WS Addressing protocol 1916_2 is able to store 1943 its state information 1925 into the context 1914 as its protocol context instance information (which, in an implementation, includes the WS Addressing EPRs and MIs received from the Headers protocol). By being designed to store state information before hibernation sufficient to correctly complete its operations at a later time, the WS Addressing protocol 1916_2 is capable of being in a protocol stack that includes the WS Reliable Messaging protocol (which, for instance, may be protocol 1916_3).

In an embodiment, the WS Addressing protocol 1916_2 is able to: 1) provide 1944 EPRs and/or MIs to external software applications 1920 (e.g., other protocols, endpoints and/or background processes designed to support a Web services infrastructure); and, 2) perform basic roles and behaviors that are called out by the applicable WS Addressing specification (s). In the case of the former, the WS Addressing protocol 1916_2, like the Headers protocol 1916_1, maintains a "standard interface" 1945 that is used to pass EPRs and/or MIs to any external software applications 1920 that may desire them.

For instance, in a case where the underlying transportation technology is being changed (e.g., from HTTP to SMTP as discussed above), software application 1920 may be a background process that determines the proper (e.g., SMTP) address for the destination endpoint based on the destination EPR. In this situation, during the inbound execution of the protocol stack, the destination endpoint EPR is passed to the background process through interface 1945. The background process is then responsible for forwarding the correct destination address to the transport binding of the new underlying transportation technology. MessageID, Action and Relationship MIs may also be passed to other protocols, endpoint and/or background processes to support whatever functions they perform.

Like the standard interface 1745, 1845 of the Headers protocol, the standard interface 1945 of the WS Addressing protocol 1916_2 essentially "hides" from other applications 1920 changes to the message object header information 1923 and/or content of the WS Addressing header information that may evolve over time. That is, the WS Addressing protocol 1916_2 can be re-designed if necessary to adapt to changes made to the or applicable specifications that define the content of the WS Addressing header information and/or message object 1924, while, maintaining at interface 1945 methods that may be invoked by legacy software applications 1920.

In an implementation, the WS Addressing protocol 1916_2 also performs specific behaviors called out by an WS Addressing specification. Some of these may include: 1) during the outbound protocol stack flow when no fault has been detected, providing the Headers protocol 1916_1 with destination EPR information to be written into the response message object header information, where, the destination EPR corresponds to the address of the endpoint identified in the Reply MI of the received message header information; and, 2) during the outbound protocol stack flow when a fault has been detected, providing the Headers protocol 1916_1 with destination EPR information to be written into the response message object header information, where, the destination EPR corresponds to the address of the endpoint identified in the Fault MI of the received message header information.

Improved Implementation Container

Referring to FIGS. 6 and 7, the runtime object 611 retrieves an instance of the implementation container 706 (process 706) and then fetches the endpoint's classloader 307 (process 707). Referring to FIG. 8, in an implementation, the identity of the Web service's implementation container is stored in a listing 819 in the Web service data 813. The runtime object 611 refers to this listing 819 and provides an implementation container manager 617 with the implementation container identity 822.

The implementation container manager 617 is essentially a registry, and, in response to its reception of the implementation container identity 822, provides the runtime object 611 with a pointer or other reference to an interface to the implementation container 619. With the interface, the runtime object 611 can, in a sense, be deemed to possess an instance of the implementation container 619 itself.

An interface is essentially an object oriented structure for invoking methods. A basic use of a container's interface involves: 1) identifying a specific component within the container (e.g., a specific EJB or servlet); 2) identifying the specific method to be performed by that component; and, 3) supplying the input argument(s) for the method in its proper format (e.g., the specific input parameters needed by the method listed in the specific order that the method requires).

With respect to the runtime framework, not only may multiple containers exist, but also, "different" containers may exist (e.g., an EJB container, a Web Interface container, etc.). Furthermore, "different" containers may have "different" interfaces in terms of the manner and format in which the three parameters listed above (component identification, method identification and input argument) are provided.

In the prior art runtime framework, the implementation container manager 217 merely provided the runtime object 211 with an instance of the implementation container's interface (as defined by that container). Thus, in a system with endpoints located across different types of containers, the runtime object was expected to comprehend each of the different types of container interfaces. A scalability issue arises with this design, however, because the introduction of any "new" type of container and its correspondingly "new" interfaces requires an upgrade of the functionality of the runtime object 211 to comprehend the specific requirements of the new interface.

As such, the improved runtime framework has introduced a more scalable approach in which the interface provided by the implementation container manager 617 does not merely provide the runtime object with an instance of the container interface as defined by the container, but rather, provides a modified version of the container interface. This modified version of the container interface has the same "back-end" as the container's defined interface (in terms of its ability to construct the correct method invocation arguments for the container), but, has a common "front-end" (in terms of the methods that the runtime object 611 calls).

Figure 20:
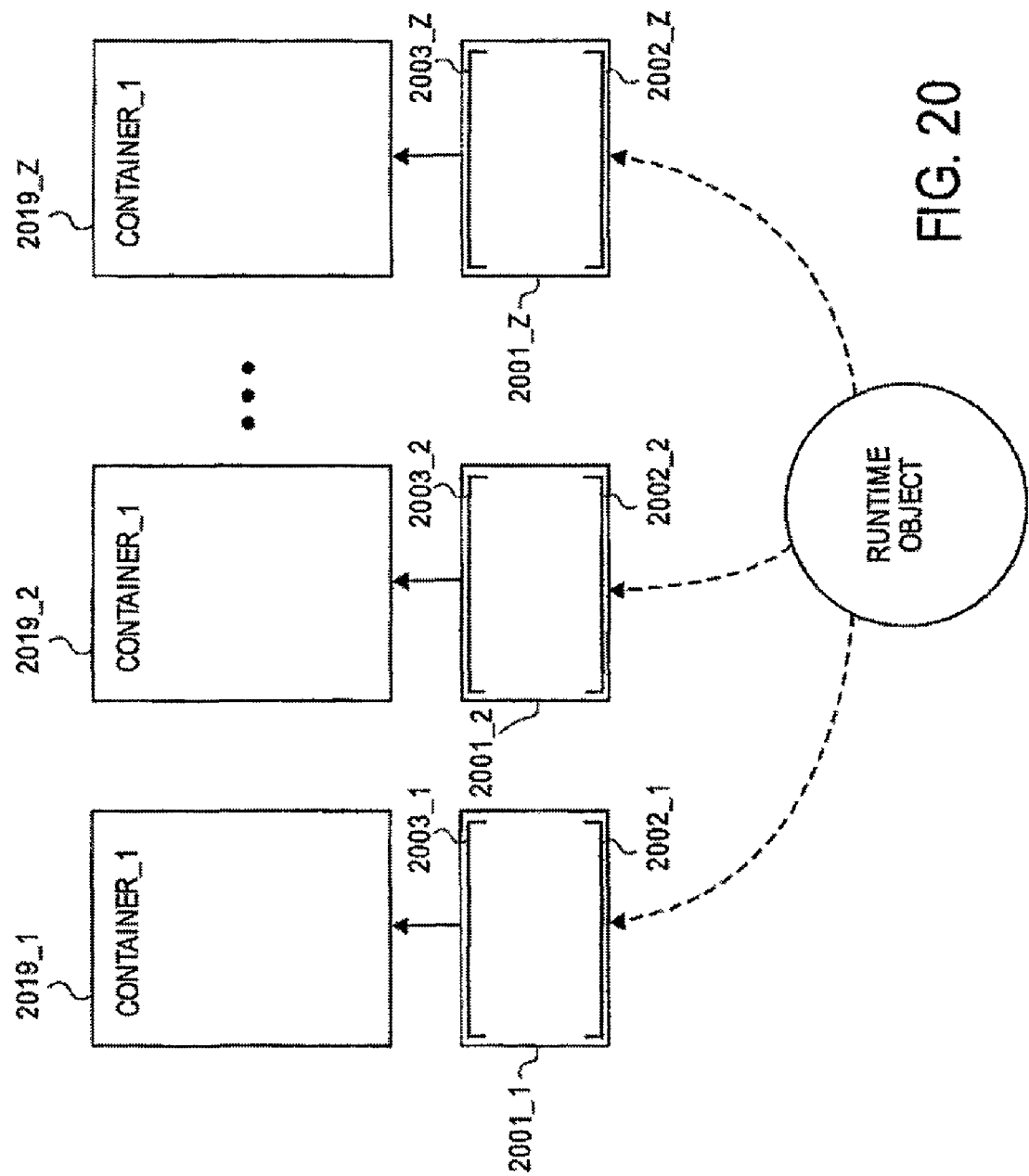
FIG. 20 shows a depiction of a standardized implementation container interface.

In this case, the common front-end permits the runtime object 611 to only comprehend a single type of format for method invocation at a container, and, the modified container interface is responsible for converting the structure of the method invocation provided by the runtime object into the specific format required by the container at the interface's back-end. FIG. 20 shows the scheme in more detail.

According to the depiction provided in FIG. 20, multiple containers 2019_1 through 2019_Z are observed. Each of containers 2019_1 through 2019_Z contain endpoints that could be called upon by runtime object 2011. The respective interface used by the runtime object 611 for each one of these containers 2019_1 through 2019_Z is depicted as interfaces 2001_1 through 2001_Z. In an implementation, the respective front-ends 2002_1 through 2002_Z of these interfaces are the same; which, in turn, corresponds to the runtime object 2011 invoking the endpoint methods in an identical format irrespective of which of the Z implementation containers is being implicated. By contrast, the back-ends 2003_1 through 2003_Z of these interfaces 2009_1 through 2009_Z may be all different in order to accommodate any method invocation format that is specific to their particular container.

Thus, according to this approach, introduction of a new type of container with a corresponding new type of interface definition does not require an upgrade of the runtime object 2011, but merely, development of an interface that convert a method invocation formatted according to the standardized front-end into a method invocation that is formatted according to the needs of the interface defined by the new container. In an implementation, the standard front-end 2002 supports two methods: 1) get_classloader (in which the input argument supplied by the runtime object 2011 is the identity of the endpoint); and, 2) invoke_method (in which the input argument supplied by the runtime object 2011 includes the identity of the endpoint, the endpoint method being invoked and input parameters required by the endpoint method; notably, as discussed at length above, the input parameters need not be organized in the format required by the implementation container's defined interface).

Streaming

Figure 21:
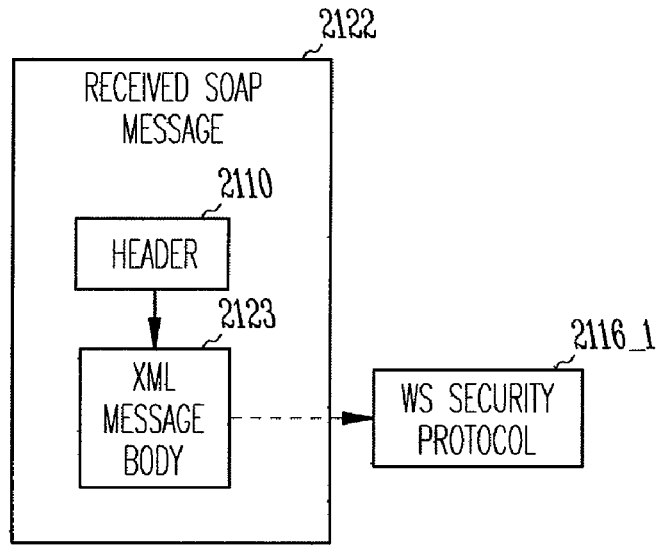
FIG. 21 (prior art) shows that a protocol may desire information from a received message body.

The discussions above concerning the Headers and WS Addressing protocols pertained to the ability of one or more protocols to gain access to message header information. FIG. 21 demonstrates that the XML message body 2123 (as opposed to the header 2110) may also fall under the responsibilities of a protocol as well. For instance, recall the WS-Security mentioned in the background that is responsible for encryption/decryption functions. In a prior art implementation, a WS Security protocol 2116_1 performs decryption on a received message 2122 in the inbound direction, and, encryption on a response message in the outbound direction. In the case of encryption (outbound direction), the outbound message body is "scrambled" by the WS-Security protocol 2116_1; and, in the case of decryption (inbound direction), the contents of the received message body 2122 are "unscrambled" by the WS-Security protocol 2116_1. In both cases (encryption and decryption) the protocol 2116_1 is responsible for overseeing functions that involve the content of the body portion of a message.

According to the prior art approach, in the inbound direction, a DOM parser was used to construct a DOM tree representation of the encrypted message body, and then, the WS Security protocol performed decryption on the DOM tree representation to produce a second DOM tree that represented the decrypted message body. In the outbound direction, a DOM tree writer was used to produce a DOM tree representation of a non encrypted message body, and then, the WS Security protocol performed encryption on the DOM tree representation to produce a second DOM tree that represented an encrypted message body. Because of the heavy use of DOM trees and the tendency of DOM trees to be memory inefficient (particularly for a large amount of information such as a message body) the prior art approach needed to be improved from a memory consumption perspective. The following describes alternative approaches that should be more memory efficient than the processes described just above.

Figure 22:
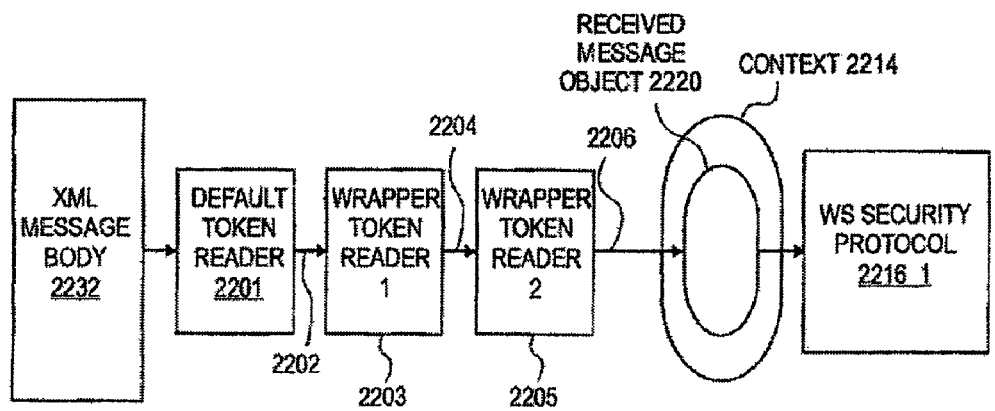
FIG. 22 shows an approach for providing a protocol with information from a received message body.

In the inbound direction, according to one improved implementation, in order to comprehend details within the XML message body 2123 of the received SOAP message 2122, the XML message body 2232 is provided to the WS Security protocol 2216_1 from a token streaming ("event based") de-serialization process depicted schematically in FIG. 22. That is, a default token reader 2201 provides an object oriented stream of tokens 2202 (each token being implemented as a separate object), where, each token appearing in the stream of tokens 2202 corresponds to some specific item found within the XML message body 2223. Here, it is pertinent to recognize that an the XML message body 2232 (e.g., XML, SOAP) can be viewed as being organized into one or more "elements", where, each element can have one or more associated "attribute" items and/or contain one or more "character data" items. An element can also contain one or more "children" elements.

Figure 23:
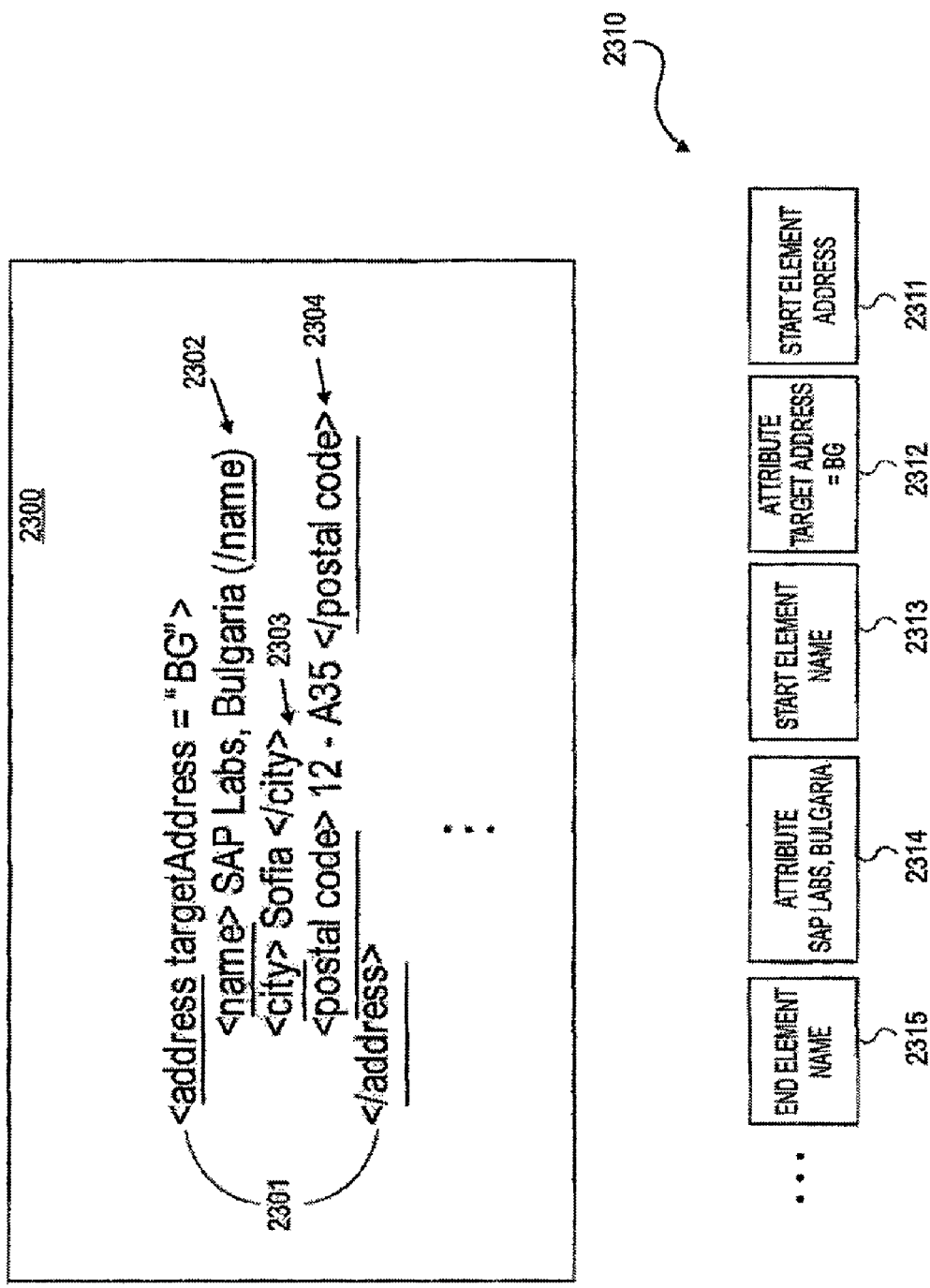
FIG. 23 shows an exemplary XML document containing a parent element and a corresponding token stream.

FIG. 23 demonstrates an example. FIG. 23 shows a portion 2300 of an XML document having an address parent element 2301 containing address name 2302, address city 2303 and address postal code 2304 children elements. Note that the address parent element 2301 includes a "targetAddress='BG'" attribute item; the address name element 2302 includes an "SAP Labs, Bulgaria" attribute item; the address city element 2303 includes a "Sofia" attribute item; and, the postal code element 2304 includes a "12-A35" character data item. Referring to FIGS. 22 and 23, in processing the portion 2300, the default token reader 2201 scans the XML content 2200 and provides an output "token" each time it recognizes the start of an element, the end of an element, an attribute item or a character data item.

The default token reader 2201 will therefore provide, in order, the token stream 2310 depicted in FIG. 23 which includes: 1) an address element start token 2311; 2) an attribute="_targetAddress='BG'_" token 2312; 2) an address name element start token 2313; 3) an attribute="SAP Labs, Bulgaria" token 2314; 4) an address name element end token 2315; 5) an address city element start token (not shown); 6) an attribute="Sofia" token (not shown); 7) an address city element end token (not shown); 8) an address postal code element start token (not shown); 9) a character data="12-A35" token (not shown); 10) an address postal code element end token (not shown); and, 11) an address element end token (not shown). In an implementation there exist two different default token readers for two different types of XML formatting: 1) BinaryXML; and, 2) XML 1.0.

The default token reader 2201 is followed by one or more "wrapper" token readers 2203, 2205 such that a "serial processing chain" is formed. Here, each wrapper token reader 2203, 2205 in the serial chain is configured to consolidate multiple input tokens and convert them into a single "higher level" output token. As a consequence, the serial chain of wrapper token readers 2203, 2205 essentially converts the highly granularized stream of tokens 2202 provided by the default token reader 2201 into a higher level token abstraction so that the protocol 2216_1 can ultimately receive one or more message body elements as a single instance of information (e.g., as a single object that represents one or more elements within the message body).

Figure 24:
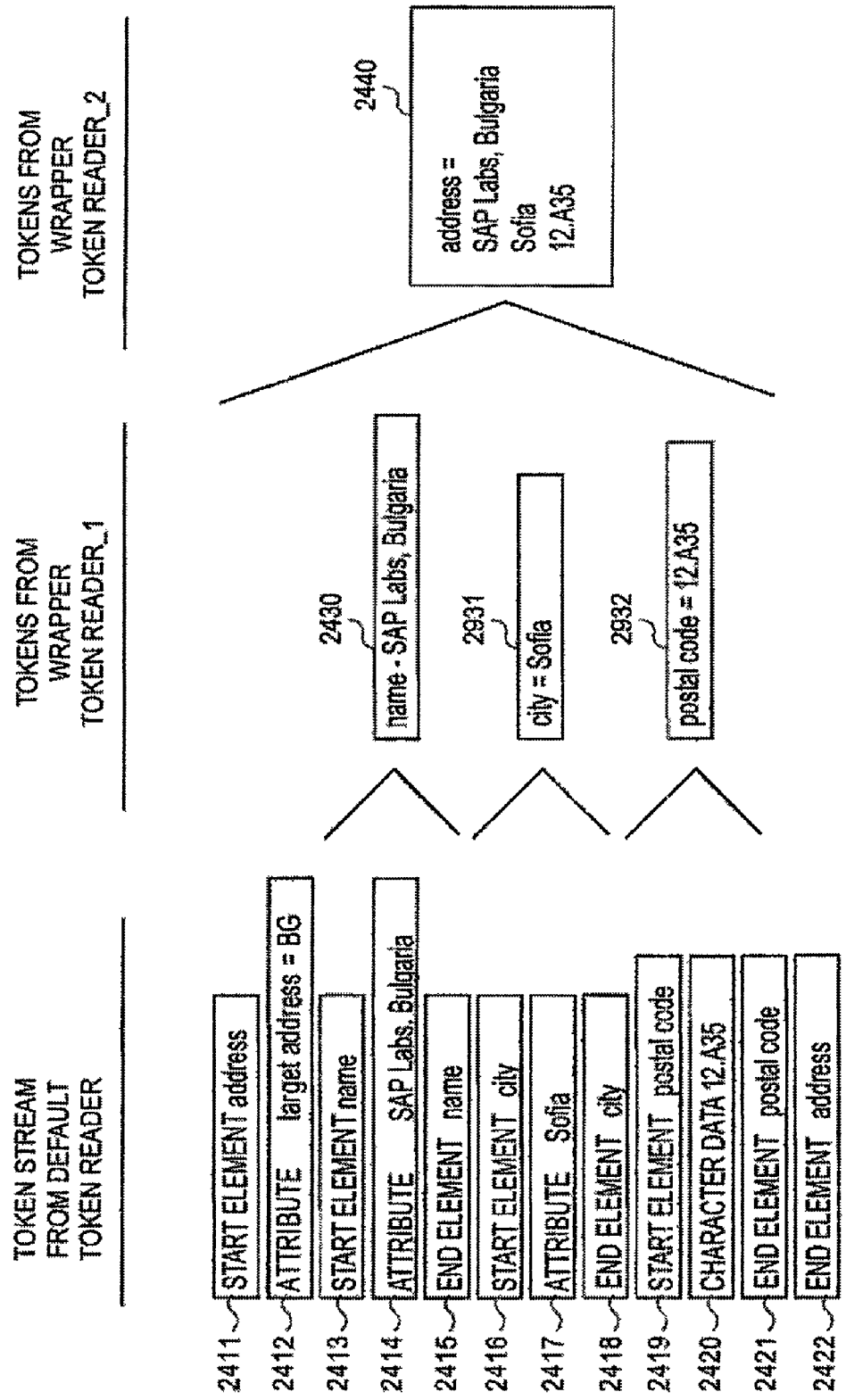
FIG. 24 shows an exemplary token consolidation process.

FIG. 24 shows an example in which the first wrapper token reader_1 2203 (as shown in FIG. 22) in the serial chain is designed to convert: 1) the address name element start, attribute, and end tokens 2413, 2414, 2415 from the default token reader's output stream of tokens 2202 into a single token 2430; 2) the address city element start, attribute, and end tokens 2416, 2417, 2418 into a single token 2931; and, 3) the address postal code element start character data, and end tokens 2419, 2420, 2421 into a single token 2932. FIG. 24 also shows the effect if the second wrapper token reader_2 2205 (as shown in FIG. 22) consolidates the tokens 2430 thru 2432 from 2203 wrapper token reader 1 has shown in FIG. 22) and the start element token 2411, attribute 2412 and end element token 2422 into a single token 2440 that contains all of the address information. By passing this token 2440 to the protocol 2216_1 (e.g., through the context 2214), the protocol 2216_1 can be designed to reference only the single, address element within the message body (rather than comprehending its constituent parts as separate elements). Referring back to FIG. 22, in an implementation, a protocol (such as WS-Security protocol 2216_1)) invokes the wrapper chain through the received message object 2220 in the context 2214; which, in turn, invokes the use of the token reader chain. That is, the protocol calls to the received message object 2220 to load itself with the message body information. In response, the message object 2220 invokes the token reader chain. The token reader chain then provides encrypted content from the received message body into the message object 2220. In a further implementation, the message body content as written in the message object 2220 is formatted as a byte array or string and therefore is placed into a serialized portion of the context 2214.

A reverse serialization process may also occur in the outbound direction (e.g., for encryption). That is, a higher level wrapper token writer "expands" multiple output tokens from a single input token. Each expansion through a chain of wrapper token writers therefore increases the granularity at which the message body information was described until a default token writer is reached that transforms a highly granularized stream in object oriented form into a sequence of XML element start items, element end items, attribute items and character data items.

Figure 25A:
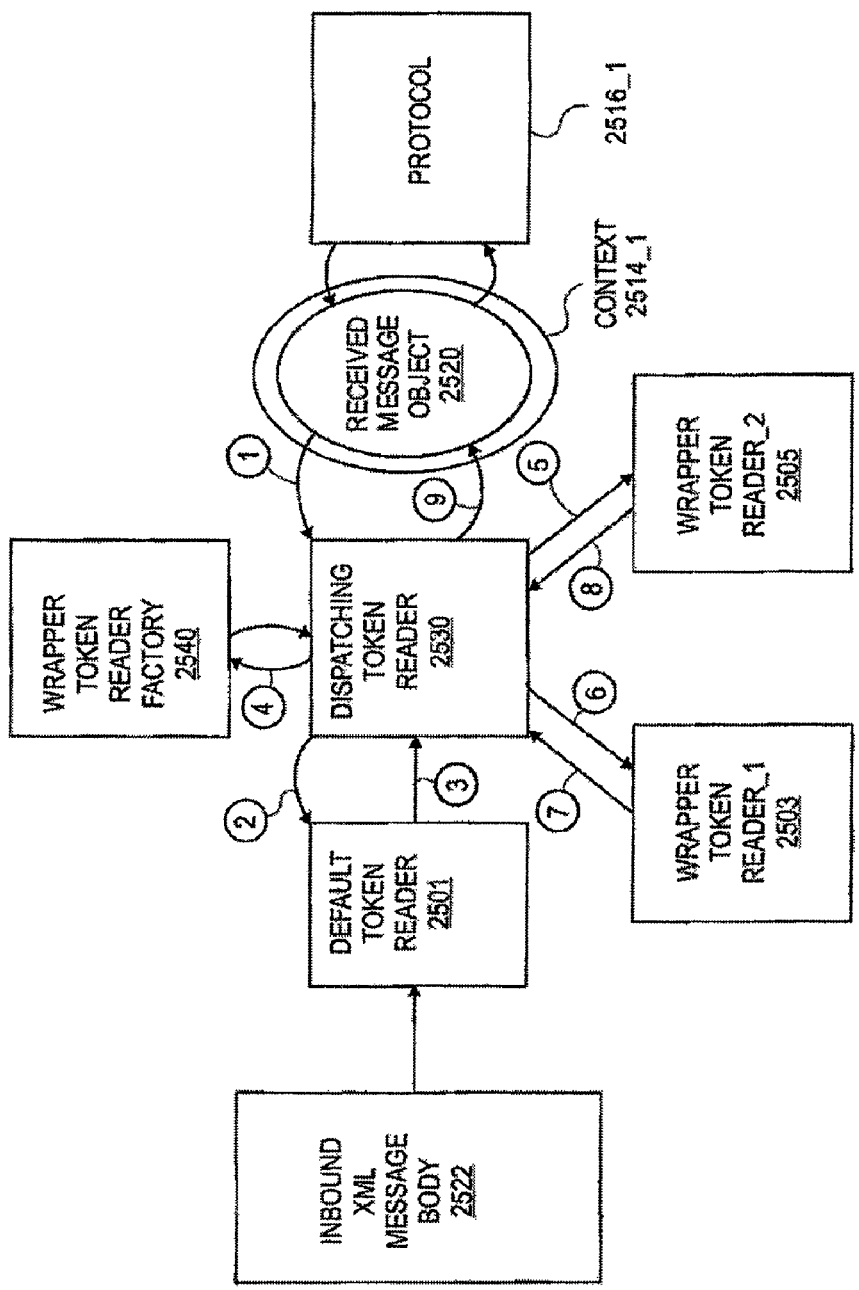
FIG. 25a shows an improved token reading and consolidation architecture.
Figure 25B:
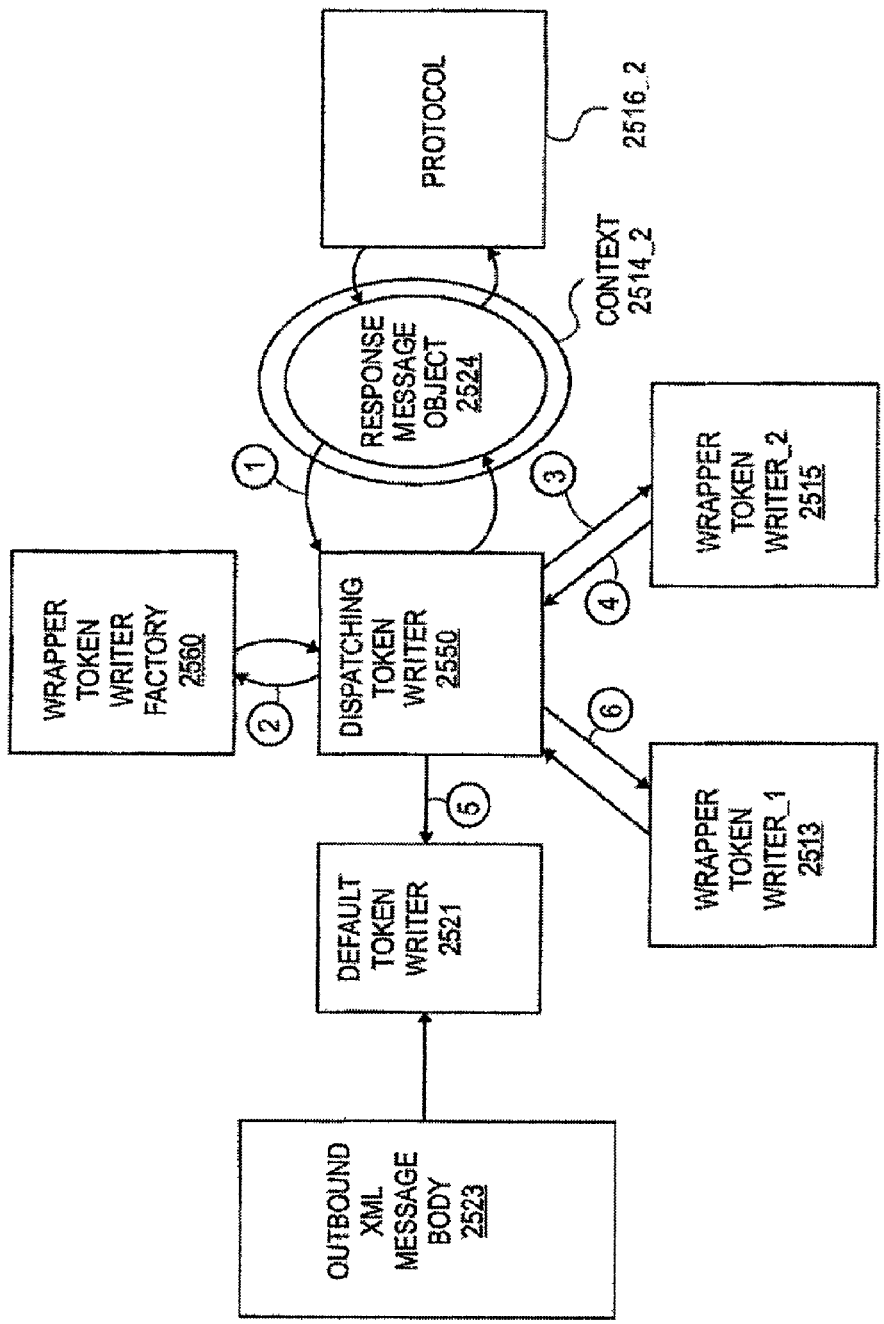
FIG. 25b shows an improved token expansion and writing architecture.

FIGS. 25a and 25b show another improved approach that is more "dynamic" than the approach described just above in the sense that wrapper token readers are called out on an "as-needed" basis. FIG. 25a relates to a de-serializing process and FIG. 25b relates to a serializing process. Specifically, for de-serialization, in FIG. 25a, a dispatching token reader 2530 maintains a registry for each type of token that can be abstracted to a higher level by a wrapper token reader. The registry essentially maintains a correlation between: 1) a particular token that can be abstracted to a higher level token by a wrapper token reader; and, 2) the identity of the specific wrapper token reader that consolidates the particular token. For serialization, in FIG. 25b. a dispatching token writer 2520 maintains a registry for each type of token that can be expanded to a lower level by a wrapper token writer. This registry essentially maintains a correlation between: 1) a particular token that can be expanded to a lower level collection of tokens by a wrapper token writer; and, 2) the identity of the specific wrapper token writer that expands the particular token.

With respect to de-serialization, referring to FIG. 25a, a protocol (such as a WS Security protocol 2516_1) calls to the message object 2520 to retrieve whatever information is needed from the message body 2522. In response, the message object 1120 calls 1 to the dispatching token reader 2530. According to an implementation, information is returned to the message object 1120 in a kind of "real-time" fashion in the sense that, a token is passed to the message object 1120 directly after its corresponding one or more elements are read from the XML message body 2522 and abstracted up to the token level that the protocol 2516_1 expects.

In a further implementation, the default token reader 2501 reads the XML message body 2522 elements in the same order in which they are listed within the XML message body. As a consequence, tokens can be passed to the message object 2520 in the same order in which they are listed within the message body 2522. Therefore, according to one implementation, the call 1 from the message object 2520 is simply a "next" call that is properly responded to 9 by the dispatching token reader 2530 with the next element in the message body tokenized at the level of abstraction that the protocol 2516_1 expects to see in the message object 2520. The transport binding object 2518_1 then writes the next element into the context 2514_1.

Assuming that the call 1 from the message object 2520 is for the first token to be extracted from the XML message body 2522, the dispatching token reader 2530 will invoke 2 the default token reader 2501 and the default token reader 2501 will then begin to read the message body's text and provide 3 an object-oriented stream containing element start tokens, element end tokens, element attribute tokens and element character data tokens. According to an implementation, the dispatching token reader 2530 analyzes the token stream provided by the default token reader 2501.

As a general description of the process executed by the dispatching token reader 2530, for each token received by the dispatching token reader 2530, the dispatching token reader 2530 will identify whether or not the token is registered within the dispatching token reader's registry. If so, the dispatching token reader will dispatch (e.g., "redirect") the token to the wrapper token reader that the registry identifies as being designed to handle the token. If no instance of the wrapper token reader has been created the dispatching token reader will first request a wrapper token reader factory 2540 to create an instance of the wrapper token reader and then dispatch the token to the newly created wrapper token reader instance.

In the case of the example being presently discussed, no wrapper token reader instances are assumed to exist at the time of the call 1 from the message object 2520 because the call 1 is the initial call made for the XML message body 2522. Moreover, assuming the initial element in the message body corresponds to the XML address element 2301 depicted in FIG. 23, the stream of tokens 2411 thru 2422 depicted in FIG. 24 will be the initial token stream provided 3 by the default token reader 2501. Moreover, as discussed with respect to FIGS. 22 through 24, assume that a first wrapper token reader is used to consolidate the tokens 2413 thru 2415 into token 2430, the address city tokens 2416 thru 2418 and the address postal code tokens 2419 thru 2421 into tokens 2430, 2431 and 2432, respectively; and, that a second wrapper token reader is used to consolidate tokens 2411, 2412, 2422, 2430, 2431 and 2432 into token 2440.

According to this example, the dispatching token reader 2530 will first receive tokens 2411 and 2412 from the default token reader 2501. These tokens 2411, 2412 will be registered with the dispatching token reader 2530 as being properly processed by the second token reader wrapper described above (i.e., the "address element" token reader_2 that ultimately will provide token 2440 to the message object 2520). Because tokens 2411, 2412 represent the first tokens to appear from the XML message body 2522, no wrapper token reader instances have been manufactured for the particular message body being tokenized.

As such, the dispatching token reader 2530 will invoke 4 the wrapper factory 2440 in order to create an instance 2505 of the second token reader_2 2505. After the second instance of the token reader_2 2505 is created, the dispatching token reader 2530 will forward 5 tokens 2411, 2412 to the second token reader_2 2505. At this point, the second token reader_2 2505 still needs tokens 2430, 2431, 2432 and 2422 before it can generate token 2440 for the message object 2520. Note that, in an implementation, the factory 2540 is used to support the simultaneous message processing activity of multiple runtime framework instances that run "in parallel", while, the dispatching token reader 2530 is dedicated to the particular runtime framework instance that message object 2520 corresponds to.

After an instance of the second wrapper token reader_2 2505 has been created and tokens 2411 and 2412 have been passed to this second wrapper token reader_2 2505, the dispatching token reader 2530 will begin to process the token stream provided by the default token reader 2501 starting from token 2413 (address name start element item) and thereafter. Upon the dispatching token reader's 2530 receipt of token 2413, the dispatching token reader 2530 will recognize that: 1) the first wrapper token reader_1 2503 is registered as being the proper wrapper token reader for processing token 2413; and, 2) an instance of the first wrapper token reader_1 2503 needs to be created (for essentially the same reasons expressed above). As such, the dispatching token reader 2530 will again invoke 4 the factory 2540 in order to create an instance 2503 of the first wrapper token reader_1 2503. After the instance of the first wrapper token reader_1 2503 is created, the dispatching token reader 2530 will forward 6 to it token 2413.

The dispatching token reader 2530 will then receive tokens 2414, 2415 which will subsequently be dispatched 6 to the first wrapper token reader_1 2503. After token 2415 is dispatched 6 to the first wrapper token reader_1 2503, the first wrapper token reader_1 2503 will generate token 2430 and forward 7 it to the dispatching token reader 2530. The dispatching token reader 2530 will check its registry, identify wrapper token reader_2 2505 as the appropriate wrapper token reader for that token, and forward 5 token 2430 to wrapper token reader_2 as a consequence. The same kind of process then repeats for tokens 2416 thru 2418 (being dispatched from the default token reader 2501 to the first wrapper token reader_1 2503), and, token 2431 (being dispatched from the first wrapper token reader 2501 to the second wrapper token reader_2 2505). The same kind of process again repeats for tokens 2419 thru 2421 (being dispatched from the default token reader 2501 to the first wrapper token reader_1 2503), and, token 2432 (being dispatched from the first wrapper token reader 2501 to the second wrapper token reader_2 2505).

Token 2422 is then forwarded 3 from the default token reader 2501 to the dispatching token reader 2530 which in turn dispatches 5 token 2422 to the second wrapper token reader_2 2505 (based on its registry information). The second wrapper token reader_2, at this point, has collected all tokens needed to generate token 2440. Token 2440 is sent 8 to the dispatching token reader 2530. Here, no entry is listed in the registry for token 2440, and, the dispatching token reader 2530 forwards 9 token 2440 to the received message object 2520 as a consequence.

Upon the received message object 2520 receiving token 2440, the received message object 2520 will send a second "next" call to the dispatching token reader 2530 and writes token 2440 into the context 2514_1. A process that follows the structure of the process described just above will be performed (resulting in the second token being given to the message object 2520). Eventually the entire message body will be processed and its contents, tokenized at the level expected by the protocol 2516_1 and as abstracted by the wrapper token readers will be present in the message object 2520. According to one implementation, the tokens presented to the message object 2520 are in byte array or string form and therefore are placed into a serialized portion of the context 2514_1.

FIG. 25b depicts a reverse architecture for serializing response message body content in the outbound direction. Here, a high level token representing a high level "parent" element is passed 1 from the message object 2524 to a dispatching token writer 2550. The dispatching token writer 2550 checks a registry and, if a registry entry exists for the token received from the response message object 2524, identifies the wrapper token writer that expands the token into a collection of tokens (e.g., wrapper token writer_2 2515). The dispatching token writer 2550 causes 2 an instance of the wrapper token writer to be created by a factory 2560 if the token passed 1 by the message object 2524 is the first token for the outbound message body to involve the wrapper token writer.

The token received at 1 by the dispatching token writer 9210 is then passed 3 to the newly created wrapper token writer 2515, which, in turn, generates an expanded collection of tokens from the initial token. The expanded tokens are sent 4 to the dispatching token writer 2550. Those that have no entry in the registry (if any) are directed 5 to the default token writer 2521.

Those that have a registry entry are directed to 6 the next, lower level wrapper token writer. The process repeats until the token originally passed 1 by the response message object 2524 is completely broken down and written into the textual (e.g., XML) message body by the default token writer 2521.

Note that for both de-serialization (inbound) and serialization (outbound) processes, additional wrapper token readers may be implemented at the "top" of a processing chain of wrapper token readers/writers to perform more substantive functions beyond mere token consolidation/expansion. For instance, in the case of the WS Security protocol, a wrapper token reader could be implemented to actually perform decryption (unscrambling of message body content)/encryption (scrambling of message body content) and/or signature checking/writing.

Transport Binding

As discussed at various points above, the transport binding object 618 is largely responsible for orchestrating the conversion of a message's content between its transported form and the object oriented representation of such content. Specifically, at process 704 of FIG. 7, the transport binding object 618 detects the message key for the message (by analyzing the output stream of a token reader 639) and looks up the endpoint method information from the Web services data 613 At process 708 of FIG. 7, the transport binding object 618 generates the input parameters for the endpoint method (again, by analyzing the output stream of a token reader 639). At process 710 of FIG. 7, the transport binding object 618 orchestrates the use of a token writer between the message body 926 of the response message object 924 and the actual text based response message 623. For the processing of message header information, the transport binding: 1) orchestrates the use of a DOM reader between the header of the text based received message 622 and the header portion of the received message object 923; and, 2) orchestrates the use of a DOM writer between the header portion of the response message object 924 and the header of the text based response message 623.

Figure 26:
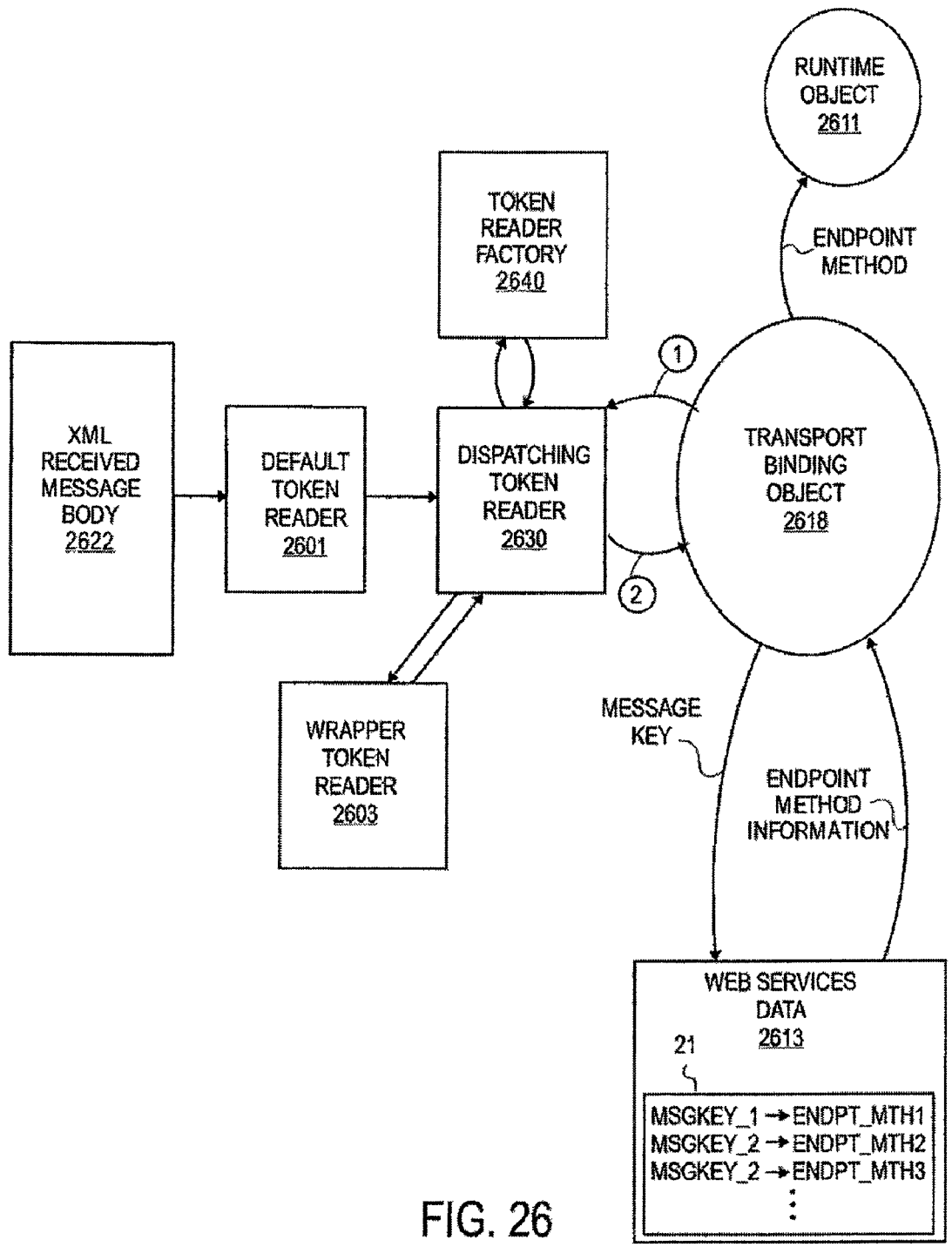
FIG. 26 shows a message key extraction architecture.

FIG. 26 shows an architecture for performing a basic message key identification process with a dispatching token reader. According to the basic architecture of FIG. 26, the message key information is contained within an element within the received message body 2622. A wrapper token reader 2603 is designed to process tokens from the default token reader 2601 that corresponds to the message key element. As such, using a dispatching token reader based embodiment as an example, the only tokens that are registered with the dispatching token reader 2630 are those that are generated from the message key element within the message body 2622. When tokens from the message key element are forwarded from the default token reader 2601 to the dispatching token reader 2630, the dispatching token reader 2630 will forward them to the wrapper token reader 2603 which will then produce a higher level token containing the message key information.

In an embodiment, the Web service is structured such that the message key element is the first element in the message body. As a consequence, the initial tokens to be produced by the default token reader 2601 will pertain to the message key element. The dispatching token reader 2630 will cause an instance of the token reader 2603 to be created by factory 2640 and then dispatch the tokens to the created wrapper token reader 2603. Because the message key element is the first element in the received message body, the message key information will be contained by the first token that is presented 2 to the transport binding object 2618 in response to the transport binding's first "next" call 1 made to the dispatching token reader 2630.

If the message key is not the first element in the message body, the transport binding object 2618 may have to run through a series of "next" calls to the dispatching token reader 2630 before it receives the token having the message key information (because the dispatching token reader 2630 will forward to the transport binding object 2618 any tokens that are not identified in its registry). The initial returned tokens that do not pertain to the message key element are simply dropped and/or ignored by the transport binding object 2618. Eventually, a "next" call will be responded to with the token having the message key information.

In an alternate implementation, all tokens that could be produced by the default token reader 2601 are registered with the dispatching token reader 2630 so that all tokens from the default token reader 2601 are dispatched to the wrapper token reader 2603. In this case, the wrapper token reader 2603 is designed to ignore/drop all tokens that do not pertain to the message key element and create a higher level token from those tokens that were generated from the message key element. According to this design approach, the transport binding object 2618 only has to make a single "next" call to the dispatching token reader 2630 regardless of where the message key is located within the message body.

In another approach, a dispatching token reader is not used and instead a wrapper chain is used as discussed above with respect to FIG. 22. In one basic wrapper chain implementation, a single message key wrapper is used to determine the message key from the token stream provided by the default token reader. In the most basic implementation, no wrapper token reader exists. As a consequence the transport binding object 2618 is responsible for comprehending the highly granularized token stream provided by the default token reader and extracting the message key information from it.

Regardless of the manner in which the message key information is obtained, after it is obtained by the transport binding object 2618, the transport binding object 2618 uses the message key to look up from the Web service data 613, 2613 information specific to the endpoint method that is appropriate for responding to the content of the received message body (e.g., 1) the name of the method; 2) the order and type of the objects that the method accepts as input parameters; 3) the type of object that the method returns; and, 4) the exceptions that the method may throw in the case of a fault condition) and uses this information (along with the endpoint classloader as described below) to generate input parameter objects for the endpoint method. The input parameter objects are then generated and provided to the runtime object 2611. Note that, for any of the approaches discussed above, the message key element could be contained in the message header. The message key information can still be successfully obtained as long as the default token reader analyzes the message header (instead of or in addition to the message body).

Figure 27:
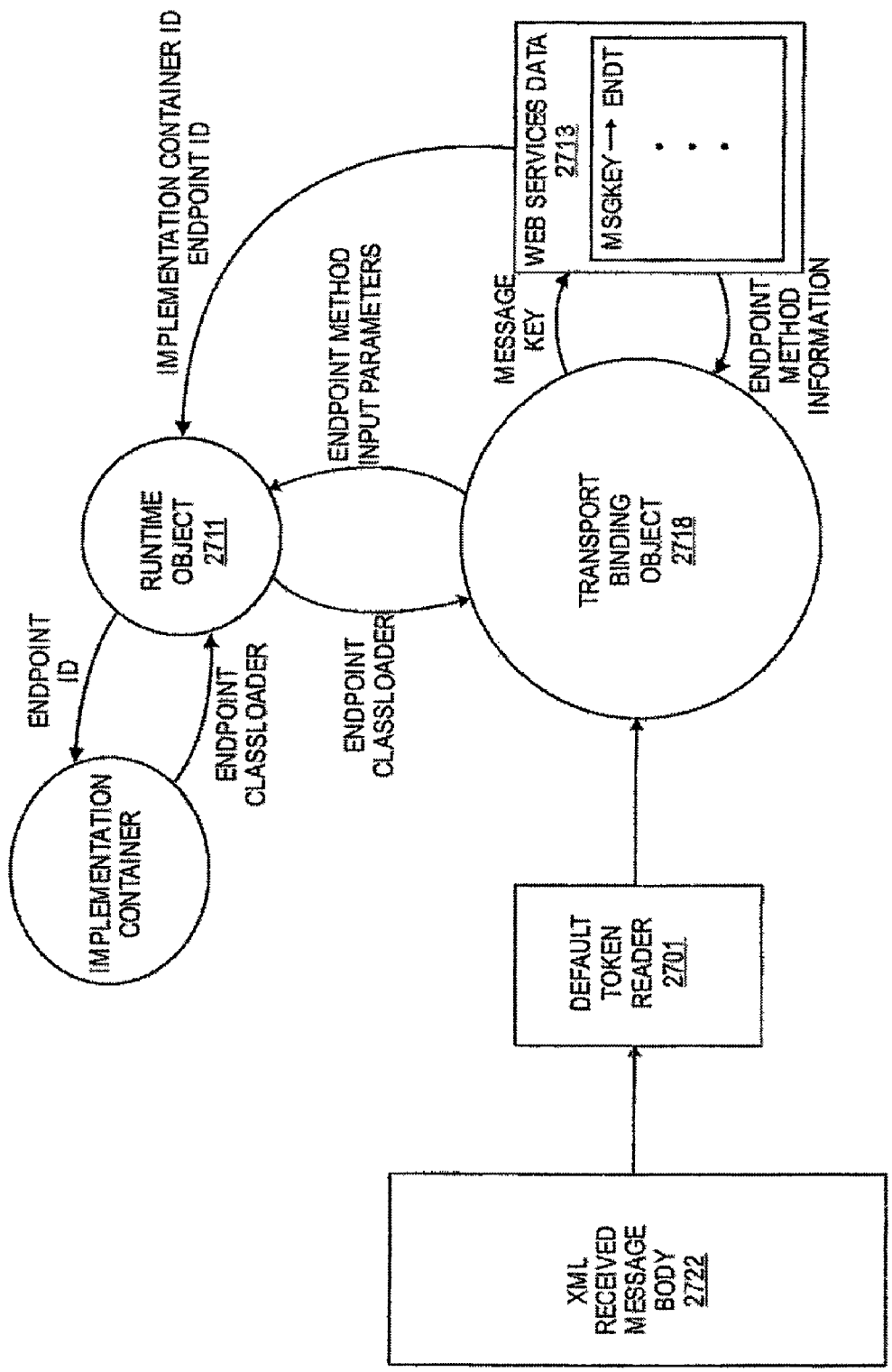
FIG. 27 shows an endpoint method input parameters extraction architecture.

FIG. 27 depicts an architecture for the endpoint method input parameter extraction process. In a service provider side implementation, along with the endpoint method information being provided to the transport binding object 2718 by the web service data, the runtime object 2711 retrieves the identity of the endpoint and its container (i.e., the "implementation container") from the Web service data 2713. The runtime object 2711 uses this information to fetch both an instance of the implementation container at process 706) and the endpoint's classloader (at process 707) (referring briefly to FIG. 7) and then provides the endpoint's classloader to the transport binding object 2718. After the information specific to the endpoint method and the endpoint's classloader has been provided to the transport binding object 2718, the transport binding object 2718 creates instances of objects to be used as input parameters for the endpoint method. Essentially, the classloader is used to identify a class object for each input parameter object instance to be created. Each such class object is then used to create an "empty" input parameter object instance. Each empty input parameter instance is "filled" with appropriate input parameter information that the transport binding object 2718 identifies from the received message body 2722.

The transport binding object 2718 then provides the filled input parameter object instances to the context 914. In order to fill the input parameter object instances with their corresponding information, in one approach, the transport binding object 2718 uses a default token reader 2701 to deserialize from text to object-oriented form at least those portions of the received message body 2722 that correspond to the endpoint method's input information. According to an implementation, the Web service defines its communication semantics such that any parameter that can be received in a message body and used as an input parameter for an endpoint method must be represented in the message body as a separate element having a name defined by the Web service. The name of the element must map directly to the name of the input parameter used by the endpoint method.

Therefore, once the transport binding object 2718 has identified the names of the parameters from the method specific information it received from the Web services data 2713, the transport binding object 2718 merely has to look for elements in the message body 2722 having the same names. In an implementation, as depicted in FIG. 27, the transport binding object receives the highly granularized stream of tokens from the default token reader 2701. The transport binding object 2718 essentially looks for start element tokens having one of the looked for names of the endpoint method parameters. The transport binding object 2718 consolidates tokens for a same input parameter (e.g., a start element token, character data token and end element token for a particular input parameter) and, once it recognizes the complete element is in its possession, fills the "blank" object instance reserved for the input parameter with the element's substantive content. When all the elements pertaining to the looked for input arguments are found and their corresponding input parameter objects are filled, the input arguments are provided to the context. In alternative implementations one or more wrapper token readers could be used (in a chain as described above with respect to FIG. 22, or, with a dispatching token reader as described above with respect to FIGS. 25a,b) to process the output stream from the default token reader 2701 and provide the transport binding 2718 with specific input parameter values (which the transport binding fills into their corresponding input parameter objects). In an implementation, the input parameter object instances are "string" objects (e.g., akin to a serialized byte array) in order to support their later use as input arguments for the endpoint method. In a further implementation, the context 914 is partitioned into a serialized sub-section whose contents are persisted during hibernation, and, the string input parameter objects are written into this partition for convenience/consistency.

The transport binding also, as depicted at process 702 of FIG. 7, generates a received message object 920 (of FIG. 9) for the context 614 that is later "filled in" with details derived from the actual content of the message to be processed (as discussed above with respect to FIGS. 22 and 25*a*). Here, the transport binding deals with the structure of the received message body, and, therefore, in an implementation, has access to a classfile that produces the message object 920 for the particular type of message that the received message corresponds to (e.g., SOAP, MIME, DIME, etc.). During the initial building 702 of the context 614, the received message object that is loaded into the context 614 is akin to an "empty template" whose structure is consistent with the received message type (e.g., a header portion and a body portion for a SOAP message) but whose substantive content is empty or "blank" (i.e., no specific items of data from the received message are in the message object).

Figure 28:
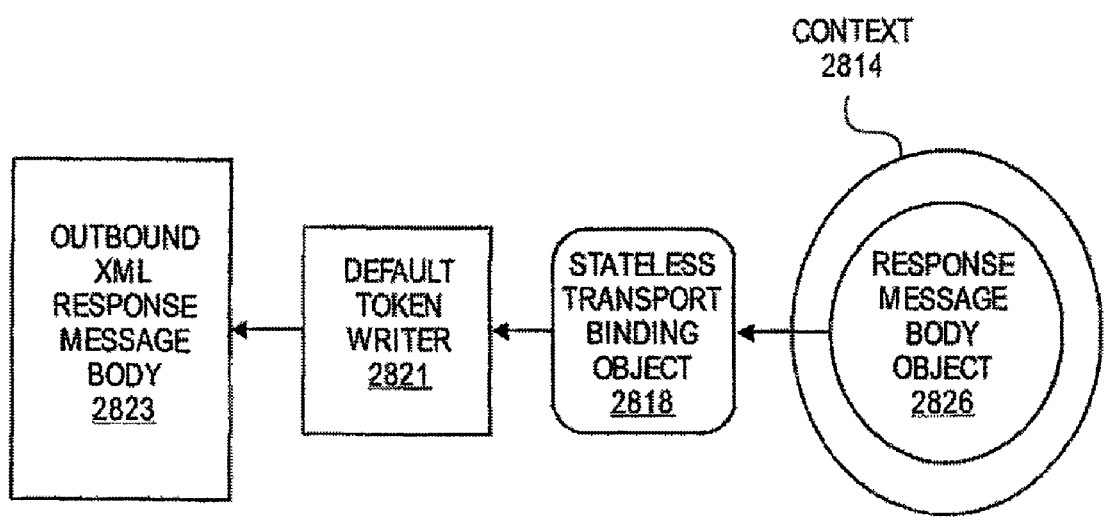
FIG. 28 shows an message body serialization architecture.

In the case of serializing the object oriented representation of the response message body (previously depicted as the body 926 portion of the response message object 924 in FIG. 9), any of the following architectures could be used: 1) the transport binding object 2818 invokes a single default token writer (depicted in FIG. 28) and conveys response message content from the response message body object 2824 to the default token writer 2821; 2) the transport binding object invokes a chain of token writers that include at least one wrapper token writer (e.g., akin to the reverse of architecture of FIG. 22) and conveys response message content from response message body object 2826 to the wrapper token writer chain; 3) the transport binding object invokes a dispatching token writer (e.g., akin to the reverse of architecture of FIG. 25*b*) and conveys response message content from response message body object 2826 to the dispatching token writer. In the later approach, wrapper token writers may or may not exist.

In an implementation the transport binding is also stateless so that it can easily be reapplied from process to process. Here, recall from FIGS. 6 and 7 that the transport binding is initially used to create 702 the message objects 920, 920. Some state information maintained by the transport binding is created at this time that involves the type of message that the message objects represent (e.g., whether the message objects use BinaryXML or XML 1.0 formatting so that the proper default token reader can be invoked). By making the transport binding stateless, such state information can be externally written from the transport binding object into the context prior to hibernation. Upon wake up from hibernation, the state information is re-loaded from the context back into the transport binding object.

Deployment

When deploying Web services, the needs of the Web service provider should be taken into consideration. For example, the archive file deployed for the Web service should include information regarding the possible generation of additional Web service data and the Web service data state. This Web service data state is the initialization data used by the Web service during its start up.

Furthermore, it is desirable to have a common deployment archive structure for each implementation type instead of requiring separate archives for each Web service deployed. The use of a common deployment archive requires less maintenance (such that a unique archive structure does not need to be developed each time a Web service is deployed) and provides standardized mechanism for deploying a Web service. The archive file contains different types of descriptors that define and/or configure the web services within the archive.

Figure 29:
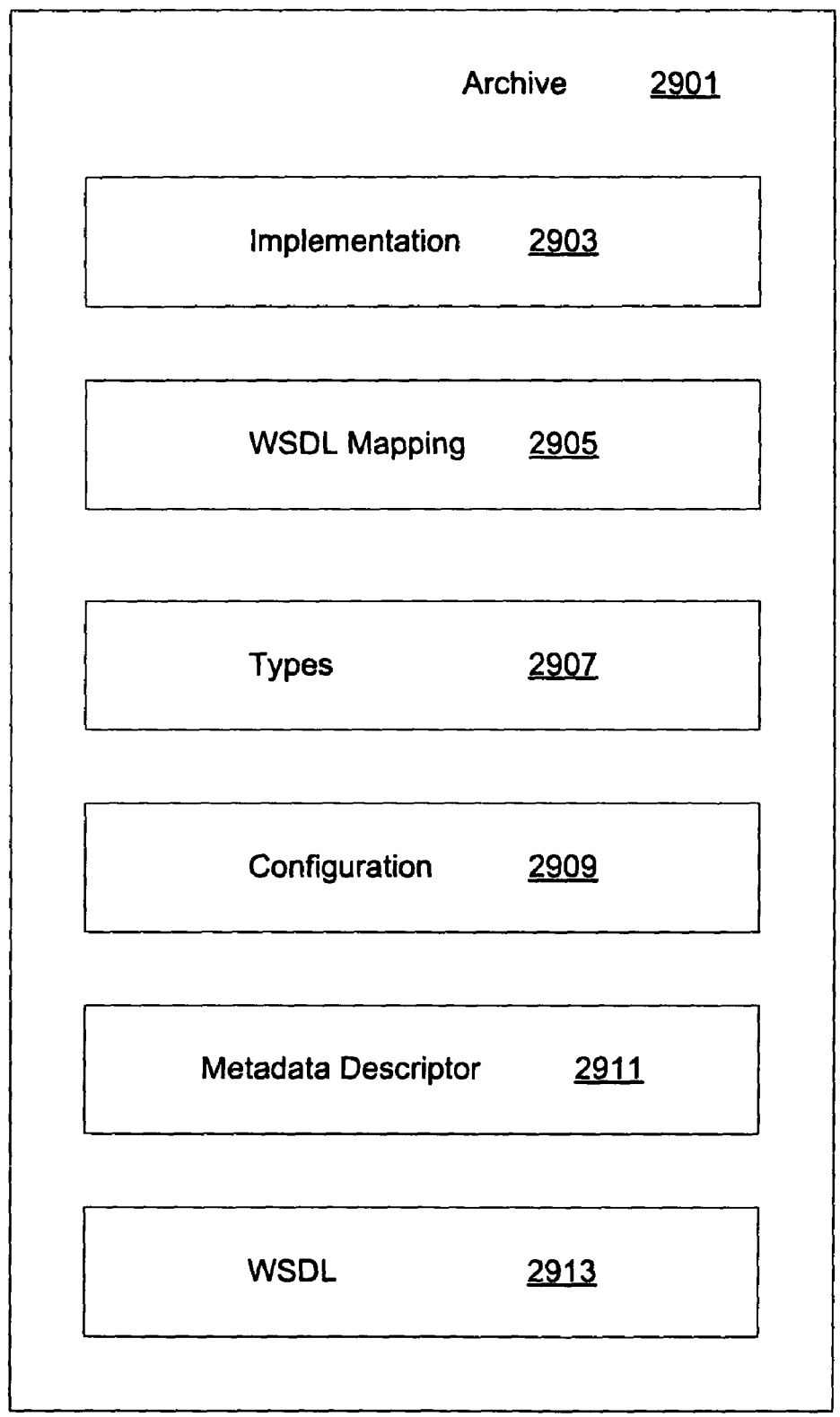
FIG. 29 shows an embodiment of a deployable archive file.

FIG. 29 illustrates an embodiment of a deployable archive file 2901. This archive file is generated prior to deployment and is used to deploy a Web service on a server. A different archive file may be created and/or maintained for each class of a Web service implementation including, but not limited to, Enterprise Java Bean (EJB), servlet, Java class, etc. For example, when an EJB is to be deployed the archive will include EJB specific information.

The archive file includes the necessary implementation classes 2903 and the descriptors for the implementation class. These descriptors and classes define and/or configure the Web service that is being deployed. In one embodiment, the descriptor files are XML files. The deployment descriptors describe a configuration of the Web service implementation for the application server that received the Web service archive. Describing a configuration of a Web service implementation for the application server refers to, for example, specifying a communication protocol implementation and/or a security protocol implementation for the Web service that is supported by the application server. For example, in an embodiment, the received deployment descriptors specify a transport binding for the Web service that is supported by the application server. The specified transport binding may be, for example, HTTP, HTTPS, FTP, SMTP, SOAP over HTTP, SOAP over HTTPS, SOAP over FTP, SOAP over SMTP, at the like. Similarly, the deployment descriptors may specify that Web service messages be authenticated by, for example, an implementation of a certificate protocol. The deployment descriptors may also include other information that is specific to the receiving application server such as an address for the configuration of on the application server (e.g., a URL) and/or a name for the configuration.

The WSDL mapping descriptor 2905 describes the mapping between the Web service and the WSDL file. For example, the mapping from Java to XML or XML to Java. The mapping information 821 (e.g., endpoint mapping) and/or implementation container identity 822 may use this WSDL mapping descriptor 2905 to define endpoint methods and identifications respectively.

The types descriptor 2907 contains additional information about the WSDL schema. For example, the types descriptor 2907 may specify the mapping between XML complex types and Java class files such as changing a complex type into a set of methods (which complex type should fill which field in an endpoint method). The Java serialization framework uses these mapping to serialize the Java class files to XML and/or to instantiate the Java class files from XML correctly.

The configuration file 2909 is used to keep the entire configuration of web services and/or web services client. Generally, this is extra information not included in a WSDL file such as protocol definitions. In one embodiment, the configuration model is divided into two logical parts of design-time and run-time. Design-time helps define basic requirements that are needed to access the WS endpoint (e.g., the endpoint requiring authentication in order to work properly and securely). Run-time helps define how design-time configurations are met (e.g., requiring basic authentication (e.g., username/password) and/or strong authentication (e.g., X509 authentication certificates) for allowing access to the endpoint). The protocol stack definition 820 may include information from the configuration file 2909.

The archive includes a WSDL file 2913 for the Web service. The WSDL, as discussed above, describes the Web Service(s) to be deployed.

While archives should contain the same information, they do not necessarily have to maintain the same directory structure. The archive has a metadata descriptor 2911 for the above descriptions and for each service that describes where the files in the archive are located.

In an embodiment, at least some of the different types of files and information included in a client services archive 3201 are generated using the techniques described earlier.

Figure 30:
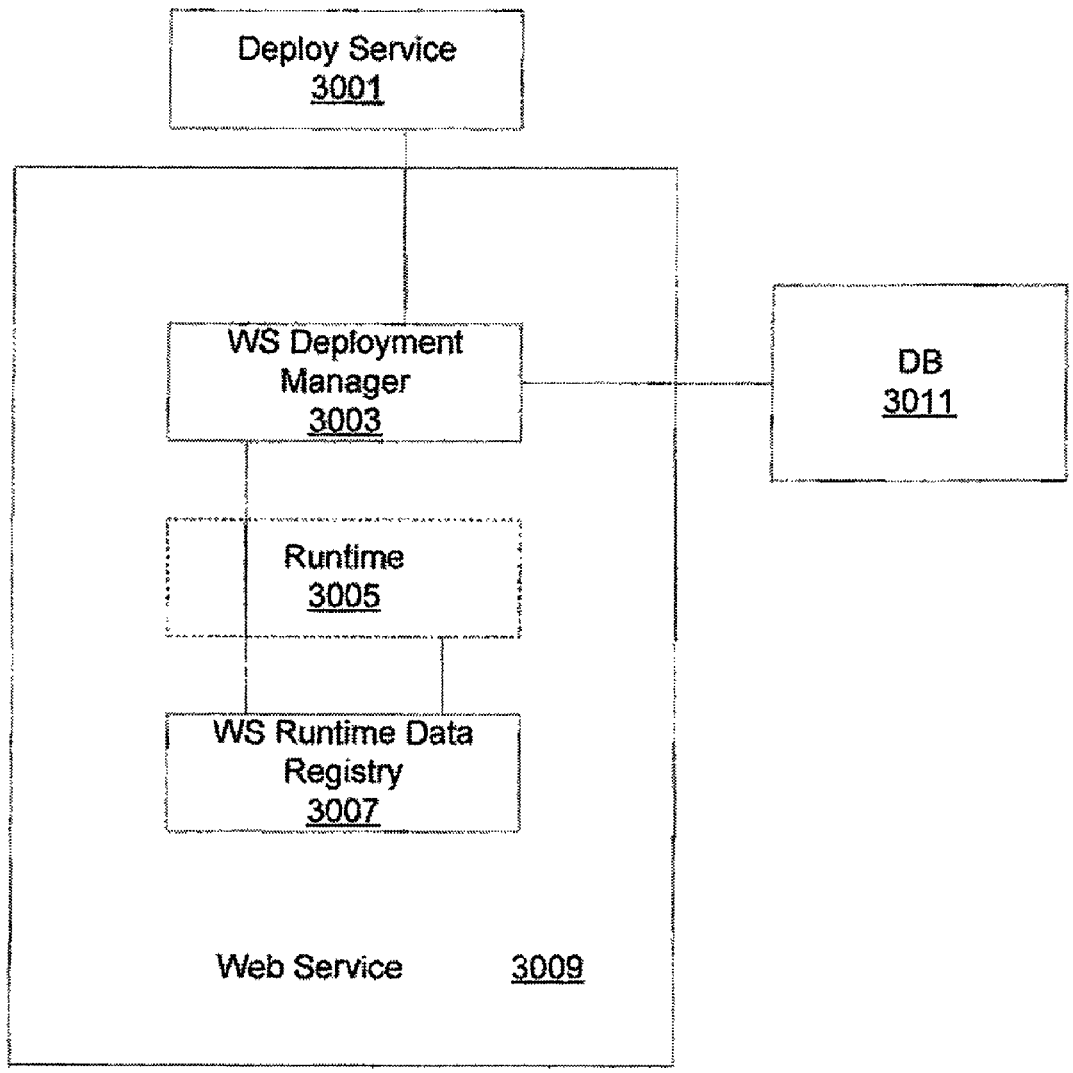
FIG. 30 shows an embodiment of a server side deployment.

FIG. 30 illustrates an embodiment of a server side deployment. A deployment service 3001 receives at least the client deployable archive file that is to be deployed as a Web service 3009.

A deployment manager 3003 on the client receives only archives with Web services components. For example, a developer specific archive (Microsoft, IBM, SAP, Oracle, etc.), a web (servlet) archive (WAR), or a Java application/configuration (EJB, etc.) archive. The deployment manager 3003 also stores the components in an external database 3011 and registers the components in the Web service runtime data registry 3007 on application start up. For example, the deployment manager 3003 may register components with the Web services data registry 612.

Figure 31:
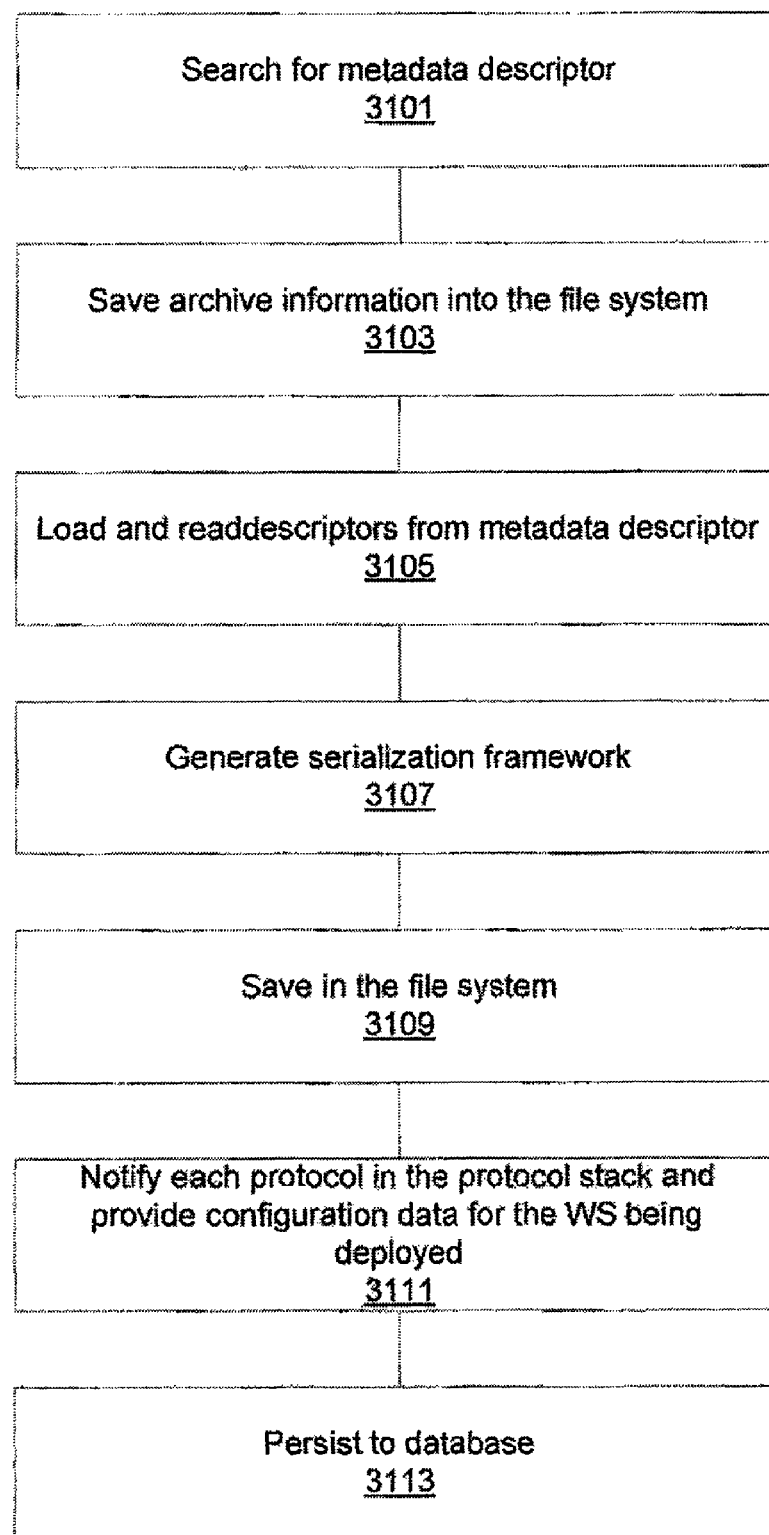
FIG. 31 illustrates an embodiment of a method for server archive deployment.

FIG. 31 illustrates an embodiment of a method for server archive deployment. At 3101, the archive is searched for a metadata descriptor file. As described earlier, the metadata descriptor file describes the mapping between the Web service and the WSDL file, such as the mapping from Java to XML or XML to Java. This information is saved into the file system of the server at 3103.

The descriptors from the metadata descriptor are read and loaded (processed) at 3105. Reading determines which Web services are described in the archive. Loading stores the metadata into the proper WS data registry. At 3107, a set of objects that are for serializing/deserializing Java input parameters into XML. These objects are also referred to as the serialization framework. The serialization framework is generated using the WSDL schema section and the types descriptor of the archive. Since the types descriptor 2907 contains additional information about the WSDL schema it may specify the mapping between XML complex types and Java class files such as changing a complex type into a set of methods (which complex type should fill which field in an endpoint method). The Java serialization framework uses these mapping to serialize the Java class files to XML and/or to instantiate the Java class files from XML correctly. During runtime, these objects (Java serialization framework) process a token stream from a token reader to fill endpoint method input parameter into object oriented (Java) form for the stateless transport binding object 618.

The Java serialization framework is saved in the file system for use by the server at 3109.

In an embodiment, protocols in the protocol stack is notified and provided with configuration data for the Web service being deployed at 3111. The configuration data alerts the protocol of any "special" input parameters for the Web service that deviate from the norm. Exemplary special input parameters include, but are not limited to, initial values to be set such as login protocols and how long the reliable messaging protocol stays in hibernation before terminating a session. Each protocol may decide if it is to be notified. In another embodiment, this notification and provisioning is skipped.

At 3113, the archive, serialization framework, and/or metadata descriptors are persisted into a remote database.

Client Side Web Service Deployment

Web services client applications may need to be deployed on the client side to communicate with the Web service provider. For example, the client will need to know how to communicate (what protocols to use) and where to communicate (which ports to use).

Figure 32:
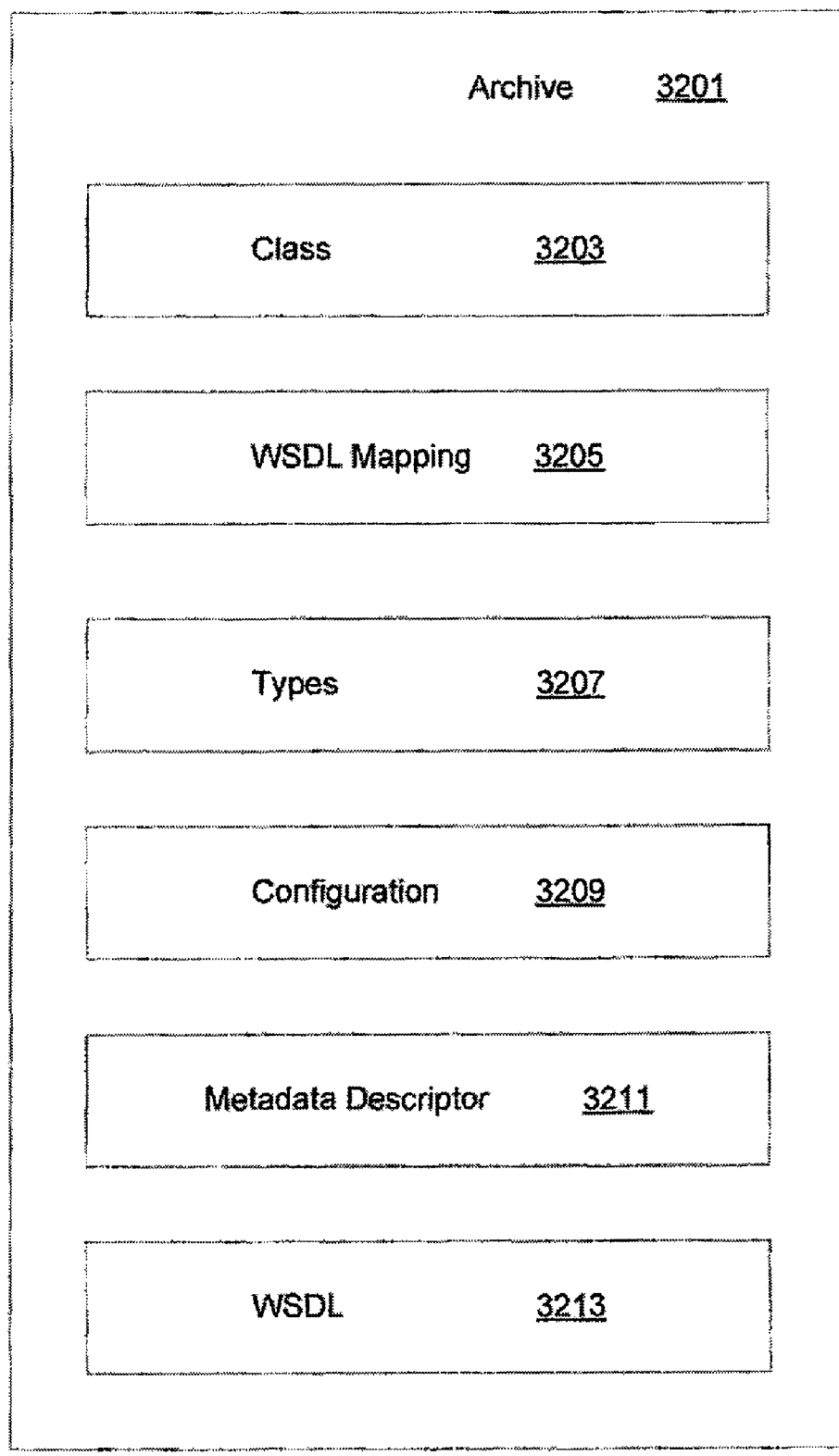
FIG. 32 illustrates an embodiment of a client deployable archive file.

FIG. 32 illustrates an embodiment of a client deployable archive file 3201. This archive file is used to deploy a Web service client application or applications on a client. A client application serves as a proxy for the Web service but running on the consumer/client side. The archive is a developer specific archive.

The archive file includes the necessary class descriptors 3203 for application including, but not limited to proxy interface classes and container classes. The proxy interface classes define the objects that represent the web service. Container classes define input/output parameters.

The WSDL mapping descriptor 3205 describes the mapping between the Web service and the WSDL file. For example, the mapping from Java to XML or XML to Java.

The types descriptor 3207 contains additional information about the WSDL schema. For example, the types descriptor 3207 may specify the mapping between XML complex types and Java class files such as changing a complex type into a set of methods (which complex type should fill which field in an endpoint method). The Java serialization framework uses these mapping to serialize the Java class files to XML and/or to instantiate the Java class files from XML correctly.

The configuration file 3209 is used to keep the entire configuration of web services and/or web services client. Generally, this is extra information not included in a WSDL file such as protocol definitions. In one embodiment, the configuration model is divided into two logical parts of design-time and run-time. Design-time helps define basic requirements that are needed to access the WS endpoint (e.g., the endpoint requiring authentication in order to work properly and securely). Run-time helps define how design-time configurations are met (e.g., requiring basic authentication (e.g., username/password) and/or strong authentication (e.g., X509 authentication certificates) for allowing access to the endpoint).

The archive includes a WSDL file 3213 for the Web service. The WSDL, as discussed above, describes the Web Service(s) to be deployed.

While archives should contain the same information, they do not necessarily have to maintain the same directory structure. The archive has a metadata descriptor 3211 for the above descriptions and for each service group that describes where the files in the archive are located.

In an embodiment, at least some of the different types of files and information included in a client services archive 3201 are generated using the techniques described earlier.

Figure 33:
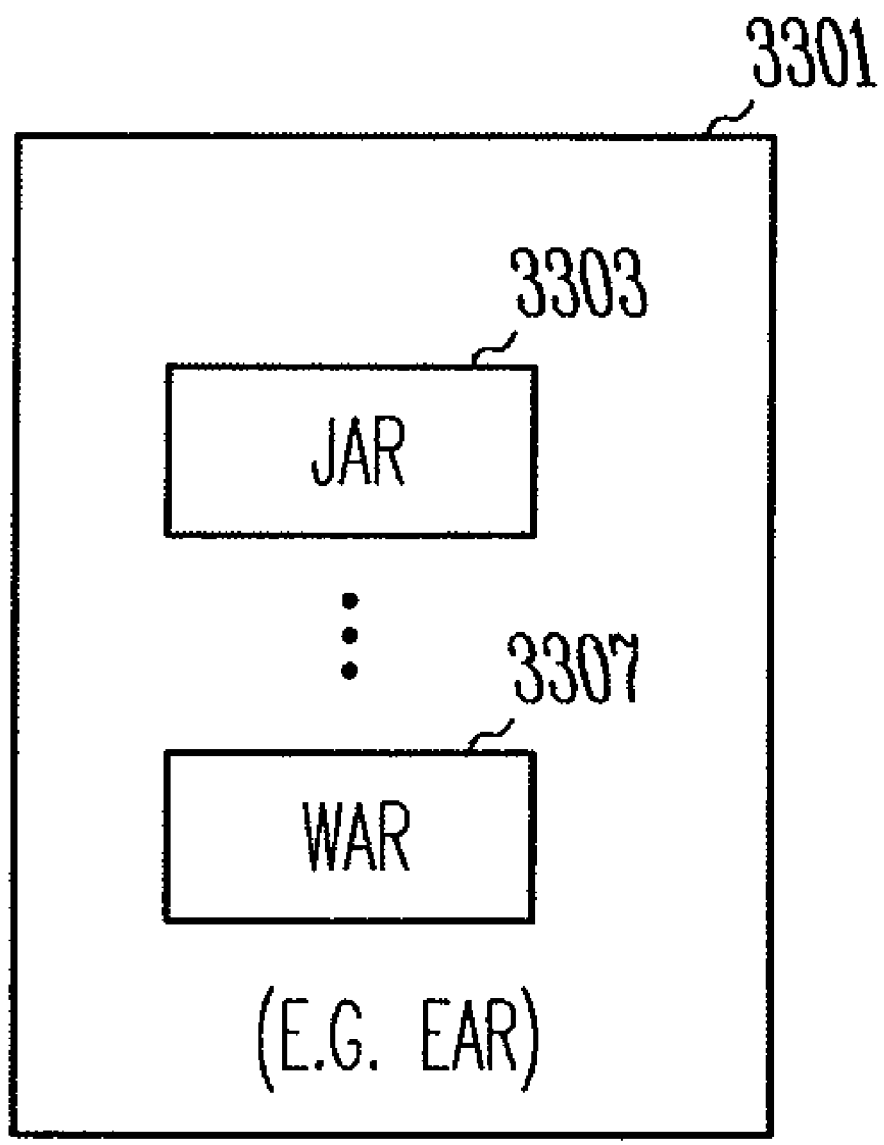
FIG. 33 shows an exemplary larger archive file with multiple deployment archives.

Multiple client or Web services deployment archives may included in a larger archive file. FIG. 33 illustrates an exemplary archive file 3301 with multiple deployment archives. The archive file 3301 includes separate, smaller archives for an EJB implementation (JAR) 3303 and Web implementation (WAR) 3307. Of course other archives not described and multiple types of the same archive may be included in one larger archive file. In one embodiment, archive 3301 is an Enterprise Archive (EAR) file.

Figure 34:
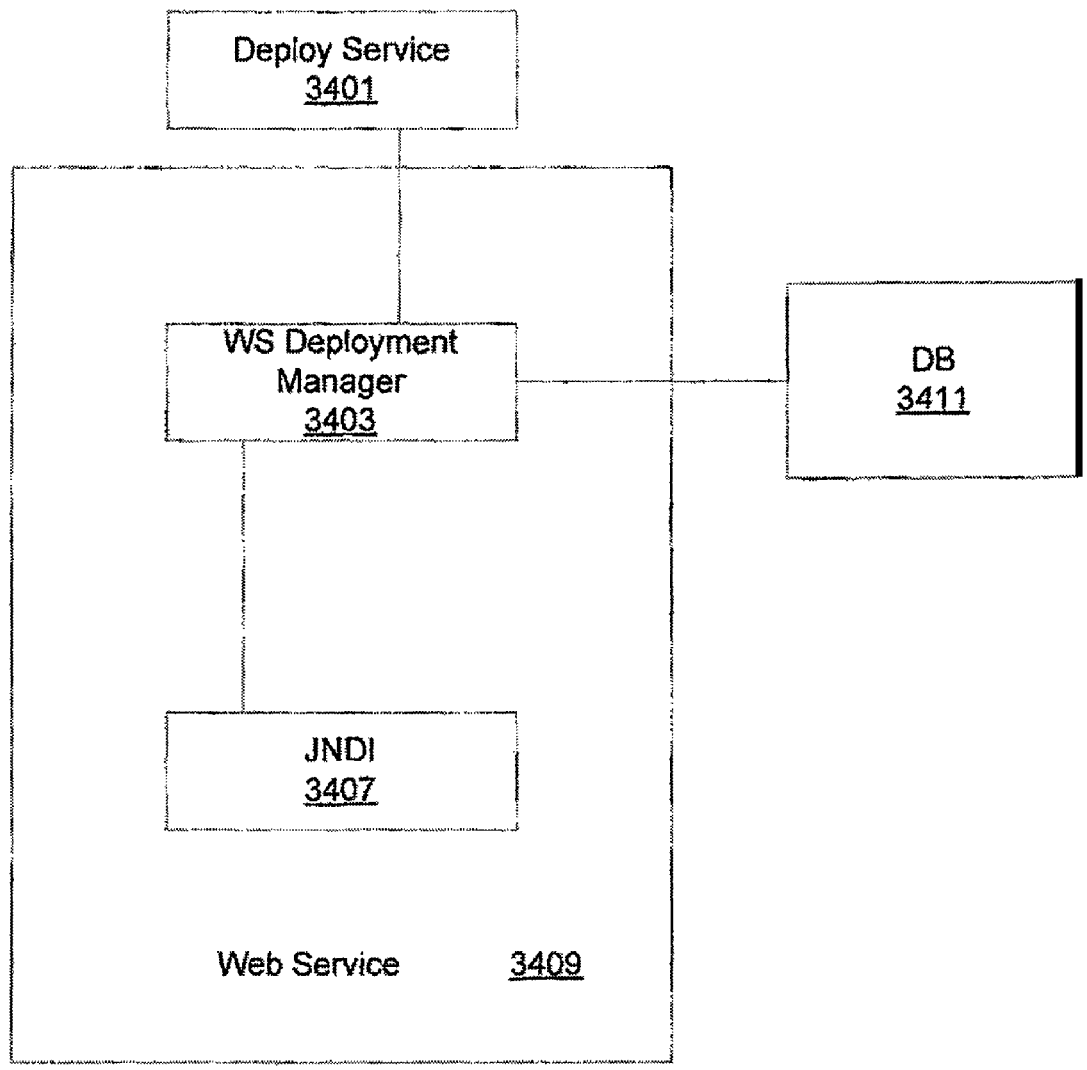
FIG. 34 illustrates an embodiment of a client side deployment.

FIG. 34 illustrates an embodiment of a client side deployment. A deployment service 3401 receives at least the client deployable archive file that is to be deployed on the Web service client 3409.

A deployment manager 3403 on the client receives only archives with Web services client components. For example, a developer specific archive. The deployment manager 3403 also stores the components in an external database 3411 and/or registers the components in the Java Naming Directory Interface (JNDI) registry on application start up.

Figure 35:
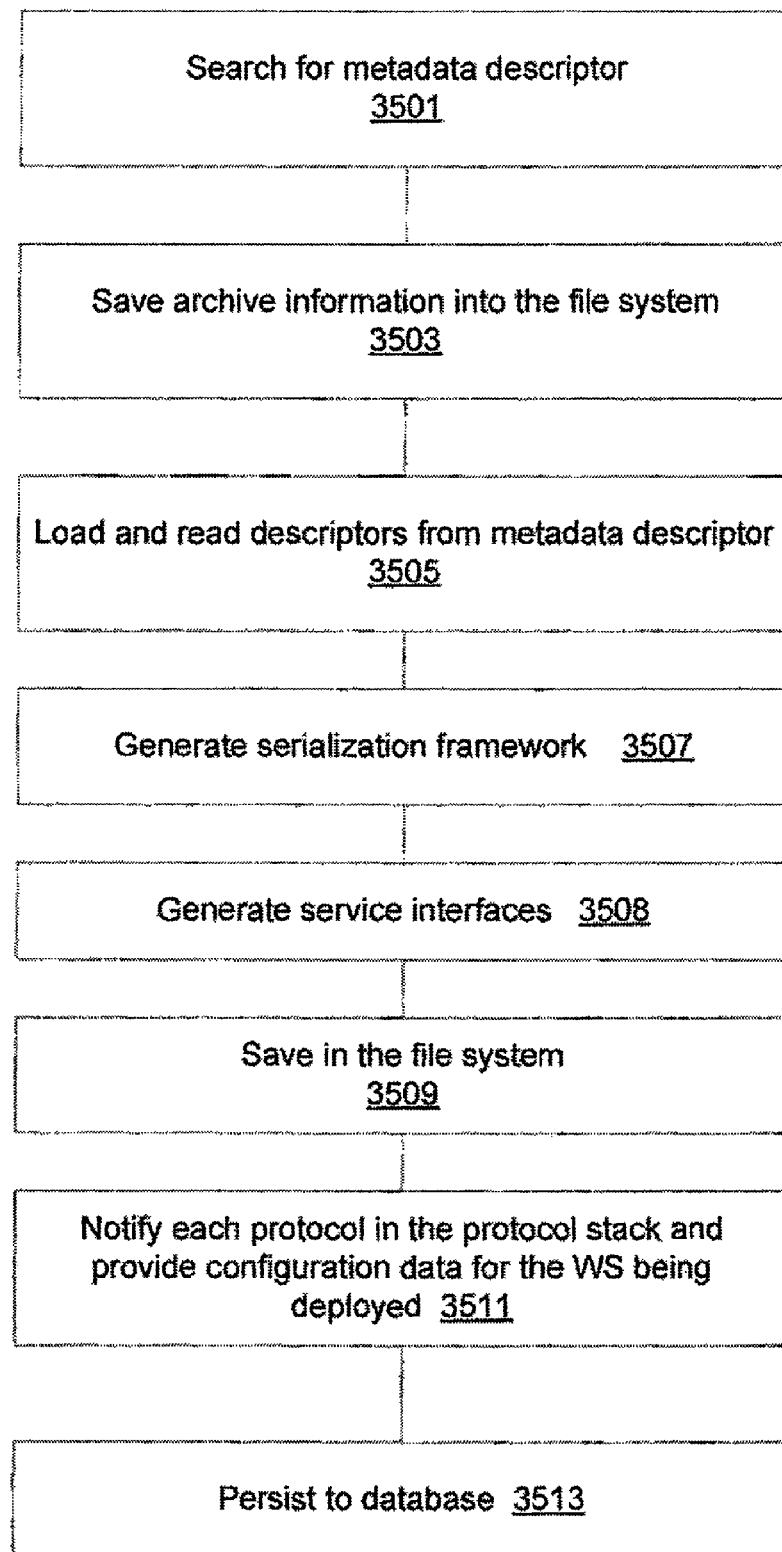
FIG. 35 illustrates an embodiment of a method for client archive deployment.

FIG. 35 illustrates an embodiment of a method for client archive deployment. At 3501, the archive is searched for a metadata descriptor file. As described earlier, the metadata descriptor file describes the mapping between the Web services group and the WSDL file, such as the mapping from Java to XML or XML to Java. This information is saved into the file system of the client at 3503.

The descriptors from the metadata descriptor are read and loaded (processed) at 3505. Reading determines which Web services are described in the archive. At 3507, a set of objects that are for serializing/deserializing Java input parameters into XML. These objects are also referred to as the serialization framework. The serialization framework is generated using the WSDL schema section and the types descriptor of the archive. Since the types descriptor 3207 contains additional information about the WSDL schema it may specify the mapping between XML complex types and Java class files such as changing a complex type into a set of methods (which complex type should fill which field in an endpoint method). The Java serialization framework uses these mapping to serialize the Java class files to XML and/or to instantiate the Java class files from XML correctly.

Implementation of service interface and service endpoint interfaces are generated at 3508. Generally, there is one service endpoint interface for each port of the client. These ports are used to access the correct endpoint on the server side. The WSDL file provides the messaging semantics to be used for the communication between the ports. The WSDL mapping file describes the necessary Java to XML or XML to Java mapping necessary for communication and processing. The configuration file contains the descriptors for port configuration.

The Java serialization framework, implementation of service interfaces, and service endpoint interfaces are saved in the file system for use by the client at 3509.

In an embodiment, protocols in the protocol stack is notified and provided with configuration data for the Web service being deployed at 3511. The configuration data alerts the protocol of any "special" input parameters for the Web service that deviate from the norm. Exemplary special input parameters include, but are not limited to, initial values to be set such as login protocols and how long the reliable messaging protocol stays in hibernation before terminating a session. Each protocol may decide if it is to be notified. In another embodiment, this notification and provisioning is skipped.

At 3513, the archive, serialization framework, and/or metadata descriptors are persisted into a remote database.

In one embodiment, the deployment manger 3403 performs at least a portion of the above method.

Common Model for Deployment

A Web services framework should be able to execute different deployment and lifecycle processes for Web services and Web services client applications even though they have different requirements. One of the ways for a framework to be able to handle the server and client side is to use a generic and common way to handle the different deployment and management scenarios that the server and client deal with.

Figure 36:
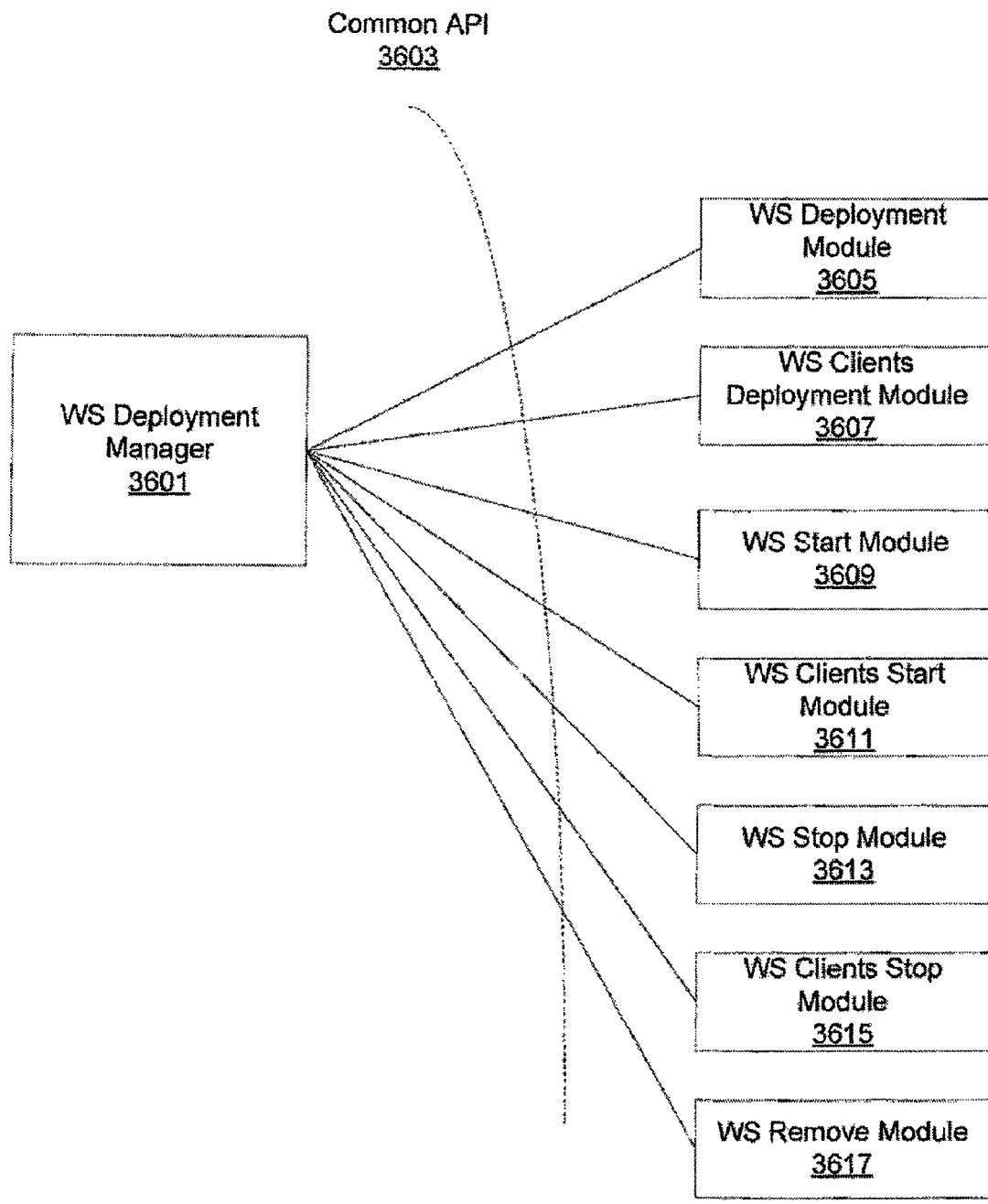
FIG. 36 illustrates an embodiment of a common deployment model.

FIG. 36 illustrates an embodiment of a common deployment model. A Web services deployment manager 3601 is on the server. This manager 3601 is responsible for at least some of the following tasks: deploying WS archive components, starting the WS or application, stopping the WS or application, and/or removing WS or application components.

The manager 3601 uses a common API (application program interface) 3603 to handle these tasks generically. The WS deployment framework executes all of the processes using this API and is therefore unaware of any specific processing that needs to be done or even what type of application (server or client) is being deployed. A generic command to deploy, start, stop, or remove is all that the deployment manager 3601 must know. The individual components accept these generic commands and perform the necessary tasks for their specific system.

The WS deployment module 3605 and WS client deployment module 3607 handle deployment tasks for a server and client respectively. Generally, one server node is deployed per cluster. Likewise, the WS start module 3609, WS stop module 3613 and WS client start module 3611 and WS client stop module 3615 handle at least some of the runtime aspects for the server and client. Of course, an even more generic deployment, start, and/or stop module may be used to handle tasks for both the server and the client. The start modules may be start an entire cluster at once or one node at a time.

The WS remove module 3617 removes WS components from either the server or client. Of course, less generic remove module could be created for both the server and the client.

Figure 37:
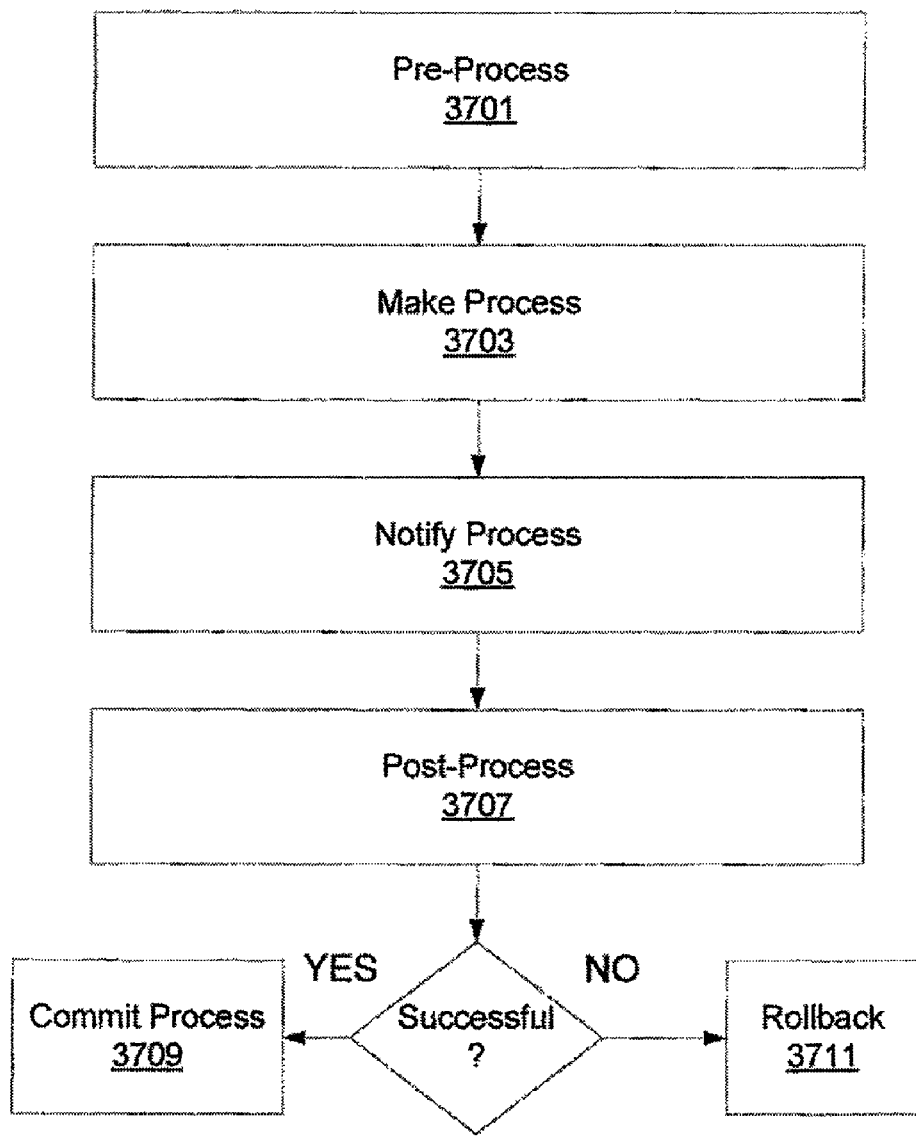
FIG. 37 illustrates an embodiment of a method used with a common API for deployment and maintenance tasks.

FIG. 37 illustrates an embodiment of a method of using the common API for common deployment and/or maintenance tasks (such as starting) of a WS.

At 3701, pre-processing is done as needed. For example, files from a database are downloaded such as the WS archive to be deployed. In one embodiment, pre-processing is performed by the applicable WS deployment manager.

The make process is performed at 3703. This process may include three parts: initialization, execution, and finishing. During initialization, the make process initializes the framework. For example, the metadata descriptor in archive file is located and/or the archive information is saved into the file system). This initializing part may be performed by the appropriate WS server or client deployment module. The proper startup module performs execution tasks such as reading metadata descriptors from the file system and instantiates the necessary serialization framework and interfaces, and binding the service interfaces to the JNDI (client) and/or loading the descriptors WS runtime data registry (server). The startup module may also notify protocols if so desired as an execution task. Finally, finishing tasks such as persisting the archive, serialization framework, and/or metadata descriptors to a database are performed.

At 3705, server nodes that did not get the deployed WS are notified that the WS was deployed. In an embodiment, protocols in the protocol stack is notified and provided with configuration data for the Web service being deployed. The configuration data alerts the protocol of any "special" input parameters for the Web service that deviate from the norm. Exemplary special input parameters include, but are not limited to, initial values to be set such as login protocols and how long the reliable messaging protocol stays in hibernation before terminating a session. Each protocol may decide if it is to be notified. In another embodiment, this notification and provisioning is skipped.

Deployment post-processing may be performed at 3707. For example, resources needed by a particular application loader are retrieved from a database or archive.

Make processing, notifying, and post-processing are sometimes referred to as the general phases (tasks) of processing a portion of a WS. If the general phases of the process have are successful for the WS, that WS is committed at 3709. In other words, the WS is deemed deployed and/or maintained and is ready to be started, stopped, or removed.

If one of phases fails, the state of deployment and/or maintainance is rolled back and returned to an initial state at 3711. For example, in an embodiment the general phases of processing are performed again.

Closing Comments

Processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.)), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

It is believed that processes taught by the discussion above may also be described in source level program code in various object-orientated or non-object-orientated computer programming languages (e.g., Java, C#, VB, Python, C, C++, J#, APL, Cobol, Fortran, Pascal, Perl, etc.) supported by various software development frameworks (e.g., Microsoft Corporation's NET, Mono, Java, Oracle Corporation's Fusion etc.). The source level program code may be converted into an intermediate form of program code (such as Java byte code, Microsoft Intermediate Language, etc.) that is understandable to an abstract execution environment (e.g., a Java Virtual Machine, a Common Language Runtime, a high-level language virtual machine, an interpreter, etc.).

According to various approaches the abstract execution environment may convert the intermediate form program code into processor specific code by, 1) compiling the intermediate form program code (e.g., at run-time (e.g., a JIT compiler)), 2) interpreting the intermediate form program code, or 3) a combination of compiling the intermediate form program code at run-time and interpreting the intermediate form program code. Abstract execution environments may run on various operating systems (such as UNIX, LINUX, Microsoft operating systems including the Windows family, Apple Computers operating systems including MacOS X, Sun/Solaris, OS/2, Novell, etc.).

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 38:
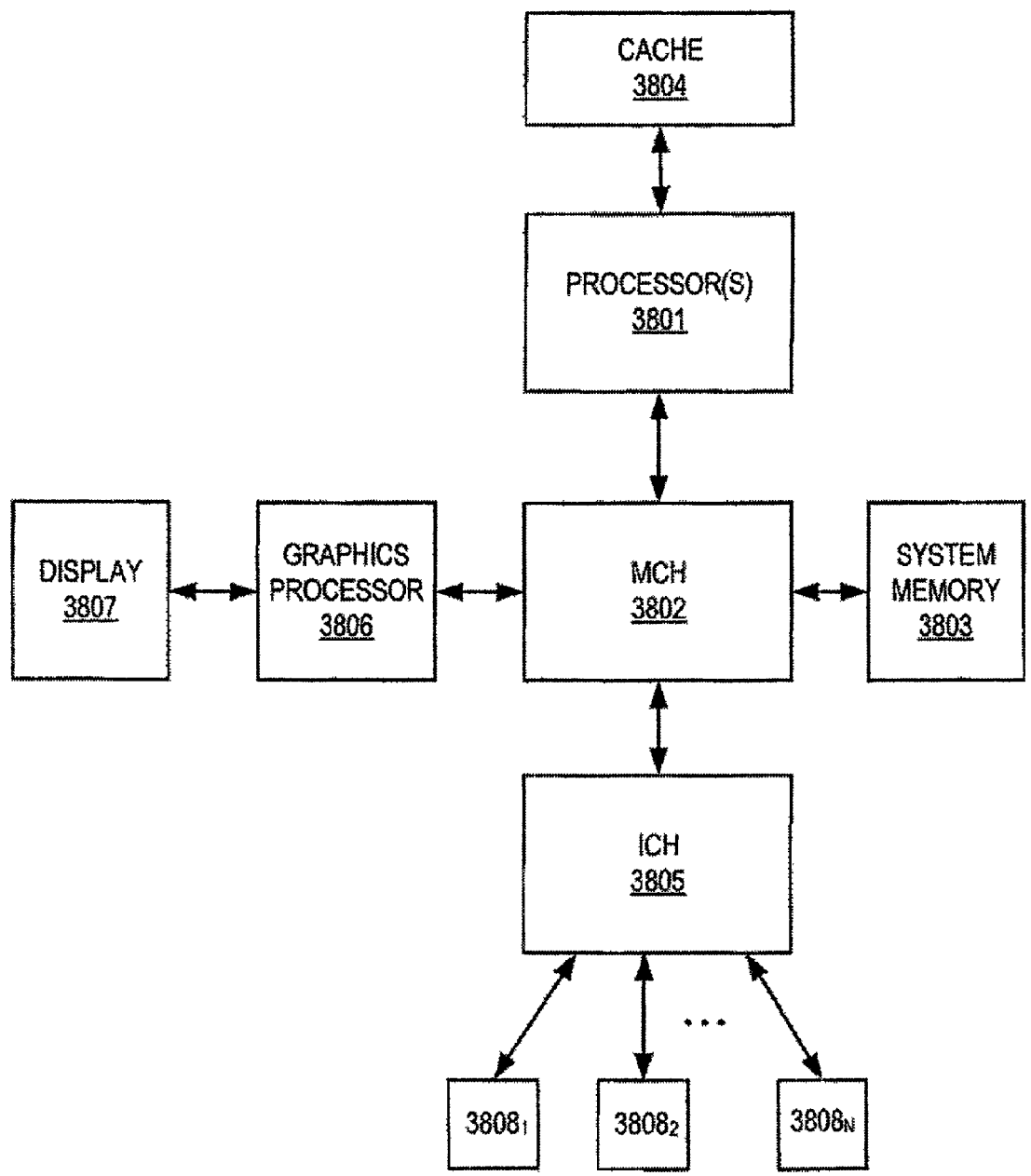
FIG. 38 shows an embodiment of a computing system.

FIG. 38 shows an embodiment of a computing system (e.g., a computer). The exemplary computing system of FIG. 38 includes: 1) one or more processors 3801; 2) a memory control hub (MCH) 3802; 3) a system memory 3803 (of which different types exist such as DDR RAM, EDO RAM, etc,); 4) a cache 3804; 5) an I/O control hub (ICH) 3805; 6) a graphics processor 3806; 7) a display/screen 3807 (of which different types exist such as Cathode Ray Tube (CRT), Thin Film Transistor (TFT), Liquid Crystal Display (LCD), DPL, etc.; 8) one or more I/O devices 3808.

The one or more processors 3801 execute instructions in order to perform whatever software routines the computing system implements. The instructions frequently involve some sort of operation performed upon data. Both data and instructions are stored in system memory 3803 and cache 3804. Cache 3804 is typically designed to have shorter latency times than system memory 3803. For example, cache 3804 might be integrated onto the same silicon chip(s) as the processor(s) and/or constructed with faster SRAM cells whilst system memory 3803 might be constructed with slower DRAM cells. By tending to store more frequently used instructions and data in the cache 3804 as opposed to the system memory 3803, the overall performance efficiency of the computing system improves.

System memory 3803 is deliberately made available to other components within the computing system. For example, the data received from various interfaces to the computing system (e.g., keyboard and mouse, printer port, LAN port, modem port, etc.) or retrieved from an internal storage element of the computing system (e.g., hard disk drive) are often temporarily queued into system memory 3803 prior to their being operated upon by the one or more processor(s) 3801 in the implementation of a software program. Similarly, data that a software program determines should be sent from the computing system to an outside entity through one of the computing system interfaces, or stored into an internal storage element, is often temporarily queued in system memory 3803 prior to its being transmitted or stored.

The ICH 3805 is responsible for ensuring that such data is properly passed between the system memory 3803 and its appropriate corresponding computing system interface (and internal storage device if the computing system is so designed). The MCH 3802 is responsible for managing the various contending requests for system memory 3803 access amongst the processor(s) 3801, interfaces and internal storage elements that may proximately arise in time with respect to one another.

One or more I/O devices 3808 are also implemented in a typical computing system. I/O devices generally are responsible for transferring data to and/or from the computing system (e.g., a networking adapter); or, for large scale non-volatile storage within the computing system (e.g., hard disk drive). ICH 3805 has bi-directional point-to-point links between itself and the observed I/O devices 3808.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A system comprising:
   a processor;
   and a memory to store a web services archive that is associated with a web service archive file, the web services archive includes,
   a web service implementation,
   a web service definition language (WSDL) file describing a web service,
   a WSDL mapping file to describe a mapping between the web service implementation and the WSDL file,
   a types file containing descriptors to define the web service,
   a configuration file includes a plurality of protocol definitions associated with the web service, the plurality of protocol definitions includes a first protocol definition utilized to generate a first protocol instance,
   a deployment manager to notify a protocol in a protocol stack that the web services archive file has been deployed, the protocol to communicate with a runtime framework that is designed to permit the first protocol instance to directly invoke a runtime object without a context as an intermediary between the first protocol instance and the runtime object, and
   a metadata descriptor file to describe a location in the web services archive of at least one of the files in the web services archive.

2. The system of claim 1, wherein the at least one of the files includes an extensible markup language (XML) document.

3. The system of claim 1, wherein the mapping is from Java to XML.

4. The system of claim 1, wherein the mapping is from XML to Java.

5. The system of claim 1, wherein the Web service implementation is selected from a group consisting of a servlet, an EJB, and a Java class.

6. The system of claim 1, wherein the web services archive is part of an Enterprise Archive (EAR).

7. The system of claim 1, wherein the web services archive is a Java archive (JAR) type.

8. The system of claim 1, wherein the web services archive is a web archive (WAR) type.

9. The system of claim 1, wherein the first protocol instance includes a state-less protocol instance that executes in a memory region to store both state information associated with a first received-response message pair and state information associated with a second received-response message pair in a storage location that is external to the memory region in which the first state-less protocol instance executes to concurrently process the first received-response message pair and the second received-response message pair.

10. The system of claim 9, wherein the first state-less protocol instance is to store state information associated with first received-response message pair in the location that is external to the memory region in which the first state-less protocol instance executes and suspend execution of a first process that is associated with the first received-response message pair.

11. The system of claim 9, wherein the first state-less protocol instance is to retrieve state information associated with second received-response message pair in the location that is external to the memory region in which the first state-less protocol instance executes and resume execution of a second process that is associated with the second received-response message pair.

12. The system of claim 10, wherein the first state-less protocol instance suspends execution of the process associated with the first received-response message pair responsive to identification of a received message that is part of a group of messages that are ordered and the received message is received out of order.

13. A method comprising:
   generating a web service archive file and a web services archive, the web service archive including:
   a web service implementation,
   a web service definition language (WSDL) file describing a web service,
   a WSDL mapping file to describe a mapping between the web service implementation and the WSDL file,
   a types file containing descriptors to define the web service,
   a configuration file including a plurality of protocol definitions associated with the web service, the plurality of protocol definitions including a first protocol definition utilized to generate a first protocol instance,
   a deployment manager to notify a protocol in a protocol stack that the web services archive file has been deployed, the protocol to communicate with a runtime framework that is designed to permit the first protocol instance to directly invoke a runtime object without a context as an intermediary between the first protocol instance and the runtime object, and
   a metadata descriptor file to describe a location in the web services archive of at least one of the files in the web services archive.

14. The method of claim 13, wherein at least one of the files of the web services archive is an extensible markup language (XML) document.

15. The method of claim 13, wherein the mapping is from Java to XML.

16. The method of claim 13, wherein the mapping is from XML to Java.

17. The method of claim 13, wherein the web service implementation is selected from a group consisting of a servlet, an EJB, and a Java class.

18. The method of claim 13, wherein the web services archive is a portion of an Enterprise Archive (EAR).

19. The method of claim 13, wherein the web services archive is a Java archive (JAR) type.

20. The method of claim 13, wherein the web services archive is a web archive (WAR) type.

21. An article of manufacture including program code which, when executed by a machine, causes the machine to perform a method, the method comprising:
   generating a web services archive and a web services archive file, the web services archive including:
   a web service implementation,
   a web service definition language (WSDL) file describing the web service,
   a WSDL mapping file to describe a mapping between the web service implementation and the WSDL file,
   a types file containing descriptors to define the web service,
   a configuration file includes a plurality of protocol definitions associated with the web service, the plurality of protocol definitions includes a first protocol definition utilized to generate a first protocol instance, a deployment manager to notify a protocol in a protocol stack that the web services archive file has been deployed, the protocol to communicate with a runtime framework that is designed to permit the first protocol instance to directly invoke a runtime object without a context as an intermediary between the first protocol instance and the runtime object, and a metadata descriptor file to describe a location in the web services archive of at least one of the files in the web services archive.

22. The article of manufacture of claim 21, wherein the web services archive is part of an enterprise archive (EAR).

23. The article of manufacture of claim 21, wherein the web services archive is a EJB archive (JAR) type.

24. The apparatus of claim 9, wherein the first state-less protocol instance is utilized to perform an operation on a header of at least one message.

25. The apparatus of claim 24, wherein the at least one message includes a message that is received by the web service.

26. The apparatus of claim 25, wherein the at least one message further includes a message that is communicated by the web service in response to the message that is received by the web service.

* * * * *